(12) United States Patent
Shivaiah

(10) Patent No.: US 10,264,916 B2
(45) Date of Patent: Apr. 23, 2019

(54) RECIPE DRIVEN KITCHEN AUTOMATION OF FOOD PREPARATION

(71) Applicant: Vinay Shivaiah, Alpharetta, GA (US)

(72) Inventor: Vinay Shivaiah, Alpharetta, GA (US)

(*) Notice: Subject to any disclaimer, the term of this patent is extended or adjusted under 35 U.S.C. 154(b) by 0 days.

(21) Appl. No.: 15/618,826

(22) Filed: Jun. 9, 2017

(65) Prior Publication Data

US 2017/0354294 A1    Dec. 14, 2017

Related U.S. Application Data

(60) Provisional application No. 62/349,818, filed on Jun. 14, 2016.

(51) Int. Cl.
| | | |
|---|---|---|
| *A47J 37/10* | (2006.01) | |
| *A47J 36/32* | (2006.01) | |
| *G05B 19/042* | (2006.01) | |
| *A47J 44/00* | (2006.01) | |

(52) U.S. Cl.
CPC .............. *A47J 36/32* (2013.01); *A47J 44/00* (2013.01); *G05B 19/0426* (2013.01); *G05B 2219/45111* (2013.01)

(58) Field of Classification Search
CPC .......... A47J 27/62; A47J 44/00; H05B 6/6435; F24C 7/082; A23L 5/10
See application file for complete search history.

(56) References Cited

U.S. PATENT DOCUMENTS

| | | |
|---|---|---|
| 4,748,902 A | 6/1988 | Maurantonio |
| 5,132,914 A | 7/1992 | Cahlander et al. |
| 5,289,382 A | 2/1994 | Goto |
| 5,386,762 A | 2/1995 | Gokey |
| 5,819,636 A | 10/1998 | Khashoggi |
| 6,012,444 A | 1/2000 | Skender |
| 6,112,645 A | 9/2000 | Chang |
| 6,626,190 B2 | 9/2003 | Durth et al. |
| 6,647,864 B1 | 11/2003 | Fang |
| 6,789,067 B1 * | 9/2004 | Liebenow ............ G06Q 10/087 705/15 |
| 6,843,166 B1 | 1/2005 | Li |
| 6,957,111 B2 | 10/2005 | Zhu et al. |
| 7,001,626 B2 | 2/2006 | Sands et al. |
| 7,174,830 B1 | 2/2007 | Dong |
| 7,241,977 B2 | 7/2007 | Friedl |
| 7,461,589 B2 | 12/2008 | Sinton |

(Continued)

*Primary Examiner* — Steven N Leff

(57) ABSTRACT

A master controller programmed to execute a recipe, stored in computer memory, for a finished food product, prepared from a plurality of raw ingredients; a raw ingredients storage unit controller controlled by the master controller and programmed to control a mechanism for getting the plurality of raw ingredients for the recipe; a cleaning controller controlled by the master controller and programmed by computer software to control one or more cleaning devices configured to clean one or more of the plurality of raw ingredients; a manipulator controller programmed to control one or more devices which physically manipulate one or more of the plurality of raw ingredients by one or more of grinding, mincing, peeling, cutting, and rolling one or more of the plurality of raw ingredients; and a heater controller programmed to control one or more heating devices to heat one or more of the plurality of raw ingredients.

3 Claims, 57 Drawing Sheets

(56) References Cited

U.S. PATENT DOCUMENTS

| | | |
|---|---|---|
| 7,930,973 B2 | 4/2011 | Wong |
| 8,276,505 B2 | 10/2012 | Buehler |
| 8,276,506 B2 | 10/2012 | Tojo et al. |
| 8,307,951 B2 | 11/2012 | Sus et al. |
| 8,334,004 B2 | 12/2012 | Liu |
| 8,820,219 B2 | 9/2014 | David |
| 9,131,807 B2 | 9/2015 | Roy et al. |
| 9,445,614 B2 | 9/2016 | Storek et al. |
| 2003/0037681 A1 | 2/2003 | Zhu et al. |
| 2004/0173103 A1 | 9/2004 | Won |
| 2005/0193901 A1* | 9/2005 | Buehler ............... A23L 5/10 99/468 |
| 2005/0223906 A1 | 10/2005 | Xu |
| 2005/0256774 A1 | 11/2005 | Clothier et al. |
| 2006/0136078 A1* | 6/2006 | Chen ............... A47J 27/62 700/86 |
| 2007/0158335 A1* | 7/2007 | Mansbery ........... H05B 6/6435 219/505 |

* cited by examiner

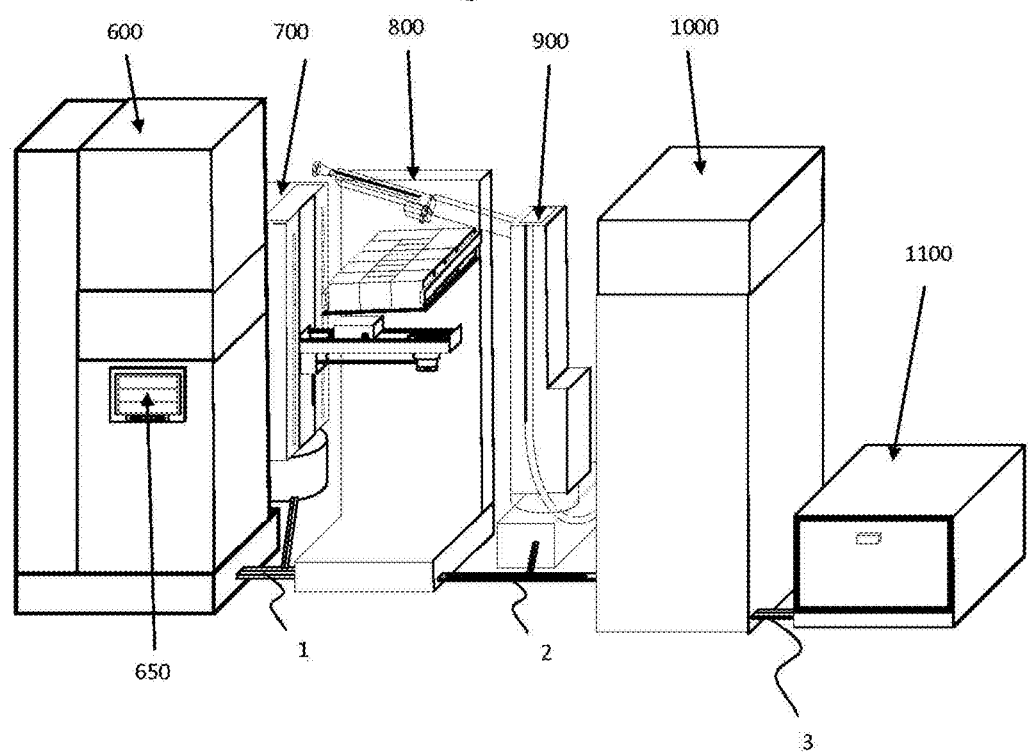

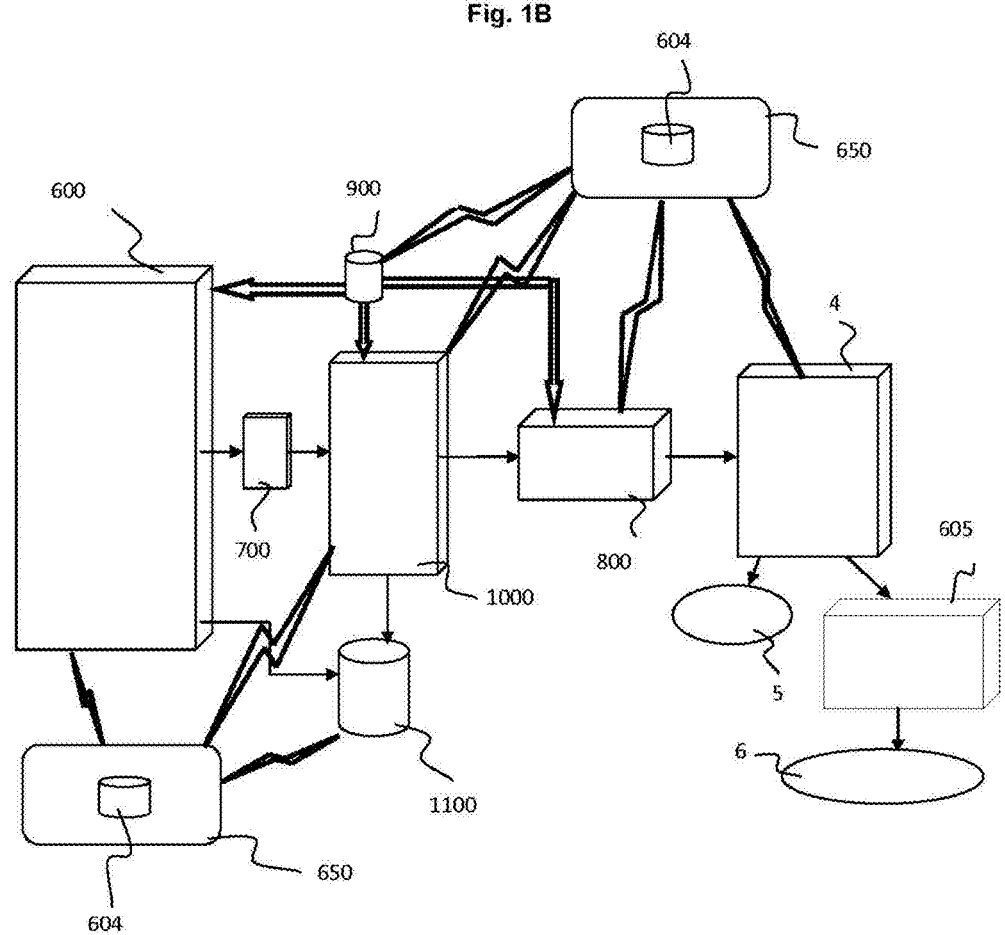

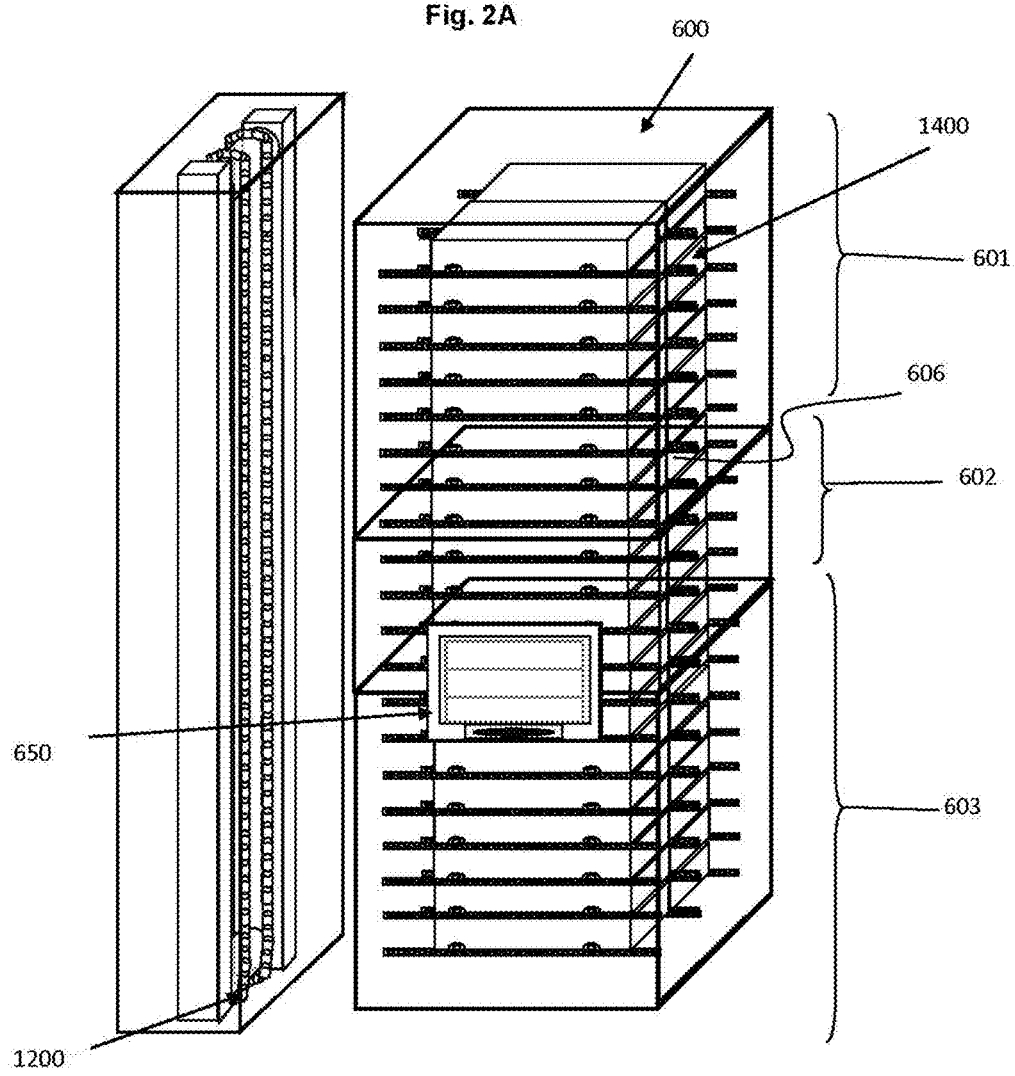
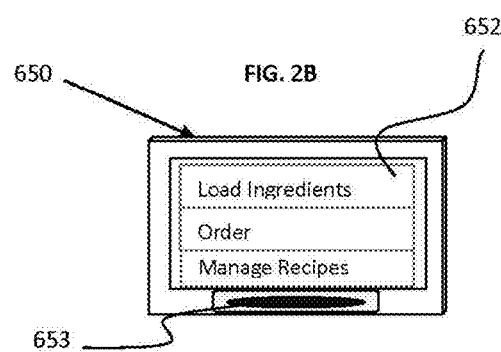

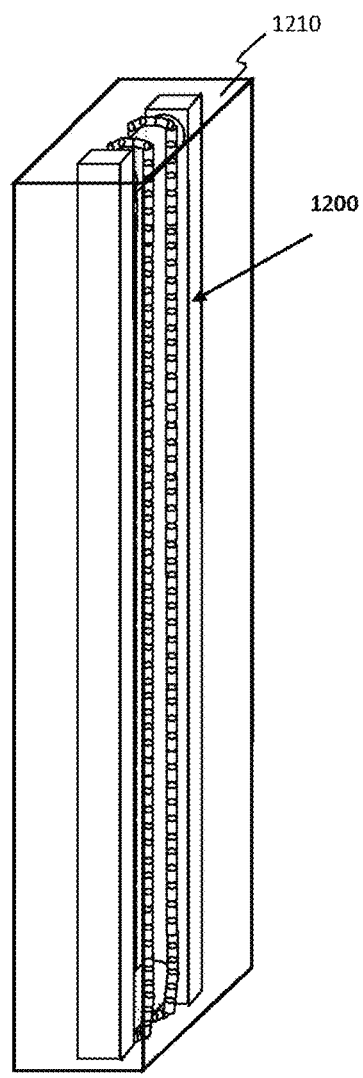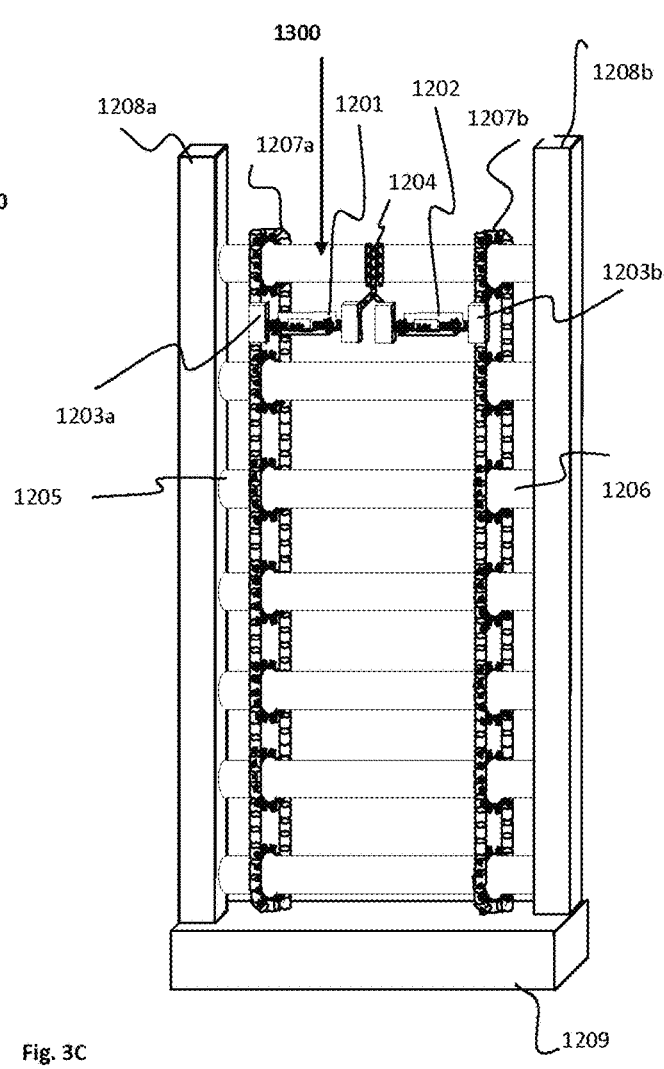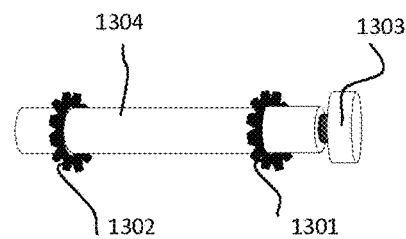

Fig. 5F
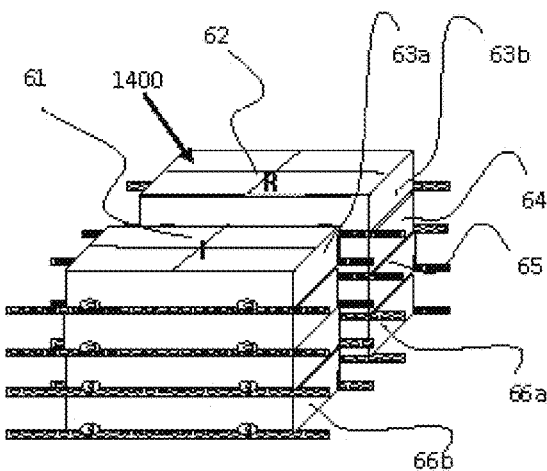
Fig. 5G
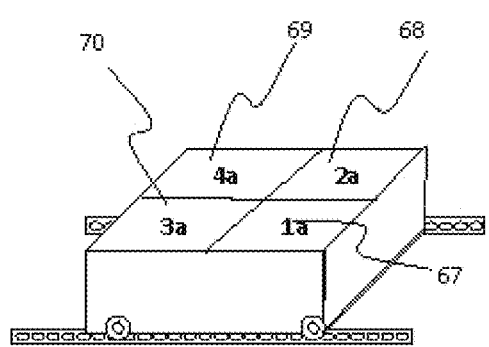
Fig 5H
| ID | IngredientID | SlotID | Quantity | Unit |
|---|---|---|---|---|
| 2 | 304 | 11L4 | 2 | lbs |
| 3 | 405 | 24L3 | 3 | Cup |
| 4 | 702 | 32R2 | 5 | Cup |
| 5 | 815 | 41R1 | 3 | lbs |

Fig. 6A
Fig. 6B
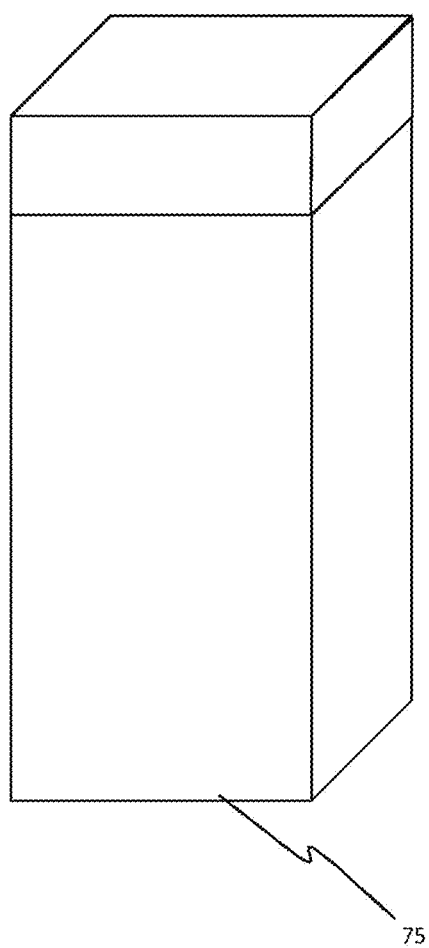
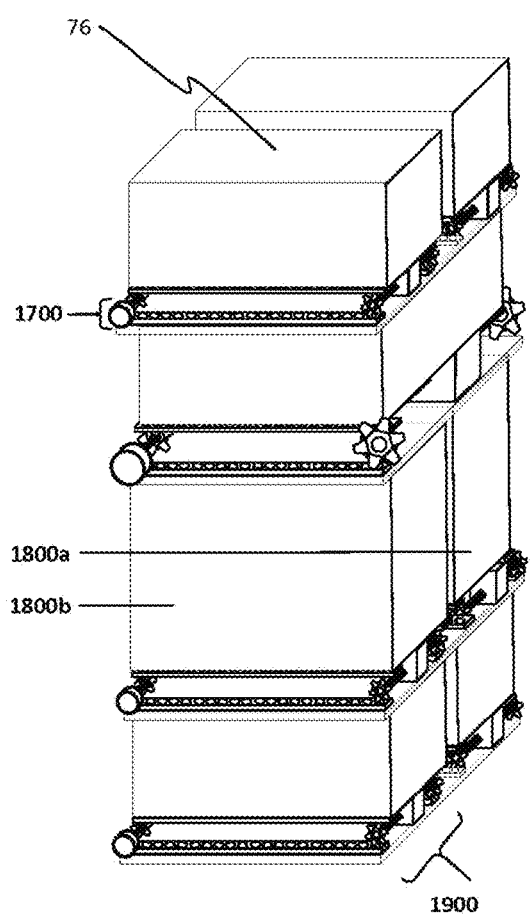

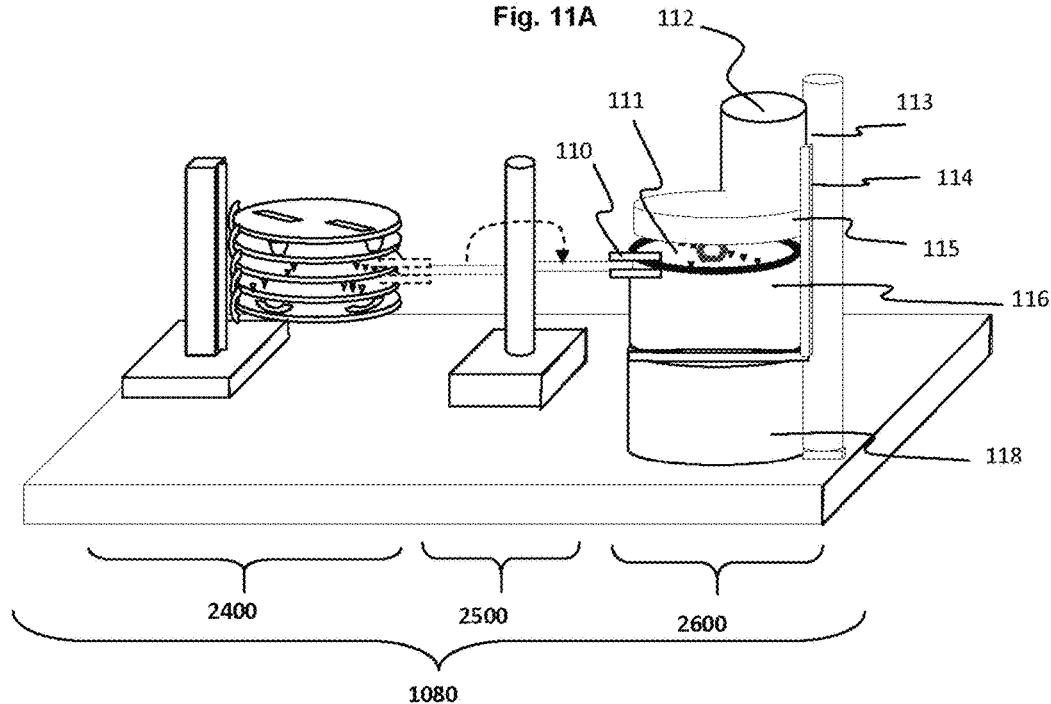
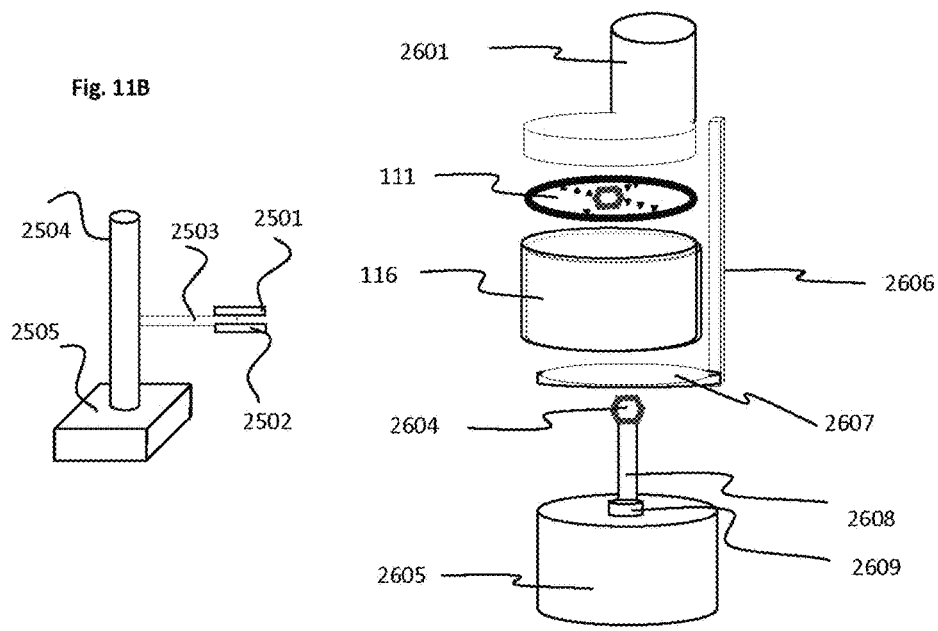

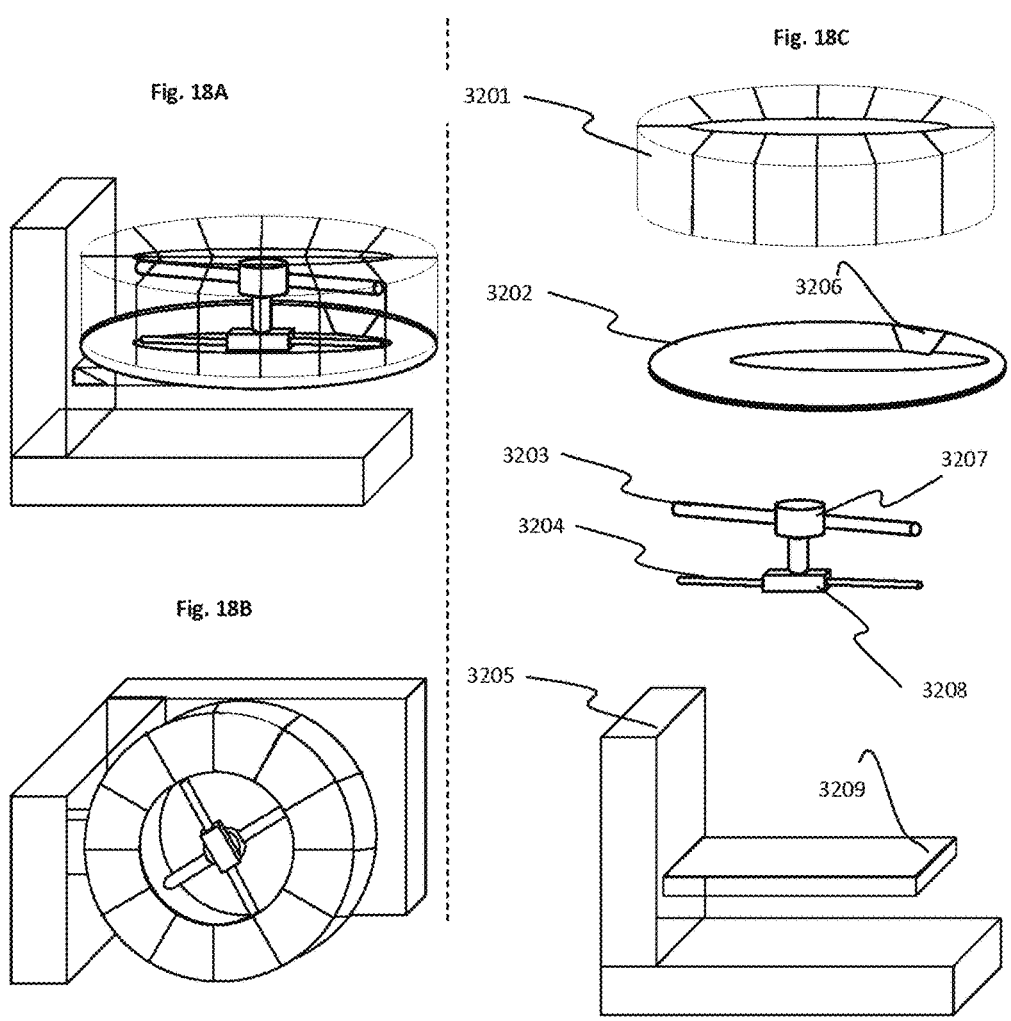

Fig. 19A
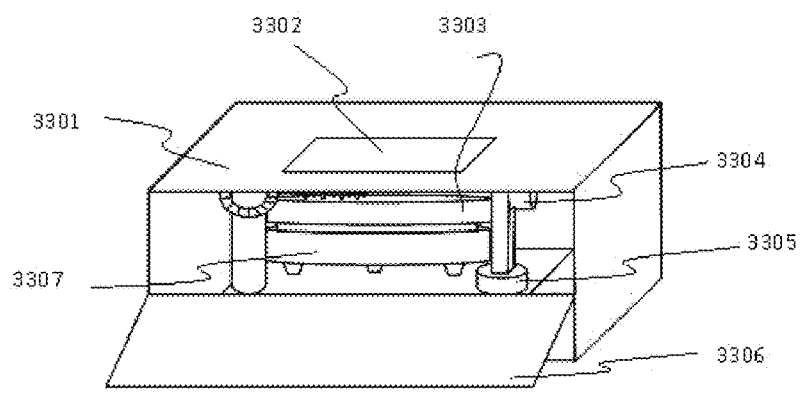
Fig. 19B
Fig. 19C
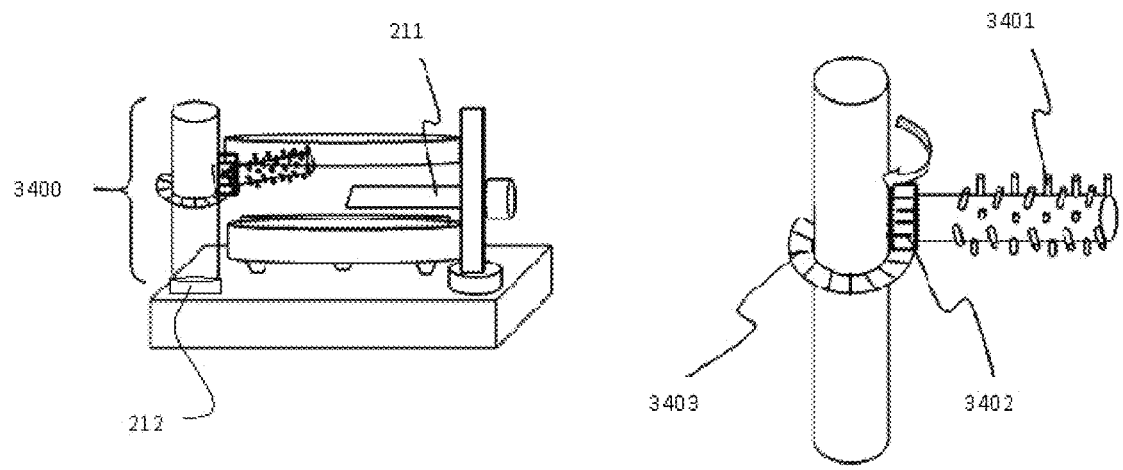

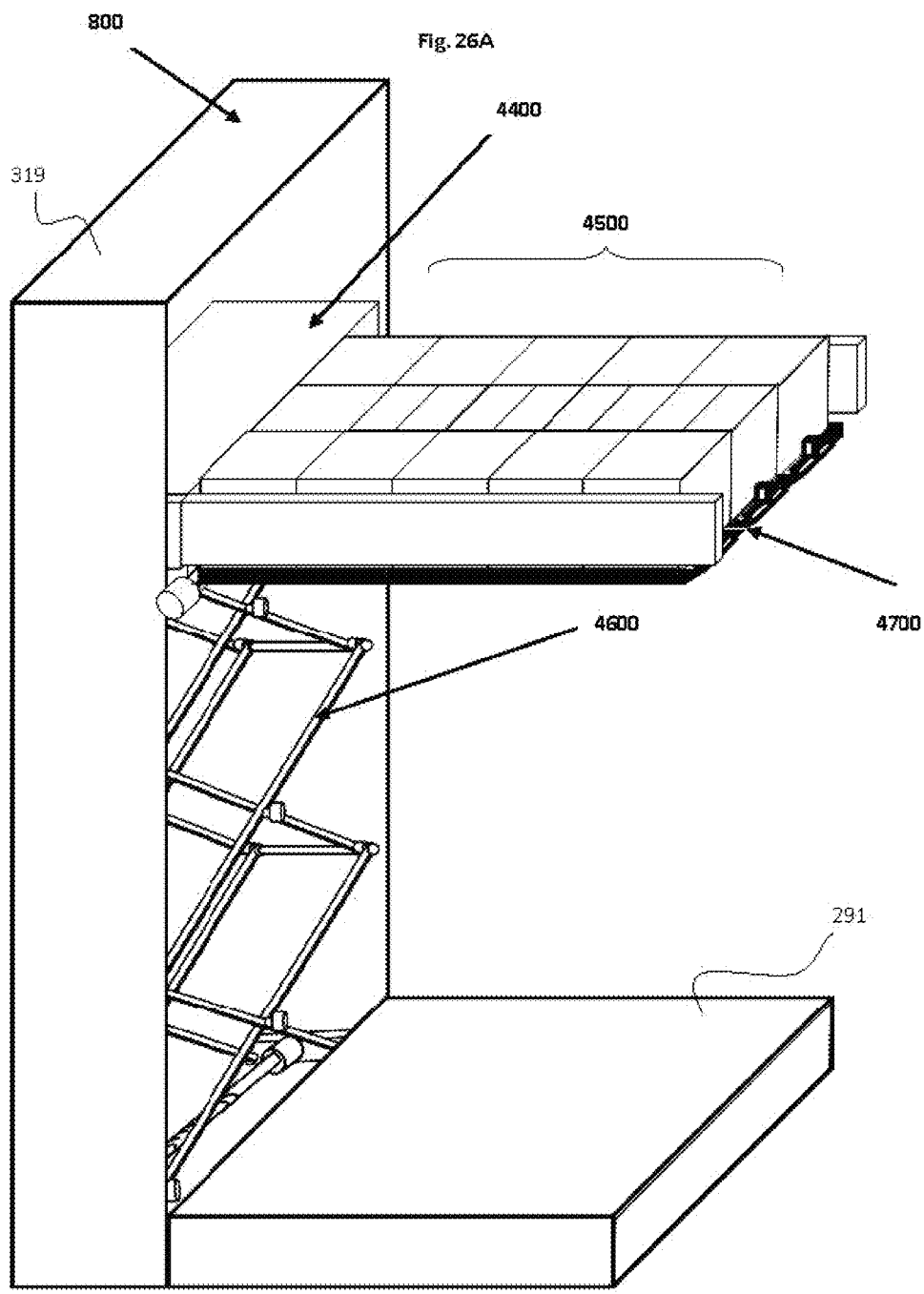

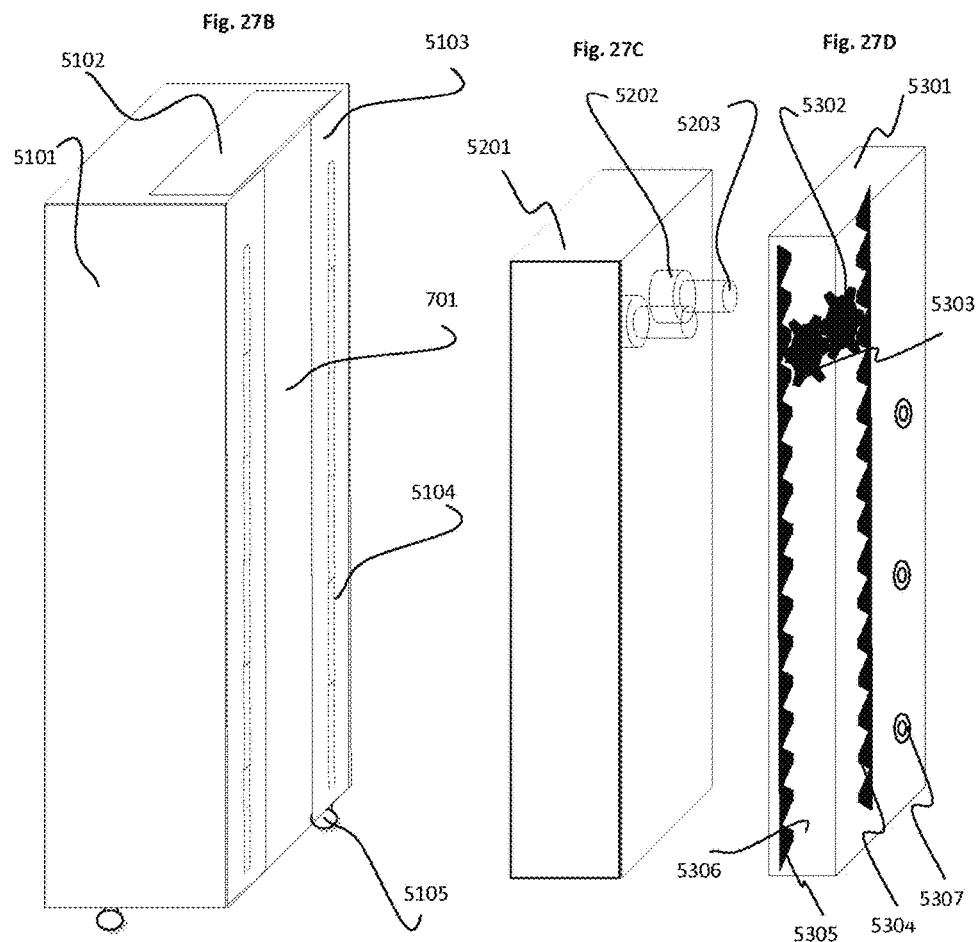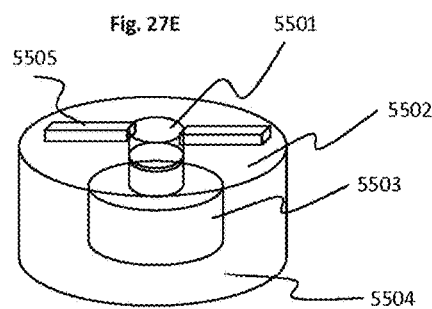

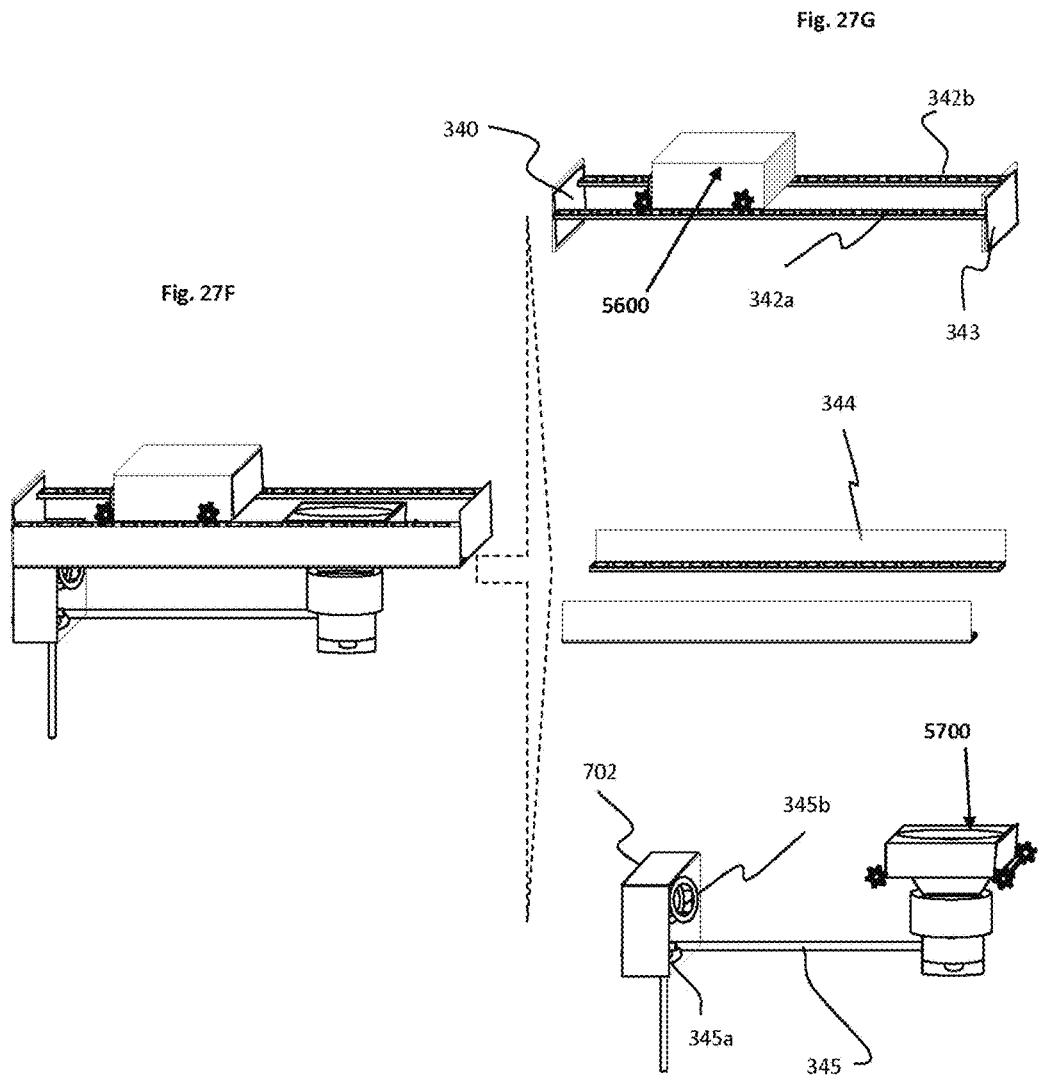

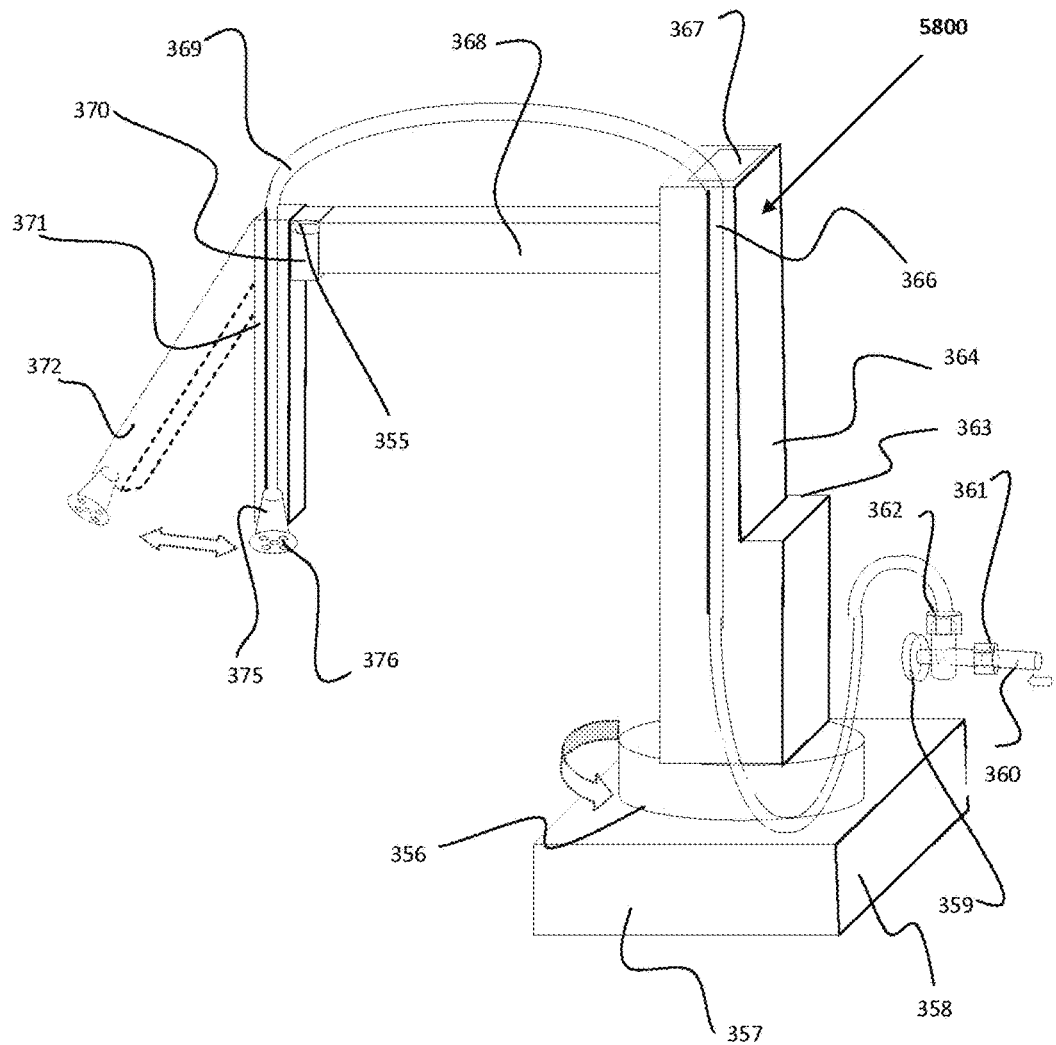

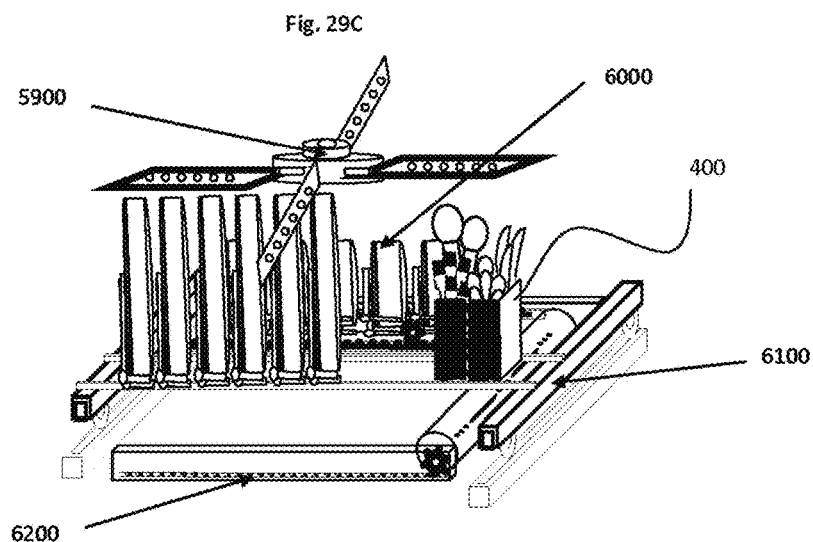
Fig. 29C
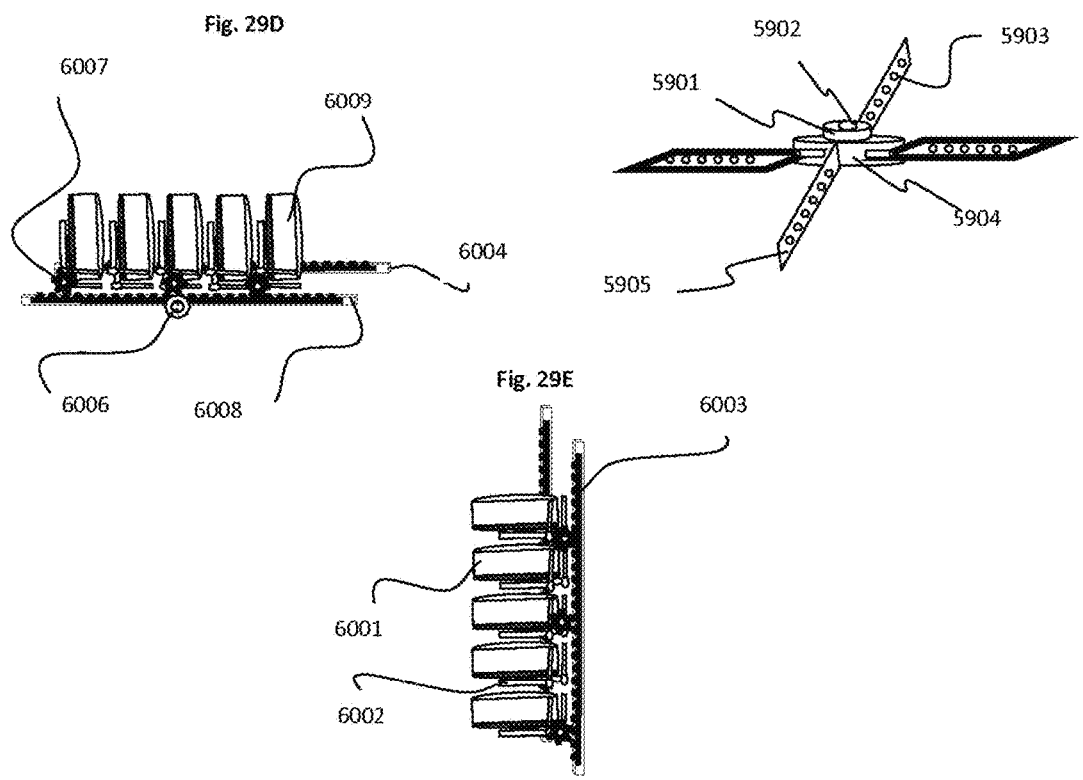
Fig. 29D
Fig. 29F
Fig. 29E

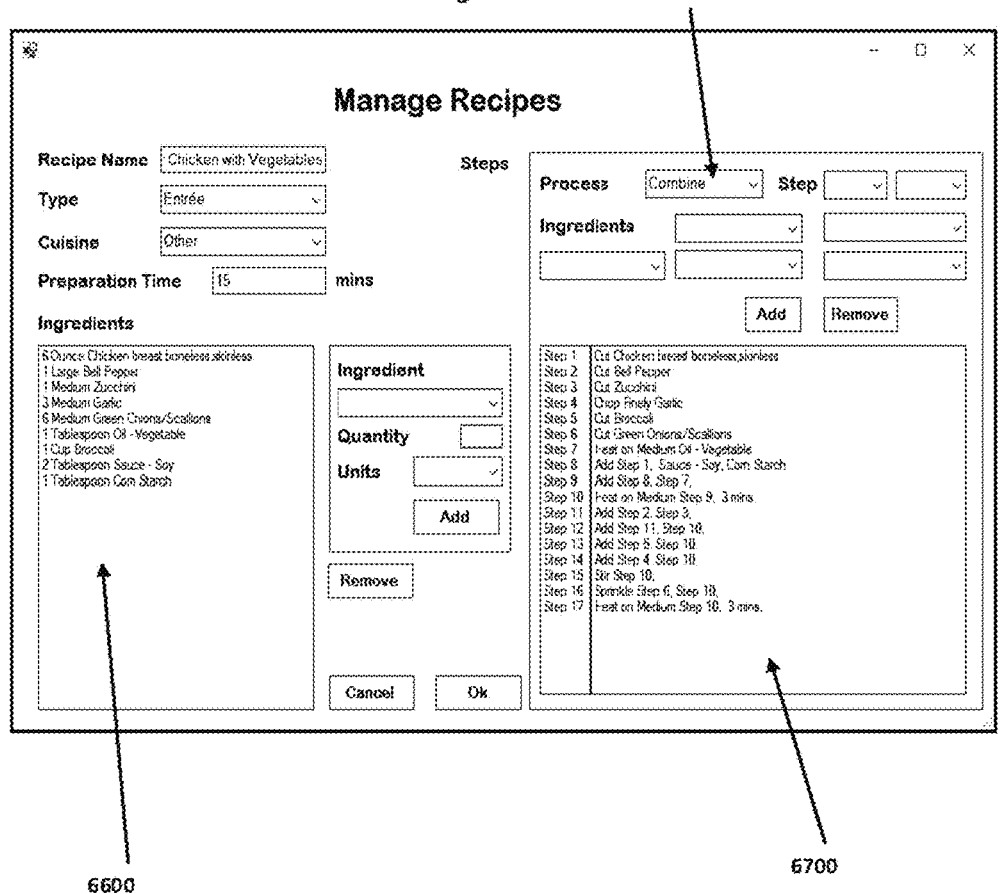

Fig. 35B

Recipe for Stir-Fry Chicken and Vegetables

Ingredients :

- 8 ounces skinless, boneless chicken breast, cut into small pieces
- 1 large green bell pepper, cut into pieces
- 1 zucchini, cut into pieces
- 3 cloves garlic, chopped finely
- 6 green onions, chopped
- 1 tablespoon vegetable oil
- 1 cup cut broccoli
- 2 tablespoons soy sauce
- 1 tablespoon cornstarch Directions :

Mix Chicken with cornstarch and soy sauce.

Heat 1 tablespoon vegetable oil in a large skillet or wok over medium-high heat.

Cook and stir chicken until meat is no longer pink in the center, about 5 minutes.

Cook and stir broccoli, bell pepper, zucchini, and garlic for 5 minutes.

Sprinkle Green onions.

Cook and stir for 3 more minutes

Fig. 35C

Ingredients

8 Ounce Chicken breast boneless,skinless
1 Large Bell Pepper
1 Medium Zucchini
3 Medium Garlic
6 Medium Green Onions/Scallions
1 Tablespoon Oil - Vegetable
1 Cup Broccoli
2 Tablespoon Sauce - Soy
1 Tablespoon Corn Starch

Fig. 35D

| Step 1 | Cut Chicken breast boneless,skinless |
| Step 2 | Cut Bell Pepper |
| Step 3 | Cut Zucchini |
| Step 4 | Chop Finely Garlic |
| Step 5 | Cut Broccoli |
| Step 6 | Cut Green Onions/Scallions |
| Step 7 | Heat on Medium Oil - Vegetable |
| Step 8 | Add Step 1, Sauce - Soy, Corn Starch |
| Step 9 | Add Step 8, Step 7. |
| Step 10 | Heat on Medium Step 9, 3 mins. |
| Step 11 | Add Step 2, Step 3. |
| Step 12 | Add Step 11, Step 10. |
| Step 13 | Add Step 5, Step 10. |
| Step 14 | Add Step 4, Step 10. |
| Step 15 | Stir Step 10. |
| Step 16 | Sprinkle Step 6, Step 10. |
| Step 17 | Heat on Medium Step 10, 3 mins. |

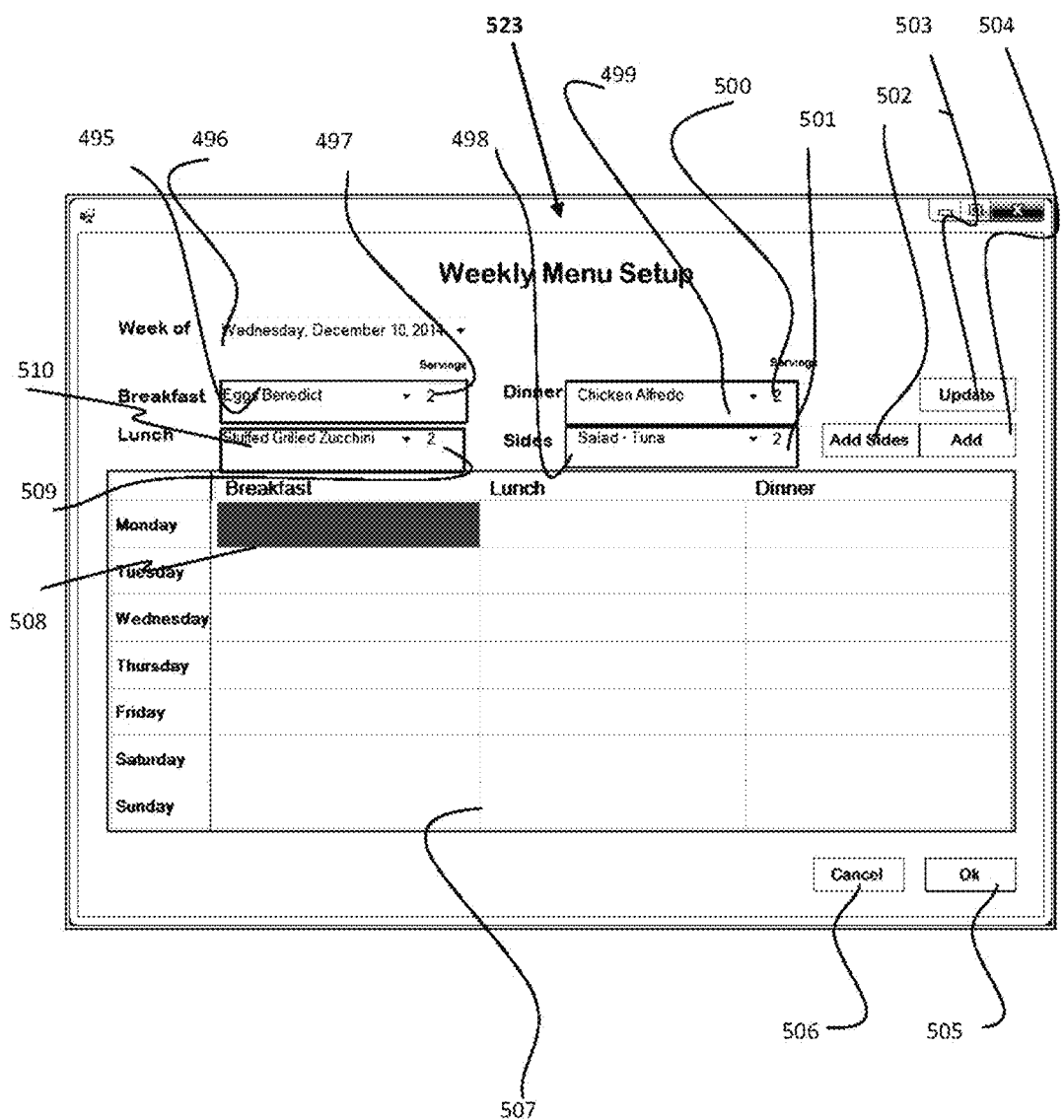

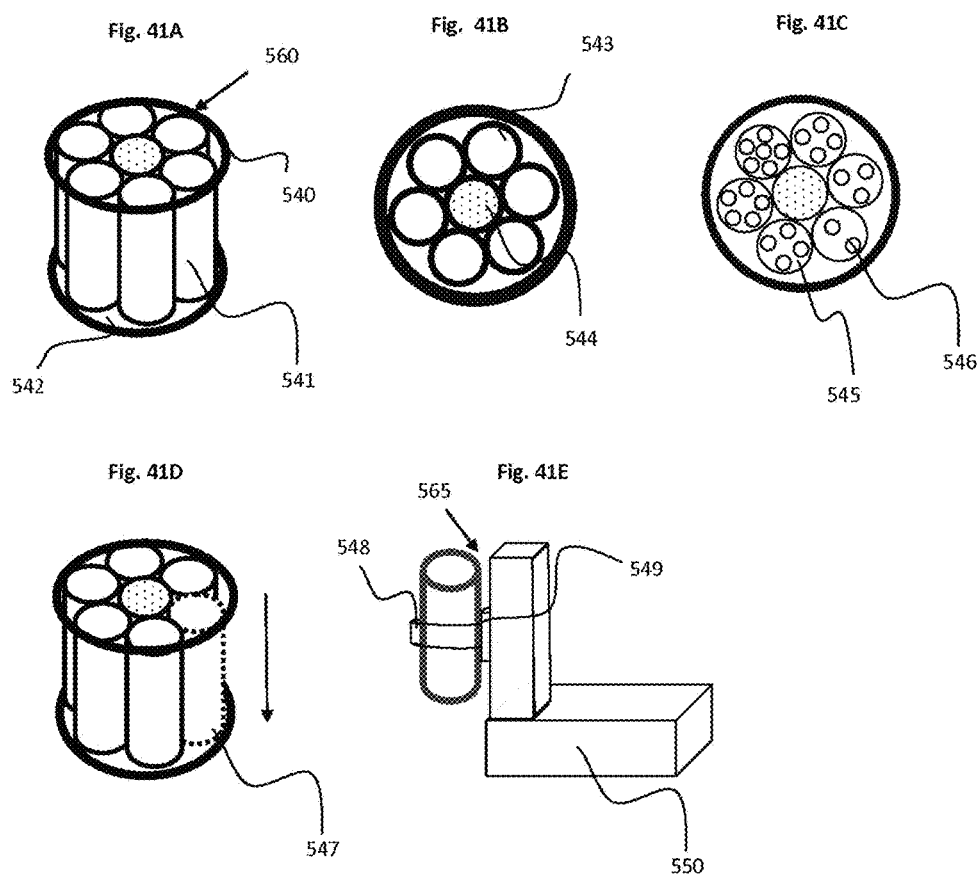

RECIPE DRIVEN KITCHEN AUTOMATION OF FOOD PREPARATION

CROSS REFERENCE TO RELATED APPLICATION(S)

This application claims the priority of U.S. provisional patent application Ser. No. 62/349,818, filed on Jun. 14, 2016, titled "RECIPE DRIVEN KITCHEN AUTOMATION OF FOOD PREPARATION", inventor and applicant Vinay Shivaiah.

FIELD OF THE INVENTION

The present invention is in the technical field of automated cooking devices to prepare food from raw ingredients.

BACKGROUND OF THE INVENTION

Preparation of food is time consuming. Using the right amount of ingredients, and mixing of the ingredients in the correct order and the timing of the individual processes plays a vital role in preparing tasty and nutritious food.

Skills required for preparing different cuisines are different. But the same three operations are universal. Step one: Getting the right ingredients and quantity of those individual ingredients, Step two: Converting from whole ingredient to smaller pieces and Step three: Cooking it using the appropriate method of heating. These are the three basic steps used in preparing most of the dishes of all cuisines. These three steps are basis of more than one thousand dishes that have been researched for this project.

U.S. Patent application no. 2004/0173103 A1 provides automatic cooking, however, the main drawback of the system is that they assume that the raw ingredients are already cut from the "whole" form or they rely on frozen cut vegetables/meat which is not healthy and does not taste good. There is no mechanism to convert from the whole vegetable or meat to smaller pieces. Secondly, it does not have the mechanism to initiate the cooking remotely via a mobile phone. Thirdly, a user cannot create new recipe. Only preprogrammed set of recipes can be cooked. Fourth, to alter the preprogrammed recipe, one has to have expert knowledge on workings of the PLC. Suppose the user does not like too much spice or salt or wants to add additional ingredient, it cannot be altered in these existing inventions, without altering the program by an expert.

Typically, most of the cooking effort and time is spent on the preparation of the ingredients which some of these patents do not provide. They obtain already cut ingredients and cook it but does not provide 'full' cooking system as they claim. 'Full' cooking systems should involve the ingredients preparation process. They should provide the process from converting the recipe instructions to controller-motor instructions without the intervention of complex programming changes.

U.S. Pat. No. 8,276,505 B2 discloses a mechanism to convert from 'whole' form to smaller pieces, It requires high precision and complicated programming of the robotic arm. If user needs to provide a little variation to the dish being prepared, a well trained robotic programmer has to spend time to make a small change in any of the tasks. It involves a change in the programming or new program for new recipes.

US patent application no. 2003/0037681 A1 and U.S. Pat. No. 6,957,111 B2—comes close in delivering the ingredients from a storage area and provides a way of receiving data like number of servings, starting time for preparation of food from a remote source by using residential home gateway—X10 protocol in particular. However, that patent application and patent fails in providing the mechanism of doing the entire process for various dishes. It provides a mechanism for preparing cooked rice only but generalizes for other dishes. One of the three main steps for many recipes is converting the whole ingredient from bigger form to smaller desirable forms. Nowhere in the patent do they specify a mechanism to do it.

U.S. Pat. No. 5,132,914 A provides the ability to cook French fries, chicken nuggets, fish filets and chicken patties from uncooked potato pieces. There is no mechanism to make the uncooked chopped French fries from the raw ingredients—whole potato. That is, there is no cutting mechanism. Same goes for chicken nuggets/patties and fish filets.

Additionally, none of the known patents or patent applications mentioned provides a way to set up a weekly menu of dishes and also does not provide a way to add a new recipe into the system or to download a recipe. Most importantly there is no mechanism for converting the recipe instructions into device controller instructions.

SUMMARY OF THE INVENTION

One or more embodiments of the present invention provide an apparatus comprising a master controller computer processor which is programmed by computer software to execute a recipe, which is stored in computer memory of the master controller computer processor, for a finished food product which is prepared from a plurality of raw ingredients; a raw ingredients storage unit controller which is programmed by computer software to control a mechanism for getting the plurality of raw ingredients required for the recipe, and wherein the raw ingredients storage unit controller is controlled by the master controller computer processor; a cleaning controller which is programmed by computer software to control one or more cleaning devices which are configured to clean one or more of the plurality of raw ingredients; a manipulator controller which is programmed by computer software to control one or more devices which physically manipulate one or more of the plurality of raw ingredients by one or more of the actions of grinding, mincing, peeling, cutting, and rolling one or more of the plurality of raw ingredients; and a heater controller which is programmed by computer software to control one or more heating devices to heat one or more of the plurality of raw ingredients.

The list of the plurality of raw ingredients may be stored in the computer memory of the master controller computer processor; a list of steps, each of which is executed by one of the raw ingredients storage unit controller, cleaning controller, manipulator controller, and heater controller may be stored in computer memory; and executing the list of steps, in at least one embodiment, causes the recipe to be executed and the finished food product to be prepared.

The master controller computer processor may be programmed by computer software stored in its computer memory to produce an interactive menu on a computer monitor which allows a user to enter the list of steps, and the list of the plurality of raw ingredients, into the computer memory. The interactive menu, in at least one embodiment, is configured to allow the user to modify the list of steps and the list of the plurality of raw ingredients, after the user has originally entered the list of steps and the list of the plurality of raw ingredients into the computer memory.

In at least one embodiment, the master controller computer processor is programmed by computer software to execute the recipe, by looking up data for one or more verbal instructions in a table in computer memory, and to cause one or more devices to physically impact one or more food items in response to the one or more verbal instructions; and wherein the table in computer memory links the one or more verbal instructions with identification data for the one or more devices.

The master controller computer processor may be programmed to receive additional data for one or more additional verbal instructions, and to store the additional data into the table in computer memory, along with links to one or more additional devices which are configured to physically impact one or more food items in response to the one or more additional verbal instructions.

One or more embodiments of the present invention may also include a method including using a master controller computer processor which is programmed by computer software to execute a recipe, which is stored in computer memory of the master controller computer processor, to prepare a finished food product which is prepared from a plurality of raw ingredients; wherein the recipe is executed by getting the plurality of raw ingredients required for the recipe, by use of a raw ingredients storage unit controller which is controlled by the master controller computer processor; wherein the recipe is further executed by cleaning one or more of the plurality of raw ingredients by used of a cleaning controller which is controlled by the master controller computer processor; wherein the recipe is further executed by physically manipulating one or more of the plurality of raw ingredients by one or more of the actions of grinding, mincing, peeling, cutting, and rolling one or more of the plurality of raw ingredients by used of a manipulator controller which is controlled by the master controller computer processor; and wherein the recipe is further executed by physically heating one or more of the plurality of raw ingredients by use of a heating controller which is controlled by the master controller computer processor.

In at least one embodiment, a recipe driven kitchen automation apparatus, system, and method is provided which fully automates a cooking process that involves preparing food from scratch without any human intervention except to place the whole ingredients into a storage unit. Once the dish to be prepared is ordered remotely via mobile device or by using an onboard touch screen, raw ingredients that are required for the requested dish are retrieved from the storage unit. The raw ingredients are then converted from the whole form to smaller form, cooked to specifications and placed on a plate or a bowl ready to be consumed. If required, it can be packed for "take out". Finally, cleaning of all the devices involved in preparing the dish, completes the kitchen automation process. This machine differs from other automated food preparation systems in that the user has the ability to create new recipes, modify existing recipes or download recipes and have them prepared without the need to reprogram or load any special software. Based on the chosen recipe, different motors and devices are initiated to prepare the food according to the recipe steps. Recipes, from the innumerable recipe books available in the market, can be customized and entered into this machine in a predefined format and prepared. User can also setup the menu for breakfast, lunch and dinner for a week and those meals are prepared automatically at the user specified times of the week.

A Kitchen Automaton (hereinafter "KA") of one or more embodiments of the present invention is the automatic operation of various cooking devices working in conjunction to prepare a wide range of desired dishes from ingredients in its whole form. This automation is accomplished by providing a compiler that directly translates the individual recipe steps into corresponding mechanical actions. Various microcontrollers control different devices and their operations. A master microprocessor controls the overall system. In at least one embodiment, there are four main sections: (1) Raw Ingredients Storage, (2) Manipulator, (3) Heating and (4) Cleaning sections. Additional smaller sections are the Collector/Garbage Disposer Positioning system, Temporary holder system and Water Positioner-Jet Sprayer. All these sections are controlled by a microprocessor. The microprocessor controls the individual motors and drivers of each of the devices in each of the sections. In at least one embodiment, a user interface is used which has been developed using Visual Studio (trademarked) computer software and MS (Microsoft) Access (trademarked) is used as the database. The database stores the recipes, device IDs, motors and manipulation actions.

In at least one embodiment of the present application advantages of this cooking system are: (a) Ability to cook various dishes without the need to load different programs or software for each of them; (b) Weekly setup of menu that can be cooked at pre-specified times; (c) Ability to kickoff dish preparation remotely through the mobile device; (d) Ability to load recipes, store and manipulate the recipe and to customize the recipe to ones needs; (e) provides a list of recipes that can be prepared using the existing ingredients that are in the storage unit of the KA; and (f) flexibility to extend the number of devices and thus accommodate more ingredients manipulation actions.

Although there are many patents that exist for automated food preparation systems, there are no products in the market based on these patents that would fully prepare the food from the scratch. The main reason for non-existence of that complete KA in the market is that none of the patents have the flexibility or the ease of altering the recipe without heavy technical knowledge or programming experience. Different people have different tastes, likes and dislikes of certain ingredients. For a small change in the recipe, there is change in the programming which a layman cannot tweak those programming steps. This invention takes care of those drawbacks and provides a simple recipe steps that correlates to the existing recipe language in the recipe books, so that ordinary users can enter.

BRIEF DESCRIPTION OF THE DRAWINGS

FIG. 1A shows an entire view of a Kitchen Automation (KA) apparatus, method, and system, in accordance with one or more embodiments of the present invention, as laid out in a kitchen;

FIG. 1B shows the block diagram of a whole system, apparatus and method in accordance with one or more embodiments of the present invention. FIG. 1B shows a food preparation process through different units from a "raw ingredients" stage in a Storage section of FIG. 2A to a "final prepared food" stage;

FIG. 2A shows a simplified diagram of a raw ingredients storage unit where all the raw ingredients are stored;

FIG. 2B shows a main computer that controls an overall operation of food preparation;

FIG. 3A shows a push-pull box row positioner, which is used to position a push-pull box to a correct row;

FIG. 3B shows a side view of the push-pull box row positioner of FIG. 3A without an enclosing outer box;

FIG. 3C shows a top cylindrical block that rotates and positions the push-pull box;

FIG. 5F shows a stack of four boxes in each of left and right blocks;

FIG. 5G shows the IDs (identification numbers) of the slots in a box;

FIG. 5H shows how the ingredients are stored in a database table and the IDs that are assigned to each of the slot's ingredients;

FIG. 6A shows a manipulator box that contains a plurality of manipulator devices;

FIG. 6B shows the plurality of manipulator devices stacked up inside the manipulator box;

FIG. 11A shows a manipulator device—shredder device used to cut, chop, dice, grate, etc.;

FIG. 11B shows a blade selector to select appropriate blade;

FIG. 11C shows an exploded view of a shredder's rotator/collector;

FIG. 18A shows a side view of a dough pieces holder which is used to temporary collect the dough pieces from the dough shaper/sizer of FIG. 17 and then dispose the dough pieces to the tortilla maker;

FIG. 18B shows a top view of the dough pieces holder;

FIG. 18C shows the exploded view of the dough pieces holder with different parts of the device;

FIG. 19A shows the tortilla maker which is used to make tortilla or the pizza base, Indian roti, pita bread, etc.;

FIG. 19B shows the tortilla Maker with an upper pan raised up;

FIG. 19C shows a pizza dough docker;

FIG. 26A shows a temporary holder;

FIG. 27B shows a collector positioner box that encloses the lifter and racks holder;

FIG. 27C shows a lifter that provides the motors and support to lift the rack holder up or down;

FIG. 27D shows a racks holder that moves up or down when the wheels rotate on its racks;

FIG. 27E shows a collector positioner base that holds the collector positioner system and also provides mechanism to rotate around Y axis;

FIG. 27F shows a collector rack system that holds and provides movement for a collector on its racks;

FIG. 27G shows an exploded view of the collector rack system that holds ingredients;

FIG. 28A shows a water positioner-jet sprayer which is used to clean raw ingredients storage slots, temporary holder Slots and the devices in a manipulator;

FIG. 29C shows inner contents of the cleaner device of FIG. 29A;

FIG. 29D shows a bowl holder in horizontal position inside the cleaner device of FIG. 29A;

FIG. 29E shows the bowl holder in vertical position when it is outside the cleaner device;

FIG. 29F shows a top water sprayer;

FIG. 35A shows an example recipe as entered in the manage recipes screen;

FIG. 35B shows an example recipe found in cook books;

FIG. 35C shows a list of ingredients as entered in the manage recipes screen;

FIG. 35D shows a 'directions' of the recipe entered as 'steps' in the manage recipes screen;

FIG. 38 shows a screen where the user can set up all the menu items for the week;

FIG. 41A shows a spice storage unit;

FIG. 41B shows atop view of the spice storage unit;

FIG. 41C shows a bottom view of the spice storage unit;

FIG. 41D shows how the spice storage unit can rotate in horizontal plane;

FIG. 41E shows a spice dispensing mechanism;

FIG. 42B shows an individual liquid storage container; and

FIG. 42C shows a liquid dispensing mechanism.

DETAILED DESCRIPTION OF THE DRAWINGS

Figure 4A:
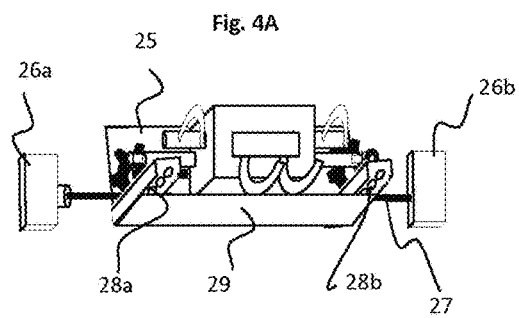
FIG. 4A shows a front view of a push-pull box holder with the push-pull box.

FIG. 1A shows an entire view of a Kitchen Automation (KA) apparatus, system, and method as laid out in a kitchen. FIG. 1A shows raw ingredients storage unit 600, collector Positioner 700, temporary holder 800, water positioner-jet sprayer 900, manipulator 1000, and cleaner 1100. This is just one embodiment out of many possible combinations of laying out different units of s Kitchen Automation (KA) apparatus, method, and system in accordance with one or more embodiments of the present invention. Another example for the layout could be that a cleaning unit 1100 can be in front of a manipulator section 1000, if the kitchen is not broad enough. In addition, a raw ingredients storage unit 600 can be in front of the temporary holder 800. The raw ingredients storage Unit 600 is explained in more detail in FIG. 2A.

FIG. 1B shows a block diagram of different components of a KA in accordance with one or more embodiments of the present invention and shows the directional flow of how the food is prepared starting from raw ingredients state to the final dish.

The following section explains components of FIG. 1A and FIG. 1B.

Raw ingredients are retrieved from the raw ingredients storage unit 600 via the collector 5600 shown in FIG. 27G using the collector positioner 700. The main computer 650 in FIG. 2B on the raw ingredients storage unit 600 in FIG. 1A controls all the different components of the KA, such as raw ingredients storage unit 600, collector 700, temporary holder 800, water positioner-jet sprayer 900, manipulator 1000, and cleaner 1100, in at least one embodiment. The main computer 650, microprocessor, or computer processor, may include computer memory in which data concerning food recipes for finished food products is stored. The raw ingredients storage unit 600 stores the raw ingredients. The manipulator 1000 contains all the devices used for manipulation of the ingredients. Basically, the raw ingredient in its whole form is converted to smaller pieces in one of the devices of the manipulator 1000. Also, the food is cooked using a device in the manipulator 1000. For example, a shredder device 1080 of FIG. 11A in the manipulator 1000 would take the ingredient from the raw ingredients storage unit 600 and cut it into small pieces and the pan fryer device 210 shown in FIG. 20A would cook it. Manipulator's 1000 components are shown in FIG. 6A.

Based on the system, the manipulator 1000 could be expanded to include many devices. Examples of devices inside the manipulator 1000 are:

a. Cutter 90 shown in FIG. 9—used to cut whole ingredient into smaller pieces;

b. Peeler 120 shown in FIG. 12A—used to peel the outer layer of some ingredients;

c. Shredder 1080 of FIG. 11A—used to chop, grate, cut ingredients into smaller pieces;
d. Grinder 165 shown in FIG. 14—to grind the food to paste or gravy or for juicing;
e. Meat mincer 125 shown in FIG. 13A—to mince the meat or grind it;
f. Dough maker 175 shown in FIG. 15A—make the dough for bread, pancake, pizza etc.;
g. Dough roller 3300 of FIG. 16—roll the dough to desired thickness;
h. Boiled egg shell remover (not shown in the present application)—removes the shell of an boiled egg; and
i. Bowl Transfer 3700 shown in FIG. 22B—To transfer a clean bowl from the cleaner to the collector.

Once the manipulator 1000 has converted the raw ingredient into required form as specified in the recipe in computer screen 650 of FIG. 1A, modified raw ingredient is transferred into an appropriate slot in the temporary holder 800 by collector 5600 device shown in FIG. 27G. temporary holder 800 is explained in more detail in FIG. 26A. If the Recipe requires heating, a heating device pan fryer 210 shown in FIG. 20A comes out of the Manipulator 1000 and the ingredients of the recipe will drop down on the heating device—pan fryer 210 shown in FIG. 20A. Main computer 650 shown in FIG. 2B, controls all the controllers shown in FIG. 37A in carrying out all the recipe steps from getting the raw ingredients to preparing the final dish. Washing of the plates, bowls and cutlery are done by the Cleaner 380 shown in FIG. 29A. Garbage, like the peel of vegetables or the residue from cleaning the temporary holder 800, is sucked by the garbage disposer 533 shown in FIG. 40). Water is provided by the water sprayer-jet positioner 900. Packing food 6 for take-out can be accomplished by a packing unit (not shown in the present patent application). Prepared food 5 is transferred into the bowl 6009 shown in FIG. 29D by a bowl transfer device 3700 of FIG. 22A located in the manipulator 1000

The connection 1 in FIG. 1A provides the communication link to temporary holder 800 and collector positioner 700 whereas the connection 2 in FIG. 1A provides the communication link to jet sprayer 900 and manipulator 600. Connection 3 in FIG. 1A provides communication to the cleaner device 1100.

The following paragraphs discuss each unit in detail:

FIG. 2A shows the Raw Ingredients Storage Unit 600 where all the raw ingredients are stored. Raw Ingredients Storage Unit 600 shown in FIG. 2A contains the push pull box row positioner 1200, stack of storage boxes 1400 shown in FIG. 5F and the computer 650. There are three sections in the raw ingredients storage unit: freezer section 602, refrigerated section 603 and the dry food section 601. Refrigerated section 603 has the liquids subsection to store liquids. Dry food section 601 has a spice subsection 606 to store spices and 'small portion' ingredients. To place the ingredients into the box slots 1401, 1402, 1403 and 1404 of FIG. 5B, a user would enter the first few letters of the ingredient on the screen 652 of the main computer 650 or scan the PLU (price lookup) code on the scanner 653 in the main computer 650. The appropriate box would pull out front and the user would directly place the ingredient into the indicated slot of the pulled out box 1400. Most of the freezer ingredients and the refrigerated ingredients can be loaded this way. But to store some of the dry ingredients, one would use the collector 5600 shown in FIG. 27G to load the ingredient into appropriate slot of the Box 1400. This loading mechanism is used to load the ingredients into hard to reach Box's 1400 slots. All these ingredients PLU (price look up) and their locations (slots) are stored in the database also.

FIG. 2B shows the main computer 650 also shown in FIG. 2A.

Figure 4B:
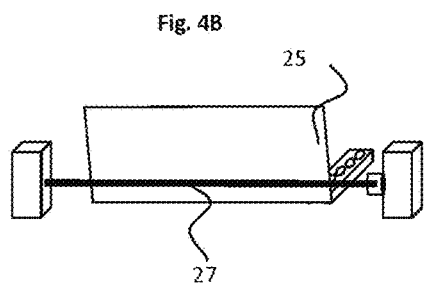
FIG. 4B shows a back view of the push-pull box holder without the push-pull box.
Figure 4C:
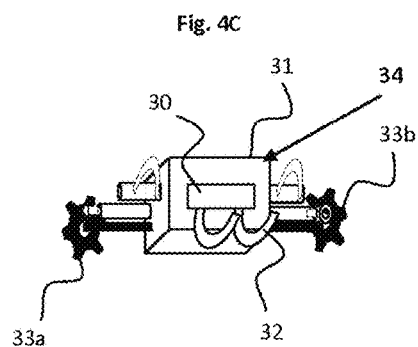
FIG. 4C shows the push-pull box which helps in pushing or pulling a block to unload an ingredient present in one or more slots.
Figure 4D:
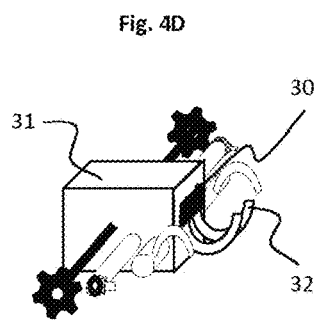
FIG. 4D shows a side view of the push-pull box that contains hooks that latch on to back and front slots.

FIG. 3A shows the push-pull box row positioner 1200 which would position the push-pull box 34 of FIG. 4C to the correct row and FIG. 3B is a side view of the push-pull box row positioner 1200 without the enclosing outer Box 1210. FIG. 3C is the driver cylindrical block 1300 which drives other cylindrical blocks 1205 and 1206 and it is the top cylindrical block 1300. The master controller would signal the row positioner 1200 to position the push-pullbox 34 to the correct row of boxes. Chains 1207a,1207b move the push-pull box holders 1201,1202 up or down to position it to the correct row that the ingredient need to be fetched. Top cylindrical block 1300 has a motor that rotates the cylindrical block 1304, making the chains 1207a/1207b rotate around the cylindrical block 1304. This would move the left push-pull box holder 1201 for the left block and right push-pull box holder 1202 for the right block vertically up or down. Push-pull box positioner straps 1203a, 1203b are fixed to the chains 1207a and 1207b, respectively. Controller wire 1204 is used to send a signal to push-pull box holders 1201, and 1202. Controller wire 1204 unwraps around the top cylindrical block 1300 when the push pull box 34 moves down and wraps around the top cylindrical block 1300 when the push pull box 34 moves up. Free rotating cylindrical blocks 1205 and 1206 provide stability to the chains 1207a and 1207b and prevent the chains 1207a and 1207b from swaying. Free rotating cylindrical blocks 1206 are attached to the left 1208a and right supports 1208b via the ball Bearings 1205. The bottom base 1209 provides support and stability to the entire system. Wheels 1301, 1302 are present for the chain 1207a and 1207b to rotate. Motor 1303 rotates the top cylindrical block 1300 and there are no motors for the other cylindrical block 1205 and 1206. If there is not enough power to the motor 1303, we can have one or two motors to the other cylindrical blocks 1205 and 1206 and they all should rotate in sync.

FIG. 4A shows the front view of push-pull box holder 1201/1202 with the push-pull box 34 shown in FIG. 4C. The push-pullbox 34 helps in pushing or pulling the block 1400 to unload the ingredient present in the slots 1401, 1402, 1403 and 1404 and to enable loading of ingredients. The push-pull box 34 shown in FIG. 4C sits on the push-pull box holder 25 shown in FIG. 4B when it is being positioned by the push-pull box row positioner 1200 shown in FIG. 3A. The push-pull box 34 shown in FIG. 4C, is held by the grooves 28a and 28b so that it would stay put in the holder 25 and does not roll over, when the holder 25 is moving vertically up or down. Blocks 26a and 26b hold the push pull box holder 25 in FIG. 4B to the chains 1207a and 1207b. The axle 27 provides support to the push-pull box holder 25. Back support 25 and base Support 29 together hold the push-pull Box 34 shown in FIG. 4C.

Push-pull box 34 shown in FIG. 4C has three functionalities. They are: a) To push or pull the box 1400 that contain the slots 1401, 1402, 1403 and 1404. b) To slide open or close the back slots 1401 and 1402 c) To rotate open or close the front slots 1403 and 1404. It is accomplished by six motors (not shown in the figures) which are located in the motor box 31: 1) one motor to rotate the wheels 33a and 33b so that the push pull box 34 can roll back and front. 2) one motor to rotate the hook rotator 30 to latch the hooks 32 to the hook latch 1406 of the box 1400. This will help in pushing or pulling the whole box 1400. 3) two motors—one each to rotate the hooks 40a and 40b on both the sides, so that the hooks 40*a* and 40*b* can anchor to the slot base 41 to slide open the back slots 1401 and 1402. 4) two motors—one each to rotate the bevel gear 52 on either side of the push pull box 34, so that the front slots 1403 and 1404 can open.

Figure 5A:
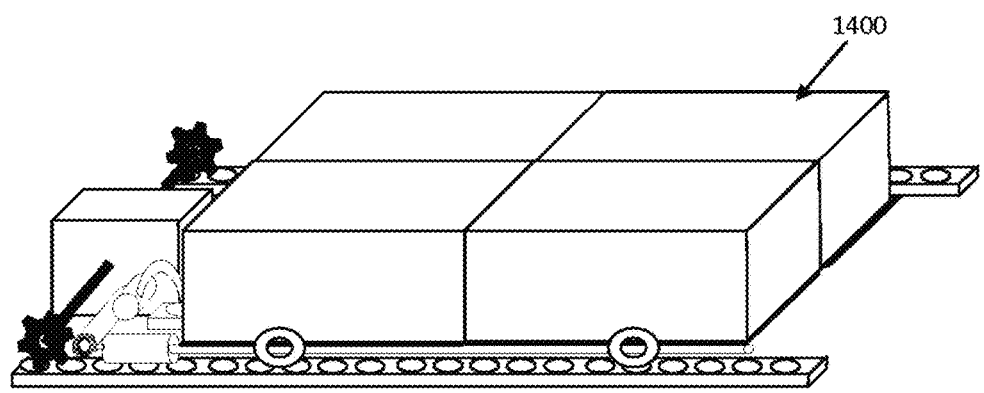
FIG. 5A shows a single box that contains four slots along with the push pull block and the bases of the slots.
Figure 5B:
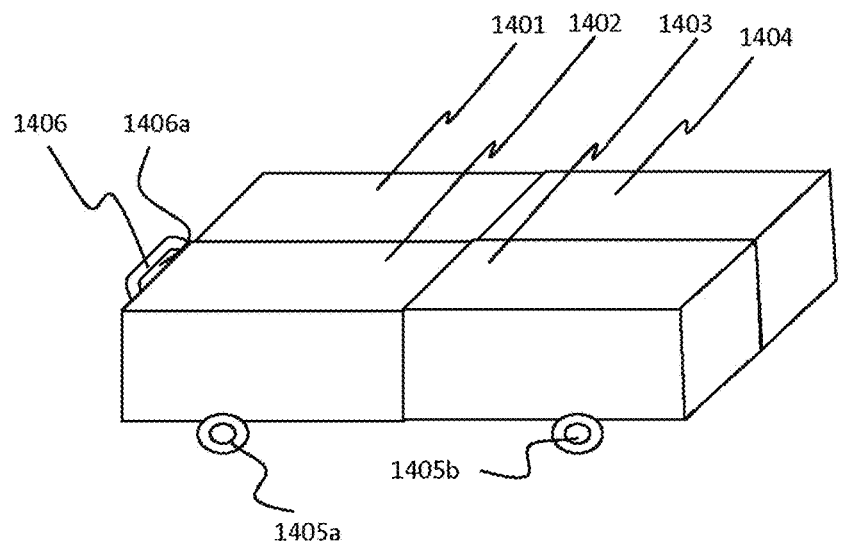
FIG. 5B shows a box that rolls on four wheels and has four slots for storing ingredients.

FIG. 5A shows a single box 1400 with the push-pull box 34 positioned to push the box 1400. FIG. 5B shows a box 1400 that rolls on four wheels 1405*a* and 1405*b*. The wheels 1405*a* and 1405*b* make the box 1400 slide front and back. A box 1400 contains four rectangular slots in it: Slots 1401, 1402, 1403, and 1404 or 1402 These slots 1401-1404 are where the ingredients are stored. Slots 1401 and 1402 are back slots whereas Slots 1403 and 1404 are front slots. The hook latch 1406 allows the push-pull box's Hook 32 shown in FIG. 4C to anchor in its socket 1406*a*.

Figure 5C:
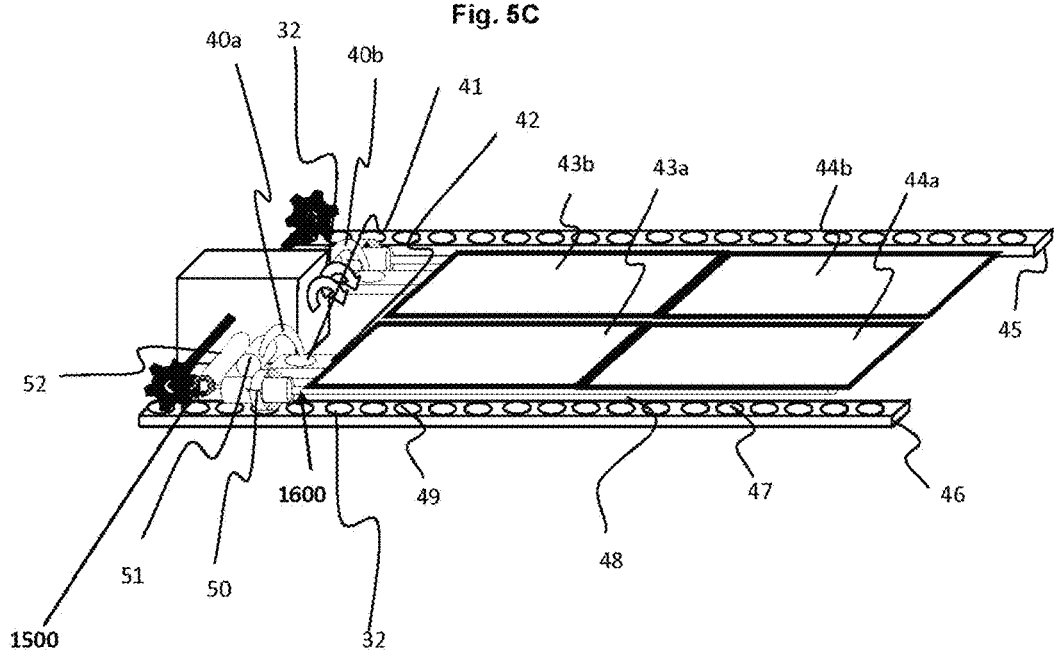
FIG. 5C shows a push-pull box along with back slider bases and front flipper bases without the box of FIG. 5B.

FIG. 5C shows the push-pull box 34 in FIG. 4C along with the front flipper bases 44*a* and 44*b* and sliding back bases 43*a* and 43*b* of the ingredient slots 1401, 1402, 1403 and 1404. Push-pull box 34 shown in FIG. 4C has spiked wheels to roll over the left holed strip 46 and the right holed strip 45, thereby pushing or pulling the box 1400.

Figure 5D:
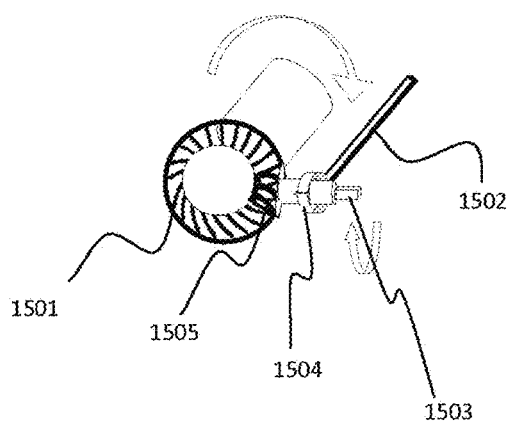
FIG. 5D is an exploded view of a bevel gear mechanism to rotate the front flipper base.
Figure 5E:
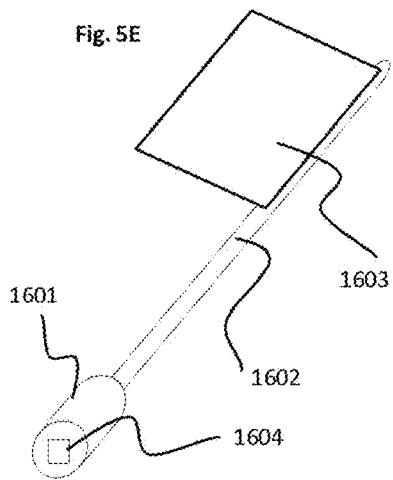
FIG. 5E is an exploded side view of a front flipper base rotator.

FIG. 5D shows the bevel gear mechanism 1500 that opens the front flipper bases 44*a* and 44*b* to unload the ingredients into the collector using gravitational force. Suppose an ingredient that is stored in the front left slot 1403 needs to be unloaded. The push-pull box shown in FIG. 4C rolls front and positions itself. The X-axis bevel gear 1505 has a rectangular shaped extension 1503 that anchors into the rectangular dip 1604 of the front flipper base rotator 1600 shown in FIG. 5E). The X-axis bevel gear 1505 stays in position by the ball bearing mechanism 1504 via the link 1502 that is connected to the push-pull Box 34 of FIG. 4C. The front flipper base 1603 is attached to the flipper base rotator 1600 shown in FIG. 5E via the connecting rod 1602 and dip case 1604. When the left bevel gear shaft 52 rotates, it makes the left front flipper base rotator 1600 shown in FIG. 5E rotate and that would make the front flipper base 1603 open. The ingredient in the front slot 1404 is dispensed and collected by the collector 5600 shown in FIG. 27G. Next, the bevel gear 1505 rotates in the opposite direction which would make the left front flipper base 1603 to close.

Referring to FIG. 5B, assume an ingredient that is stored in the back left slot 1402 needs to be unloaded. The push-pull box 34 shown in FIG. 4C rolls front and positions itself in front of the slider base 43*a* of FIG. 5C. The slider base hook shaft 51 rotates which would make the slider base hook 40 to anchor to the back slot's slider base 42 through the slider base hole 41 of the slider base 42. The motor of the push-pull box 34 shown in FIG. 4C rotates so that it moves back. Since the hook 40*a* is anchored to the slider base 43*a*, the slider base 43*a* slides back along with the push-pull Box 34. The ingredient in the back slot 1402 falls down and is collected by the collector 5600 shown in FIG. 27G. Next, the push-bull box 34 shown in FIG. 4C rotates to move forward. This makes the slider base 42 move forward and that closes the back slot 43*a*.

FIG. 5F shows stack of four boxes 1400 in two blocks—left and right. The ingredients are assigned the SlotID for the slots in the box that they are stored. Starting from the bottom row in FIG. 5F, row numbers start sequentially from eleven to ninety nine (these are the identification numbers of the rows). Row eleven is the 1st bottom row 66*a* and 66*b*, Row twelve is the next row 65, Row thirteen is 64, Row fourteen is 63*a* and 63*b*, and so on. The row numbers eleven through seventy five form the first two digits of the raw ingredients storage Unit 600 slotID and the numbers from seventy five through ninety nine is assigned for temporary holder slotIDs.

Referring to FIG. 5G, there are two vertical blocks: left block 61 indicated by L and right Block 62 indicated by R. Left front slot 67 is assigned the number 1*a*. Right front slot 68 is assigned the number 2*a* and back slots are assigned 3*a* for left 70 and 4*a* for right 69.

FIG. 5H shows the database table that has the slotID and the IngredientID stored along with the quantity of the ingredient and the unit used for the specified quantity. SlotID 71 is a four character ID in the format digit-digit-alphabet-digit. The first two digits stand for the Row number starting from 11. The last digit can be one "1", "2", "3" or "4" for the specific slot. The alphabet letter stands for the left or the right Block. For example, 32R2 indicates 32nd row, Right block and 2nd slot which is the right block's 66*a* right front slot.

FIG. 6A shows the Manipulator 1000 shown in FIG. 1A. The Manipulator 1000 shown in FIG. 1A includes many individual devices that are used to manipulate the raw whole ingredient. Each device is enclosed inside a device Box as shown by FIG. 7B. These device Boxes, as shown by FIG. 7B, are stacked on top of each other. FIG. 6B shows the manipulator devices 1800*a* and 1800*b* stacked up inside the manipulator box 75. There may be two device boxes 1800*a* and 1800*b* shown in FIG. 7B in one row next to each other or just one device box shown in FIG. 7B spanning the entire row depending upon the size of the device. An entire stack of these device boxes are enclosed by an outer manipulator box 75 with the opening on the sides so that the devices can roll out. The device boxes 1800*a* and 1800*b* are separated by rows of separator support bases 85 shown in FIG. 8A. Depending upon the device, at least two of the device box's shown in FIG. 7B, (FIG. 7B) sides can open. One side of the device box 79, shown in FIG. 7B, usually the top side, is used for the ingredient to drop into the device and the other side (mostly the bottom side) is used to collect the manipulated ingredient.

Figure 7A:
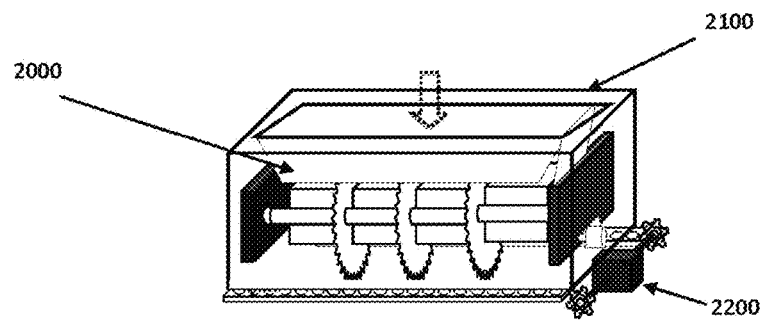
FIG. 7A shows an example manipulator device—cutter inside a device box along with a mechanism to roll the device.
Figure 7B:
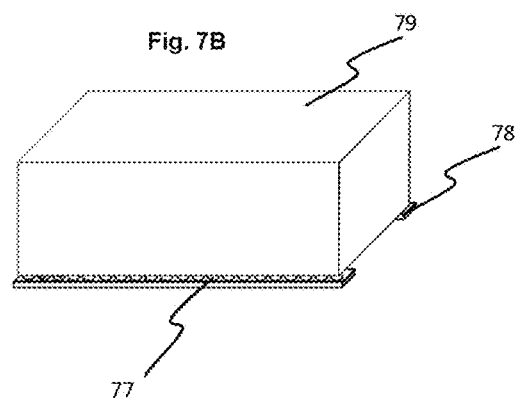
FIG. 7B shows an outer box of a manipulator device with a grooves rack underneath to facilitate rolling of the particular manipulator device.
Figure 7C:
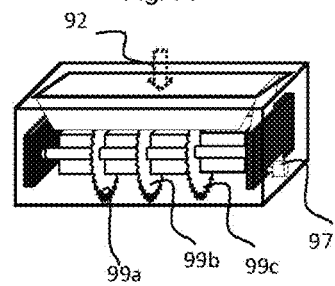
FIG. 7C shows an example manipulator device.
Figure 7D:
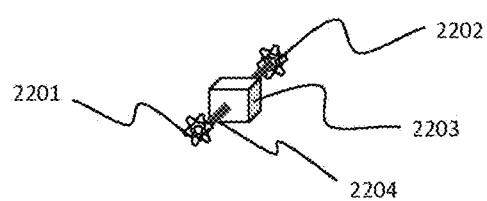
FIG. 7D shows a back wheel mechanism of a device box that rolls out a manipulator device.

FIG. 7A shows an example manipulator device—Cutter, inside of a device box 2100 along with the mechanism to roll the device. FIG. 7C shows an example manipulator device without the enclosing device box or the base. FIG. 7D shows a back wheel mechanism of a device box that rolls out the manipulator device 1800*a*/1800*b*. Each of device Boxes shown in FIG. 7B can roll front and back just as a kitchen drawer opens and closes. The difference here is that the opening and closing of the device box, shown in FIG. 7B is automated and the wheels rotate via the motors attached to them. The front wheels 89*a* and 89*b* shown in FIG. 8B rotate but do not roll front or back whereas the back wheels 2201 and 2202 shown in FIG. 7D roll front to open the device Box shown in FIG. 7B drawer. The back wheels 2201 and 2202 rolls backwards to close the Device Box 79, shown in FIG. 7B.

Figure 8A:
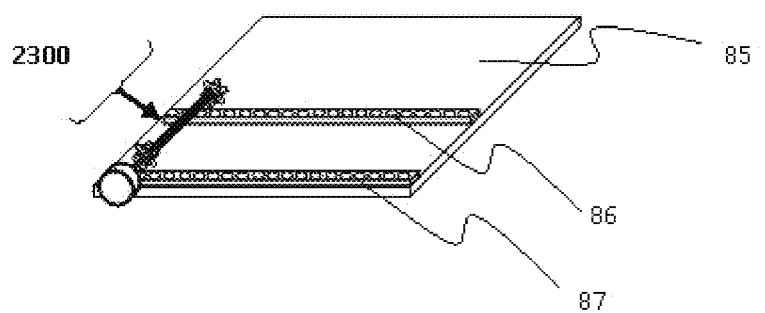
FIG. 8A shows a device box separator and a base for the device box separator.
Figure 8B:
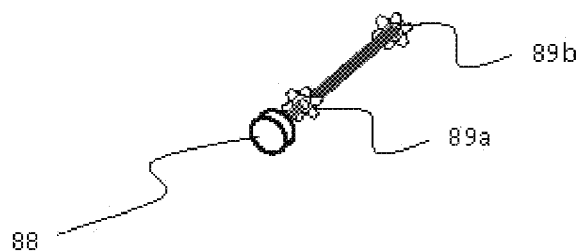
FIG. 8B is a front wheel of the device box that does not roll but its rotation would enable the device box to roll.

FIG. 8A shows a device box separator base 85 for the device. Front wheels 89*a* and 89*b* shown in FIG. 8B, rotate below the device box groove bars 77 and 78 of FIG. 7B thereby pushing the device box groove bars 77 and 78 along with the device box (FIG. 7B) attached to it. Back wheels 2201 and 2202 of FIG. 7D rotate on the separator groove bars 86 and 87. Combination of these two sets of wheels helps to roll the device box shown in FIG. 7B out of the manipulator box 75 of FIG. 6A or into the manipulator box 75. If the wheels 89*a* and 89*b* rotate anti-clockwise, then the device box 79 opens and if the wheels 89*a* and 89*b* rotate clockwise, then the device box 79 closes.

Figure 9:
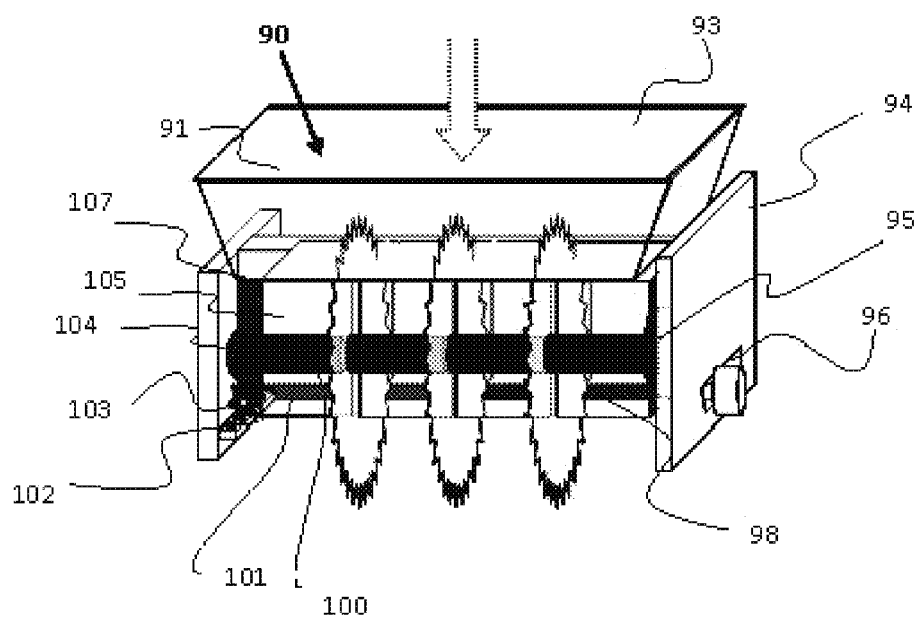
FIG. 9 shows a manipulator device—cutter, which is used to dice bigger whole piece to medium pieces.
Figure 10:
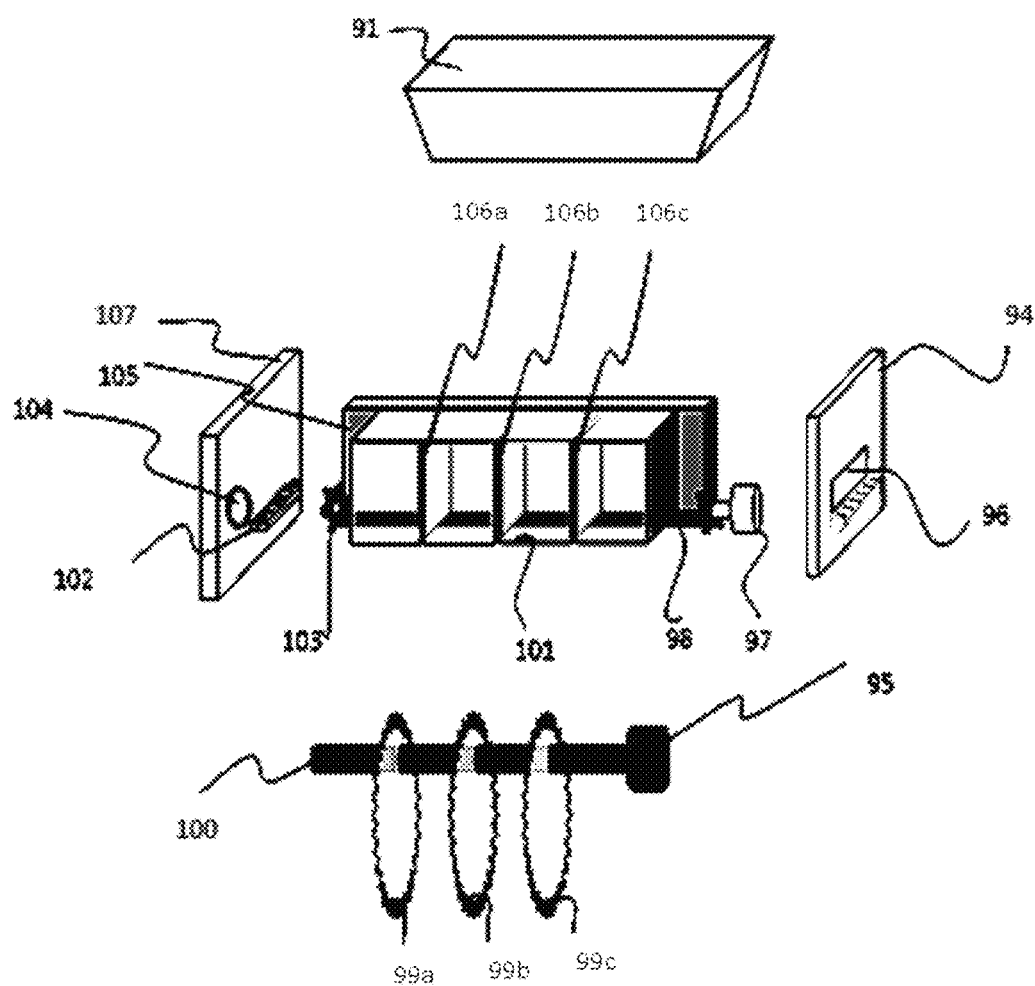
FIG. 10 shows an exploded view of the cutter of FIG. 9.

The devices of the manipulator 1000 are shown without the enclosing device box shown in FIG. 7B and the device box's back wheels 2202 shown in FIG. 7D. The devices inside the Manipulator 1000 are:
a. Cutter 90 shown in FIG. 9;
b. Shredder 1080 shown in FIG. 11A;
c. Peeler 120 shown in FIG. 12A;
d. Mincer 125 shown in FIG. 13A;
e. Grinder 165 shown in FIG. 14;
f. Bread/Dough Maker 175 shown in FIG. 15A;
g. Dough Shaper/Sizer 3100 shown in FIG. 17;
h. Dough Pieces Holder 3200 shown in FIG. 18A;
i. Tortilla Maker 3300 shown in FIG. 19A;
j. Pan Fryer 210 shown in FIG. 20A;
k. Deep Fryer 230 shown in FIG. 21A;
l. Bowl Transferor 3700 shown in FIG. 22A;
m. Pizza Topper 4000 shown in FIG. 24A;
n. Pizza Baker 4100 shown in FIG. 25A;

FIG. 9 is a manipulator device—Cutter 90 that is used to dice a whole piece into medium pieces so that it can be directly placed into the ingredient holder of other Manipulator devices. Most of the devices in the Manipulator 1000 shown in FIG. 6B cannot take the whole ingredient, since some of the ingredients are quite big. Some of the examples for the big whole ingredients are cauliflower, cabbage, whole meat, etc. Cutter 90 shown in FIG. 9 is used in those cases. FIG. 10 is the exploded view of the Cutter device 90. It contains the outer box 93 and encloses the following parts: right side supporter 94 provides support and has a opening for the motor shaft to move the cutter box holder 105 front and back. top tray 91 is where the uncut ingredient from the collector drops 92 in and then goes into the cutter box 101 where the ingredient is cut by the three blades 99a, 99b, 99c which rotates via the shaft 100 inside the cutter box's gaps 106. Blades 99a, 99b, 99c, right side supporter 94 and left side supporter 107 do not move. Motor 95 is used to rotate the blades 99a, 99b, 99c. There is an opening 96 for motor 97 and shaft 98 to roll front and back. Motor 97 moves the cutter box 93 front and back as the blades 99 cuts the ingredient. Shaft 98 for the motor 97 holds and moves the cutter box holder 105 that provides support for the cutter box 101 and rack 102 on which the left wheel 103 moves. Left side supporter 106a also provides support to the blades via the blade shaft 100. It has the round aperture 104 where the shaft 100 sits and rotates in this aperture 104. Left side supporter 107 has the rack 102 where the left wheel 103 rolls.

FIG. 11A shows another manipulator device called a shredder 2600 that is used to cut ingredients into different kinds of pieces depending upon what shape of ingredient is desired for the recipe. There are different kinds of blades in the shredder 1080. Depending upon whether we are slicing, cutting, chopping, grating, dicing julienne or batonnet or brunoise etc., corresponding blade is chosen from the stack of blades stored in the blade storage 2400 by the blade selector 2500 shown in FIG. 11B. A microcontroller 7400 shown in FIG. 37A embedded inside blade selector 2500 facilitates the blade selection process. The uncut ingredient goes at the top 112 of the cutter 90. Holder 113 holds the shredder-collector 116, temporary ingredient holder 115 and the motor holder 118.

The shredder 1080 shown in FIG. 11 includes three parts: Blades storage 2400 where different kinds of blades are stored. Blade selector 2500 shown in FIG. 11B has a blade selector Arm 2503 that can move vertically up or down to select a blade 111 by its grippers 2501 and 2502. Depending upon the type of cut that is needed, the Blade selector arm 2503 selects the appropriate blade 111 by moving up or down and then rotates one hundred and eighty degrees, and places the selected blade 111 on the shaft's hexagonal top end 2604 of the blade rotator 2609 shown in FIG. 11C. The blade rotator 2609 shown in FIG. 11C rotates the selected blade 111 using the shaft 2608 and cuts the whole ingredient into smaller pieces. The blade gripper 110 has two grips: top Grip 2501 and bottom Grip 2502. The top Grip 2501 moves up and down and has a sensor that can sense whether the blade 2607 is correctly placed on the hexagonal rotational shaft 2608. Sensing is done by loosening the blade 111 and then checking for complete contact to the bottom grip 2502 of the gripper 110. If the blade 111 is aligned properly, it should not have any contact with the top grip 2501 of the gripper 110. If the blade 111 has the contact with the top gripper 2501, then that would mean that the blade 111 is not aligned properly. The gripper 110 should grip and then rotate the blade 111a bit to align the blade 111 to check for contact with the top gripper 2501. The process repeats until the top gripper 2501 does not have contact with the blade 111, when loosened. Once the blade 111 is positioned on the rotator shaft 2608, the blade 111 is ready to start the cutting process. Before starting the blade 111 rotation, the ingredient is stored in temporary ingredient holder 115. The rotator is started and the cutting of the ingredient to the desired shape takes place. As the ingredient is being cut, it drops into the shredder collector 116. The collector 5600 shown in FIG. 27G is held by the collector base 2607.

Once the ingredient is cut into smaller pieces, the chosen blade 111 is placed back into the blade storage 2400 after cleaning. The shredder's collector 116 moves up by using the collector lifter 2606. The collector 2603 along with the collector base 2607 rotates one hundred and eighty degrees around Y-axis in the horizontal plane. Then the collector base 2607 rotates further ninety degrees. When the collector base 2607 alone rotates, all the shredded ingredients falls down to the collector 5600 shown in FIG. 27G. Collector 5600 shown in FIG. 27G transfers the contents into a specified slot of the temporary holder slots 4501 shown in FIG. 26D.

Figure 12A:
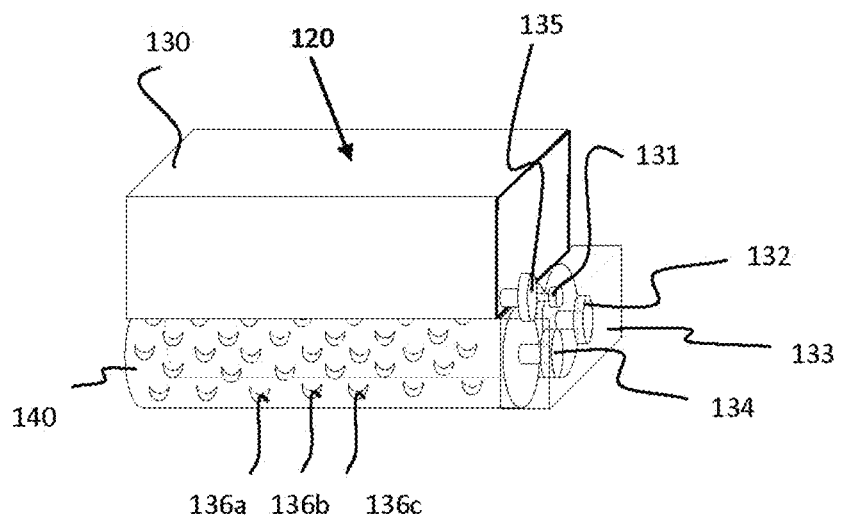
FIG. 12A shows another manipulator device—a peeler with an ingredient Box closed, which is used to peel the outer skin of vegetables or fruits.

FIG. 12A shows a Peeler 120 to peel the outer skin of vegetables or fruits. Unpeeled vegetable/fruit is loaded on top 137 of the peeler 120 into the peeler box 130. The peeler 120 includes three rollers which have small grooves 136a, 136b, and 136c that act as a blade to peel the vegetable or fruit. The middle roller 141 is smaller and it sits in between the front Roller 140 and the back Roller 142. Motor 131 rotates the middle roller. Motor 134 rotates the front roller Motor 132 rotates the back roller. Motor box 133 houses the three motors for the rollers.

All the rollers 140, 141, and 142, rotate clockwise when peeling. If the peeling does not happen as expected, the middle roller 141 can be programmed to rotate anti-clockwise. The peeling process is tested for different vegetables/fruits and the individual rollers are programmed according to the chosen vegetable/fruit. The front panel 138 of the peeler box 130 opens once peeling is done and the peeled ingredient is unloaded. Motor 135 rotates so that the front panel 138 of the peeler box 130 opens to unload the peeled ingredient. The back roller 142 is at a little higher level so that when the peeling is done, peeled vegetable can roll down 139 to the front. The three rollers 140, 141, and 142 will rotate anti-clockwise to facilitate the unloading of the peeled vegetable/fruit.

Figure 13A:
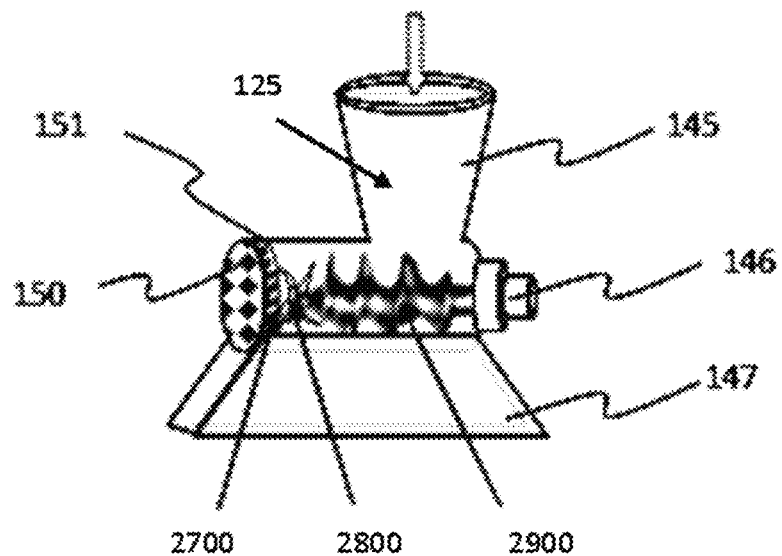
FIG. 13A shows another manipulator device—a mincer to mince meat.
Figure 13B:
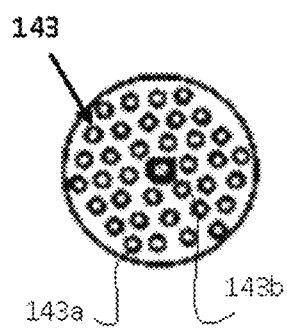
FIG. 13B shows a side view of a holes plate used in the mincer of FIG. 13A.
Figure 13C:
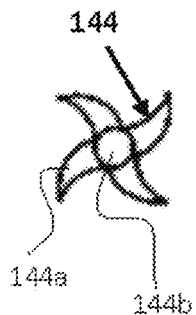
FIG. 13C shows a side view of a blade used in the mincer of FIG. 13A.
Figure 13D:
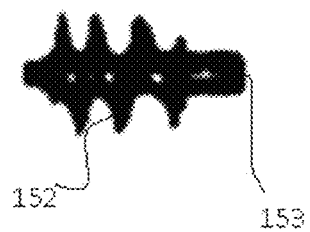
FIG. 13D shows a front view of a feeder screw used in the mincer of FIG. 13A.

FIG. 13A shows a mincer 125 used to mince meat. The configuration of the mincer is based on meat grinders that are previously known in the market except that the mincer 125 operation is automated. The process of feeding the meat and the grinding speed and taking the minced meat out and placing it on the collector are all controlled by the microcontroller 7017 shown in FIG. 37A. The mincer 125 does not have the handle like the previously known mincer we see in the market, since this is one of the devices in the KA's Manipulator section 1000. The handle 153 show in FIG. 13D is operated by a motor 146 which will rotate when required. The ungrounded meat goes in the top funnel 145. The mincer 125 is supported by the base 147. Feeder screw 152 shown in the FIG. 13D will push the meat towards the blade 144 shown in FIG. 13C and the Holes Plate 143, shown in FIG. 13B minces the ground meat and the minced meat falls out.

Figure 14:
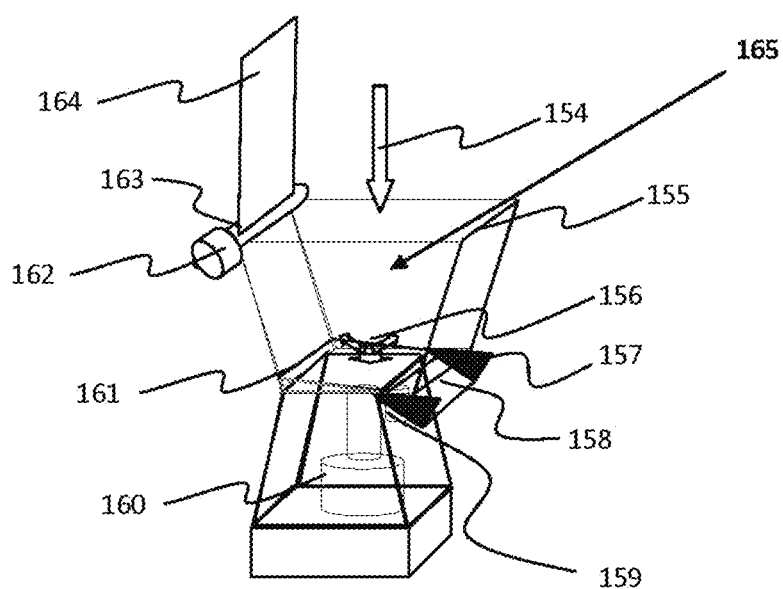
FIG. 14 is another manipulator device—a grinder used to grind ingredients into a paste or to make a juice/smoothie.

FIG. 14 shows a grinder 165 that is used to grind the ingredients to desired paste form. Texture of paste can be controlled by the controller software of computer 650. Software selects the appropriate speed and time for the motor 162 that controls the blade 161 in the grinder 165. Depending upon the dish we are preparing, we can set to make fine paste or coarse paste or medium paste, etc. This grinder 165 is also used to make juices, smoothie, ice-cream etc.

Ingredient to be ground drops from the collector 5600 shown in FIG. 27G through the top of the grinder's opening 154 into the ingredient holder 155. The top cover 164 closes when the motor 162 rotates. The top cover 164 is attached to the top cover shaft 163 of the motor 162. The grinder blade 156 starts to grind the ingredient. Once the ingredient is ground, the valve 157 opens the bottom tray. At the same time grinding motor 162 rotates at a slow speed to enable the ground item to slowly flow out through the tray 158 to the collector 5600 shown in FIG. 27G. Base 161 is slanted so that the ground item can flow out through the tray 158 due to gravity. High performance motor 160 operates the grinder blade 156. Grinder motor 159 controls the Valve to open or close the tray 158.

Figure 15A:
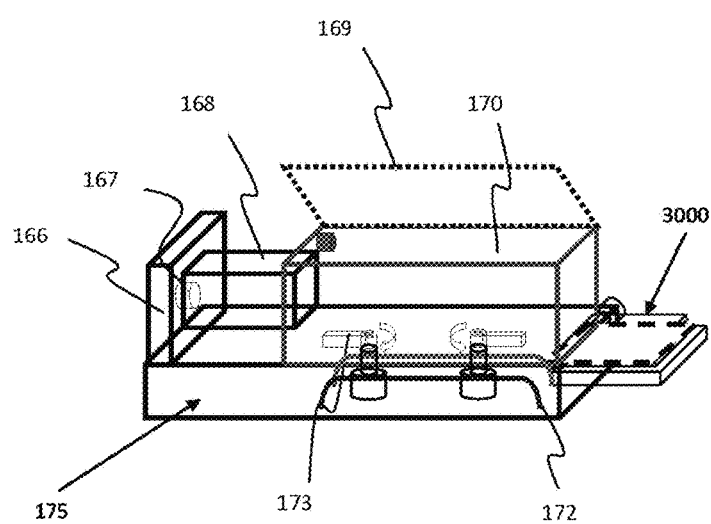
FIG. 15A shows a bread/dough maker that is used to make the dough and/or bake bread.

FIG. 15A shows the Bread/Dough Maker 175 that is used to make the dough and/or bake bread. Dough making is done using this device by only initiating the dough process and not starting the baking process. It can make fresh dough for tortilla, pita bread or the pizza base. With the Bread Maker device 175 in the KA, we can make fresh bread and we can have different types of breads. By altering the ingredients, user can choose from a variety of breads. This is yet another example of the versatility of the KA. A user may not have heard many of these breads yet the ingredients that go into these breads are more often liked by the user. So, the user can experiment and try these new kinds of breads using the KA without the hassle of following a recipe and preparing it.

Figure 15B:
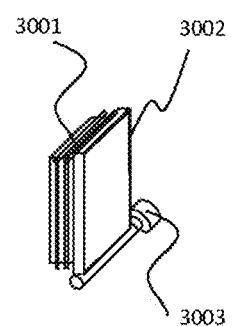
FIG. 15B shows a door of the bread/dough maker of FIG. 15A.

The Bread/Dough Maker 175 may include the dough box 170 where the raw flour goes in. A top door 169 opens so that the ingredients (flour, oil, water, etc) can drop into the dough box 170. Two blades 173 are used for kneading the dough. Heating unit 172 helps in baking. Once the blades 173 are done with kneading, they collapse. That is, they retract downwards, so that the dough can be easily pushed out. Once the bread is baked or the kneading is done, bread/dough pusher 168 pushes the bread/dough out through the doors 3000. The door 3000 shown in FIG. 15B has three linings 3001 so that the liquids (oil and water) that are added during kneading does not seep out. The outer door's edges 3001 are lined with a soft plastic. The motor 3003 operates the door 3000 shown in FIG. 15B. Bread/dough pusher 168 is supported by the left Support 166. Motor 167 is used to push the bread pusher 168.

Figure 16:
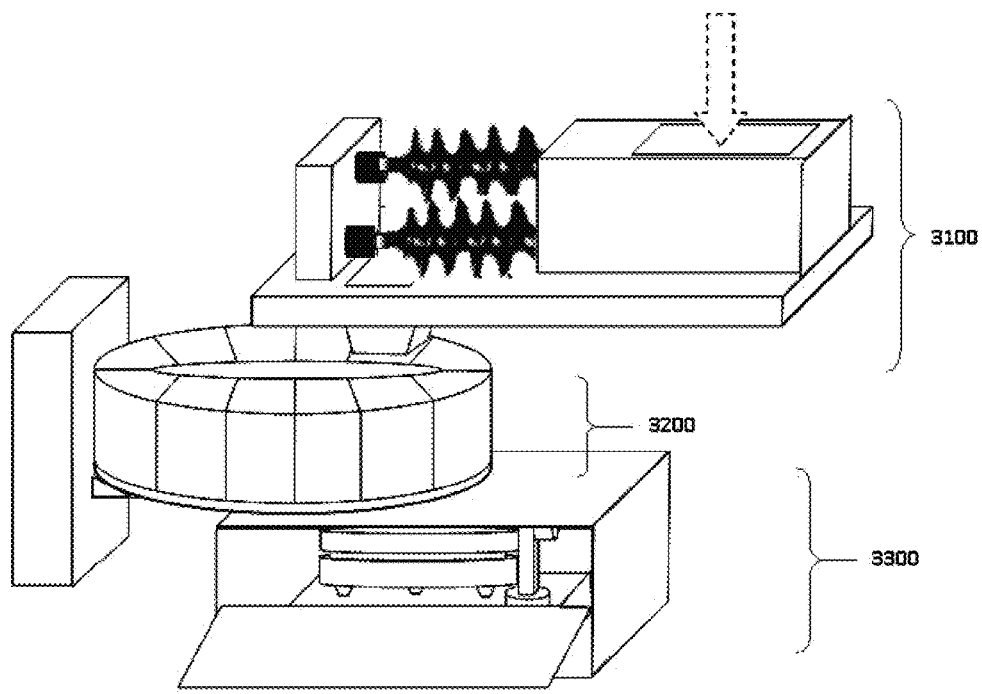
FIG. 16 shows three devices-dough shaper/sizer, dough pieces holder and tortilla maker used in conjunction to make flat bread.
Figure 17:
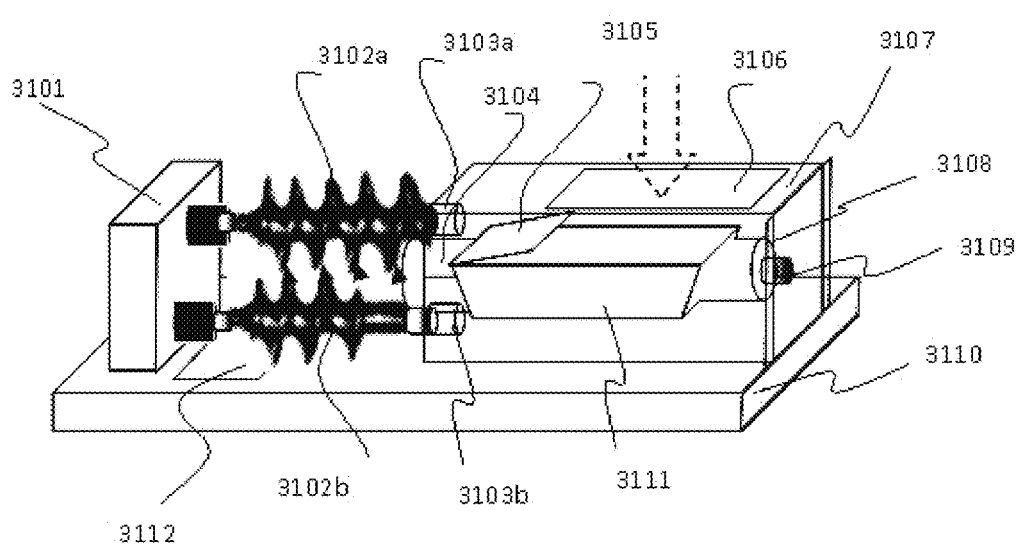
FIG. 17 shows the dough shaper/sizer to shape the dough from a big lump into smaller round shaped balls.

FIG. 16 shows three devices that work in sequence: dough shaper/sizer 3100, dough pieces holder 3200 (FIG. 18) and tortilla maker 3300 (FIG. 19). Dough Shaper/Sizer 3100 and its components are shown in FIG. 17. Dough Pieces Holder 3200 and its components are show in FIG. 18A. Tortilla Maker 3300 and its components are show in FIG. 19A. These three components are explained in more detail in the following paragraphs.

FIG. 17 shows the dough shaper/sizer 3100 where the whole dough is cut into pieces and the pieces are made into round balls. Once the dough is made using the Bread/Dough Maker 175 shown in FIG. 15A, the whole dough is then dropped through the opening 3106 into the dough tray 3111. Dough pusher 3108 pushes the dough that is inside the dough tray 3111. dough pusher motor 3109 operates the dough pusher 3108. Dough duct 3104 is where the dough gets pushed into the spiral blades 3102a and 3102b. Two spiral blades 3102a and 3102b rotate in opposite direction to each other. The first spiral groove 3102a/3102b cuts the dough into a piece of predetermined size. The rest of the grooves would knead the piece into round shape. Then the rounded ball drops out through the outlet 3112. Side support 3101 holds the blades 3102a and 3102b in position. Dough spill blocker 3105 prevents the dough from falling out of the dough box 3107 when the dough is pushed via the dough duct 3104. Motors 3103a and 3103b rotate the spiral blades 3102a and 3102b. The dough box 3107 is an outer enclosure for the dough tray 3111, pusher 3108, duct 3104 and also holds the motors. The dough shaper base 3110 holds all the parts of the dough shaper/sizer 3100.

FIG. 18A shows the dough pieces holder 3200 which is used to temporary collect the individual round shaped dough from the dough shaper/sizer 3100 and then to dispose the round shaped dough to the tortilla maker 3300 by rotating the circular slots at specific times.

FIG. 18B shows the top view of the dough pieces holder 3200.

FIG. 18C shows the exploded view of the dough pieces holder 3200 with different parts of the device. Two motors are used in the dough pieces holder 3200. One motor, called the slots motor 3207, for rotating the slots 3201 and the second motor called the base motor 3208 for rotating the circular base 3202. Dough will drop into the slots 3201 from the dough shaper device 3100 shown in FIG. 17 at regular intervals. When collecting the dough from the dough shaper/sizer 3100, both motors 3207 and 3208 rotate in sync with each other. The slot motor 3207 and the base motor 3208 would rotate the slots 3201 and the base 3202 in steps related positions, so that the tortialla maker 3300 can collect the dough pieces at certain intervals, say every thirty seconds. This time interval is based on how much time the dough shaper device 3100 will take in shaping the dough into smaller pieces. When placing the dough piece into the tortilla maker 3300 shown in FIG. 19A, only the slot motor 3207 rotates. Since all the slots 3201 are open at the top and the bottom, the individual dough pieces will sit on the bottom base 3202 inside a slot of the slots 3201. Only one slot in the bottom base 3202 is open. So, when the circular slots 3201 rotate and the bottom base 3202 does not rotate, the dough balls move and the one opening 3206 in the bottom base 3202 will make dough in the particular slot of slots 3201 fall down. Slots axle 3203 rotates the slots in steps. Base axle 3204 rotates the bottom base 3202 in steps. Side support 3205 provides support for all the parts of this device 3200. Base support 3209 provides support for the motors 3207, 3208 and axles 3203, and 3204.

FIG. 19A shows the tortilla maker 3300. FIG. 19B shows the tortilla maker without the outer enclosing box 3301. This tortilla maker 3300 could also be used to make Indian Roti, Mediterranean Pita, etc. Tortilla maker 3300 has two pans (3303 and 3307) with heating element embedded in each of the pans. Upper pan 3303 can rotate in the horizontal plane and it can also move vertically up or down. The whole unit is enclosed within an outer box 3301 with opening 3302 on the top so that the dough can fall onto the lower pan 3307.

To make a tortilla, the upper pan 3303 is swung open in the horizontal plane so that the dough drops onto the lower pan 3307 without the upper pan 3303 obstructing it. Upper pan 3303 swings back to its original position. Upper pan 3303 slowly lowers down making the round dough flat. After the dough is completely flat, heating elements in the upper pan 3303 and lower pan 3307 starts to heat the tortilla. Upper pan 3303 slowly lifts up allowing the tortilla to swell up. Upper pan 3303 lifts up and the side pusher 211 pushes the tortilla out through the outlet 3306 on the side so that the finished tortilla can come out. Motor 3304 lifts the upper pan 3303 up or down. Motor 3305 rotates the upper pan 3303 in horizontal axis.

FIG. 19C shows the pizza dough docker 3400 to make holes for pizza dough or any other pastry. Making small indentations on the flat dough would eliminate the formation of air bubbles when the dough is baked. It is operated by a motor 212 which rotates the dough docker 3400 over the top of the dough when the dough needs to have holes. The motor 212 would rotate the dough docker 3400 away when dough does not need holes.

Figure 20A:
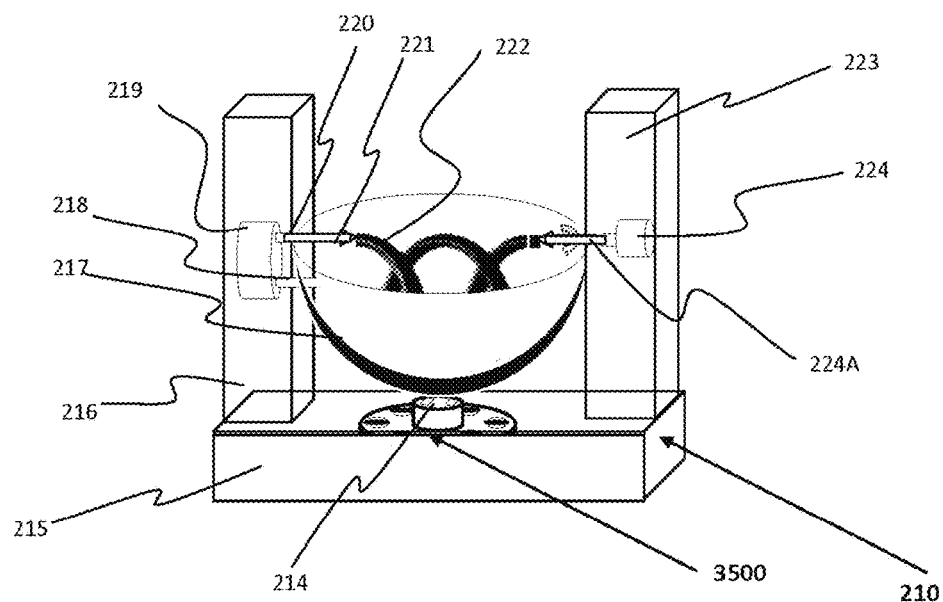
FIG. 20A shows a pan fryer which is used to cook stir fried recipes.
Figure 20B:
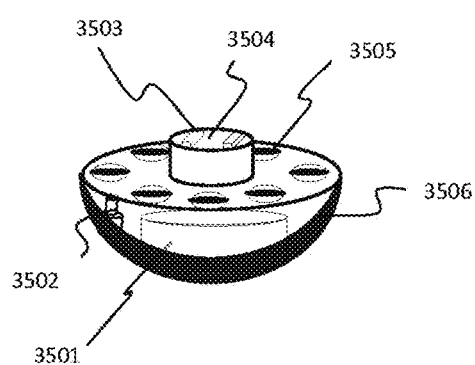
FIG. 20B shows a pan rotator-burning unit that uses gas as the heat source.

FIG. 20A shows the pan fryer 210 which is used for stir fry based recipes as well as curry based recipes. This is the most versatile device that can be used to cook any dish that requires mixing and heating. It can also be used only to mix without initiating the heating process. The pan fryer 210 has the following components: the pan 217, left support 216, which has the fixed left handle 221, right support 223 that has a rotatable right Handle 224A and the base 215 which houses the pan rotator-burning unit 3500. Pan rotator-burning unit 3500 components are shown in FIG. 20B. Pan 217 sits on the pan rotator 226 of FIG. 20C (3504 of FIG. 20B) with the grooves 225 of FIG. 20C (3503 of FIG. 20B) and the groove inlet 214 holding the pan 217. Spatula motor 224 rotates the rotatable right handle 224A which rotates the spatula 222 around the horizontal axis. Pan 217 rotates around the vertical axis while cooking by using the pan rotator 226 of FIG. 20C. After heating and mixing is done, pan fryer 217 rotates three quarters of a way way around the horizontal axis to pour out the cooked ingredients that are inside the pan 217. The cooked ingredients are collected by the collector 5600 of FIG. 27G or a plate 388 shown in FIG. 29A. Pan 217 rotates three quarters (¾) of the way by the use of pan tilter motor 219 which rotates anti-clockwise. This makes left tilter bar 218 go down and the right tilter Bar 220 go up. This makes the pan fryer 217 tilt front. The base of the pan fryer 217 rotates around the grooves 225 within the groove inlet 214.

Figure 20C:
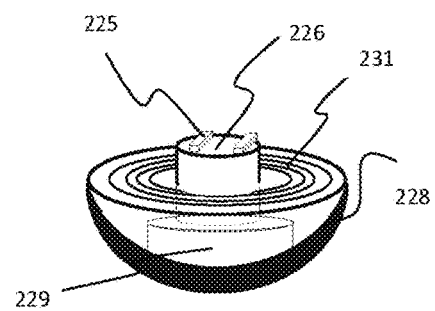
FIG. 20C shows the pan rotator-burning unit that uses electric as the heat source.

FIG. 20B shows the pan rotator-burning unit 3500 that uses gas whereas FIG. 20C shows the pan rotator-burning unit that uses electric as the heat source. Gas holes 3505 provide the outlet for the flame. Pan Rotator motor 3501 rotates the pan rotator 3504. The ignition switch 3502 provides the ignition to the gas holes 3505. In the electric version, electric coils 231 acts as the heat source.

Figure 21A:
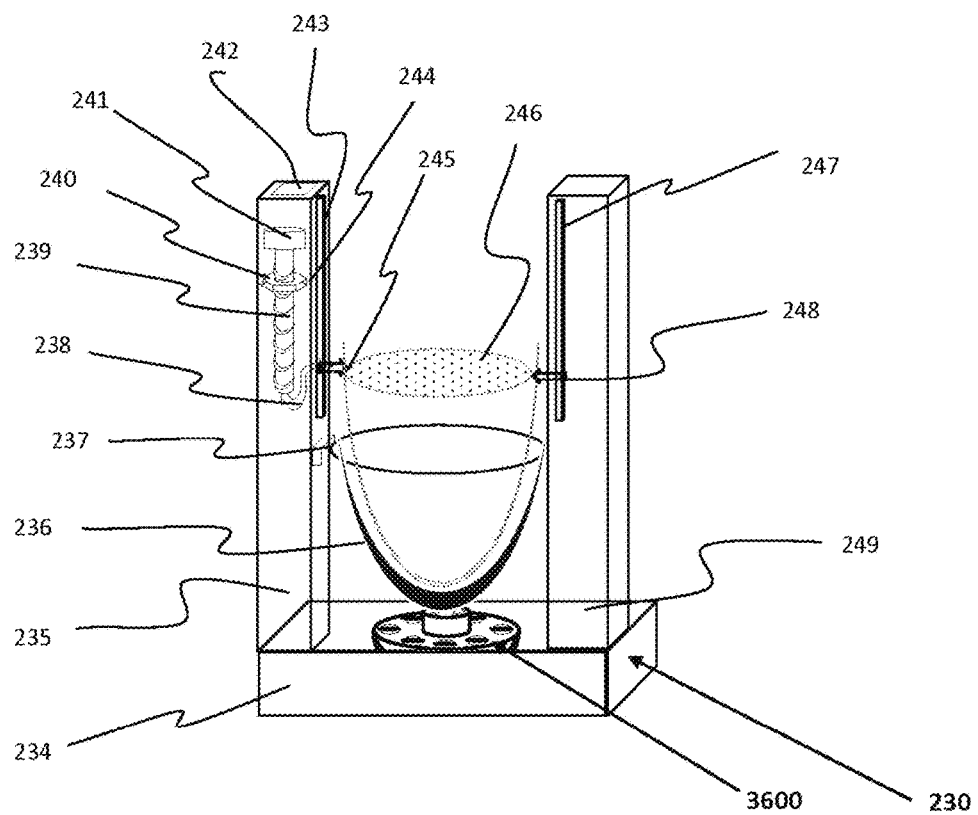
FIG. 21A shows the deep fryer.
Figure 21B:
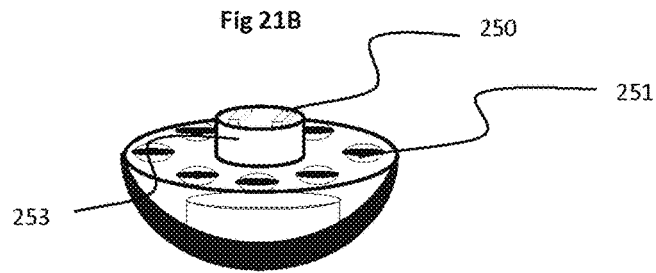
FIG. 21B shows a burning unit for the deep fryer.

FIG. 21A shows a deep fryer 230. This device has a cone shaped pan 236 with a smaller cone shaped mesh filter 246 inside. The mesh filter 246 can move up or down using the Screw Nut mechanism 240 that is present inside the left support 235. The pan 236 sits between the left support 235 and right support 249 on the base 234. The pan is fixed and is held by the pan holder 237 attachment on the left support 235. The lift screw 239 moves up when the screw motor 241 rotates counter-clockwise. The lift screw 239 moves down when the screw motor 241 rotates clockwise. Screw motor 241 rotates inside the fixed nut 244 that is held by nut holder 240 inside the left Support 235. When the lift Screw 239 rotates, the mesh connector 238 that is connected to the base of the lift Screw 239 also moves up or down moving the attached mesh filter 246 with the help of left mesh hook 245. Left mesh hook 245 goes up or down in the left channel 243. The right hook 248 moves up or down in the right channel 247. When the lift screw and the lift screw motor moves up, it comes out of the opening 242. The pan 236 is heated by the heat source 3600 shown in FIG. 21A which is similar to burning unit 3500 shown in FIG. 20A without the rotator system 226 of FIG. 20C (3504 of FIG. 20B). Appropriate temperature of the oil is maintained by the heat sensor 237 that senses the temperature of the oil and accordingly starts/stops the heat from the heating source 3600.

Figure 22A:
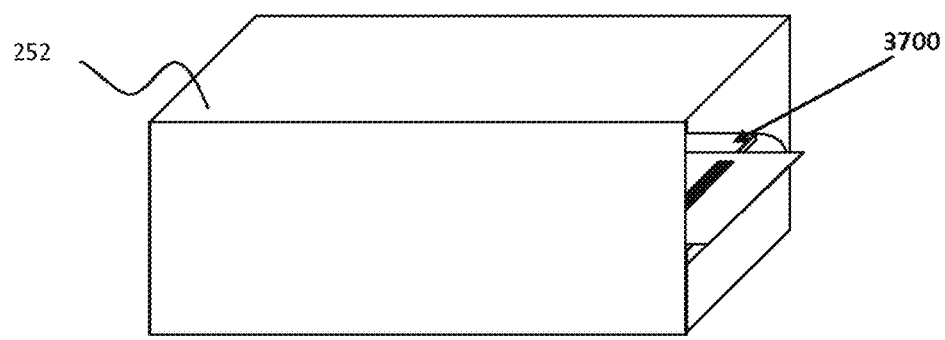
FIG. 22A shows a bowl transferor device.
Figure 22B:
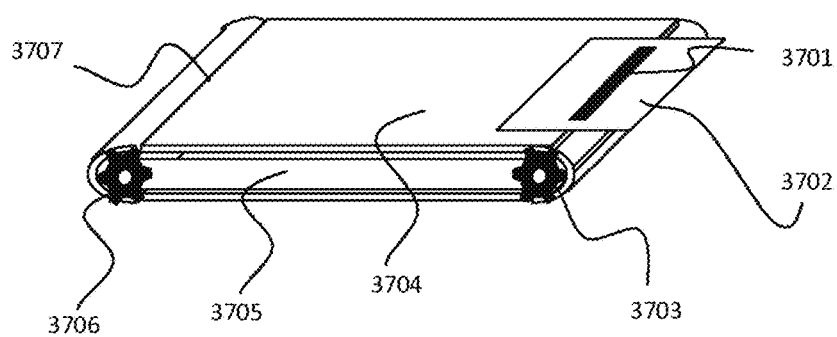
FIG. 22B shows the bowl transferor device without an outer Box.

FIG. 22A is another manipulator device-bowl transferor device 3700 that is used to transfer a clean bowl 6601 shown in FIG. 29E from the cleaner device 1100 to the collector 5600 shown in FIG. 27G. The collector 5600 shown in FIG. 27G then moves the clean bowl 6601 shown in FIG. 29E to the appropriate position to collect the prepared food from another device. FIG. 22B shows the bowl transferor device 3700 without the outer box 252. Transfer plate 3702 is attached to the conveyer belt 3704 at plate attachment 3701 only. The roller wheels 3703, 3706 roll the roller 3705 and thus move the transfer plate 3702. A clean bowl would slide onto the transfer Plate 3702 from the Cleaner 1100 and when the roller 3705 roll, the clean bowl 6601 shown in FIG. 29E, along with the transfer plate 3702 moves on the conveyer belt 3704 surface. When the clean bowl 6601 shown in FIG. 29E reaches on the other end 3707, the bowl 6601 shown in FIG. 29E slides into the collector 5600 shown in FIG. 27G since the transfer plate 3702 would bend.

Figure 23:
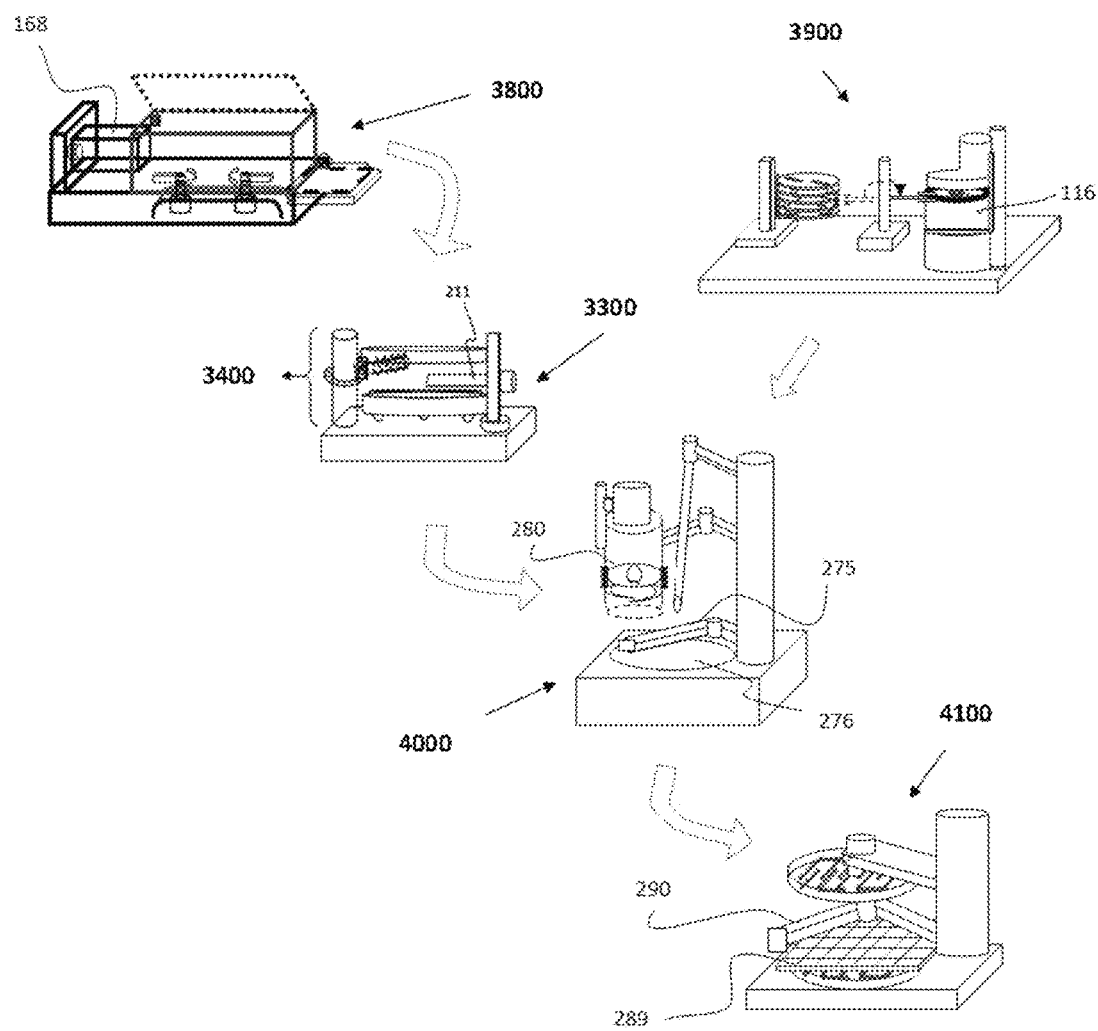
FIG. 23 shows a pizza making process and various devices that are used in making a pizza.

FIG. 23 shows the pizza making process. It involves five manipulator devices: dough maker 3800, tortilla maker 3300, pizza topping device 4000, pizza baker 4100 and the shredder 3900. Once the pizza dough is made in the dough maker 3800, the dough is pushed by the dough Pusher 168 and drops onto the bottom pan 3307 of FIG. 19A of the tortilla maker device 3300 to flatten it out. The thickness of flattening the dough is dependent upon the user's choice of thin, medium or thick crust. Accordingly upper pan of the tortilla maker 3303 of FIG. 19A would come down to flatten the dough. Once the dough is flattened, the upper pan 3303 of FIG. 19A would move up. Then, the dough docker 3400 will make holes in the flattened pizza dough to prevent the bubble formation during the baking process. If the user wants bubbles in his/her pizza, this step is skipped. The pizza base is heated for a small time here, so that it becomes little harder than the soft dough. Then, pizza base is pushed by side pusher 211 onto to the toppings base 276 of the pizza topping device 4000. Here, the toppings are added based on the user's preference including the Tomato sauce. Grated cheese is grated by the shredder 3900 and it is collected in shredder collector 116 and drops into the toppings holder 280. After the toppings and grated cheese are added, the unbaked pizza base is pushed onto to pizza baker's 4100 grill 289 by the toppings base hand 275. As the final step, the pizza is baked in the pizza baker 4100. Pizza is pushed out by the baker arm 290.

Figure 24A:
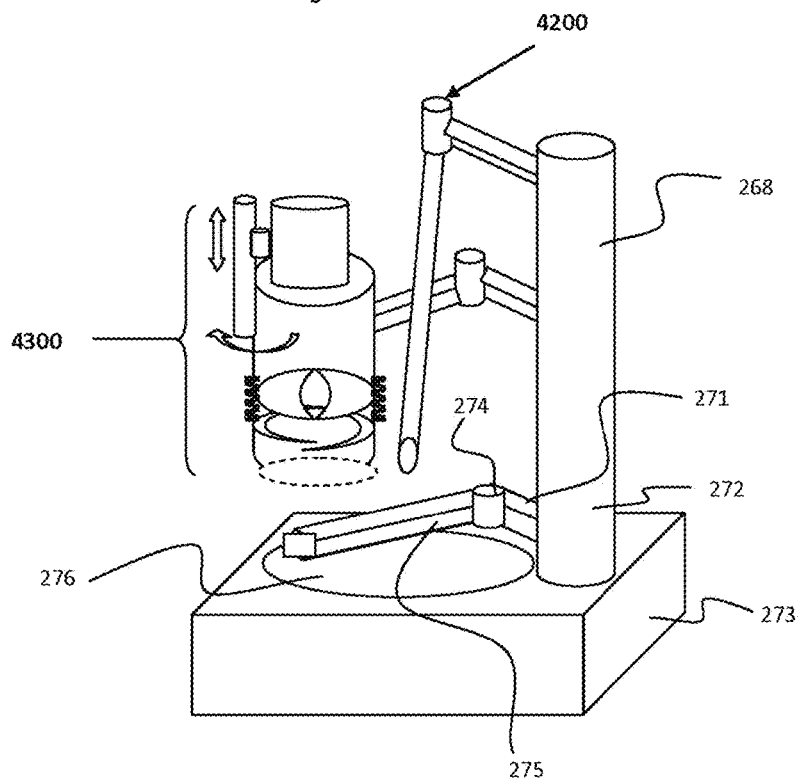
FIG. 24A shows a pizza toppings device.
Figure 24B:
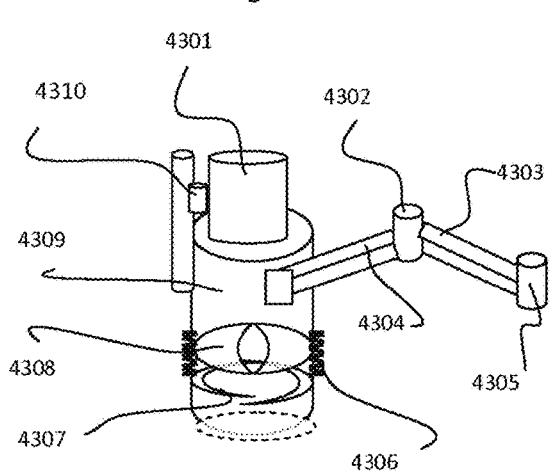
FIG. 24B shows an ingredients topping mechanism.
Figure 24C:
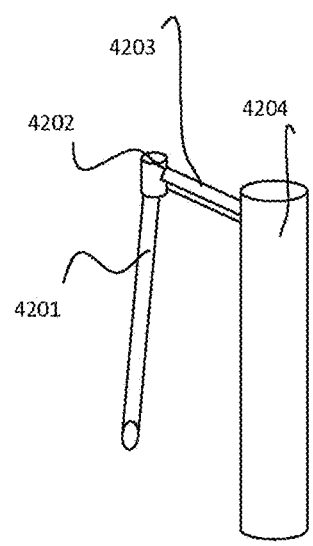
FIG. 24C shows a tomato sauce topping mechanism.

FIG. 24A shows the pizza topping device 4000. It is another manipulator device which is used to top the pizza with user specified ingredients like onions, bell pepper, pepperoni, tomato, jalapeño, etc. Unbaked pizza base is dropped on the toppings base 276 by the tortilla maker 3300 shown in FIG. 19A. FIG. 24B shows the tomato sauce topper 4200. Tomato sauce is poured on the pizza via the sauce pipe 4201. The sauce pipe motor 4202 along with the sauce pipe arm 4203 and sauce pipe arm motor 4204 helps in rotating the sauce pipe 4201 and provide the sauce to jet out evenly on the pizza. FIG. 24B shows the ingredients topping mechanism. For making the toppings, whole ingredient (for example green pepper) is dropped onto the toppings holder 4309. The whole ingredient is held by the toppings gripper arms 4308. Springs 4306 helps the gripper arms 4308 to hold the ingredient. The toppings pusher 4301 would push the ingredient in steps and the ingredient would push the gripper arms 4308. This would make the gripper arms 4308 to slowly open up by going downwards. The ingredient would move down gradually but it will be held by the gripper arms 4308. While the ingredient is moving down gradually in steps, Slicer blades 4307 would rotate and slice the ingredient. Depending upon the ingredient's shape, the gripper arms 4306 would open up or just grip and hold the ingredient. The sliced ingredient would fall on the pizza. The toppings pusher 4301 goes down to push the ingredient by a pinion-rack mechanism. The toppings holder 4309 can rotate around in the horizontal plane by the use of toppings arm 4303 and the toppings hand 4304. This way the ingredient is placed evenly on the pizza base. toppings arm motor 4305 rotates the toppings arm 4303 toppings hand motor 4302 rotates the toppings hand 4304. Same process is done for the grated cheese that gets dropped from the shredder into the toppings holder 4309. Arms support 268 of FIG. 24A provides the support for the toppings hand 4304, tomato sauce topper 4200 and Base Arm 271.

In FIG. 24A, once the pizza is topped with the tomato sauce, ingredients and the cheese, the unbaked pizza along with all the toppings is pushed to the pizza baker 4100 by the toppings base arm 271 and toppings base hand 275. Toppings base arm motor 272 rotates the toppings base arm 271 whereas the toppings base hand motor 274 rotates the toppings base hand 275. Pizza topper base 273 provides the support for the whole device.

Figure 25A:
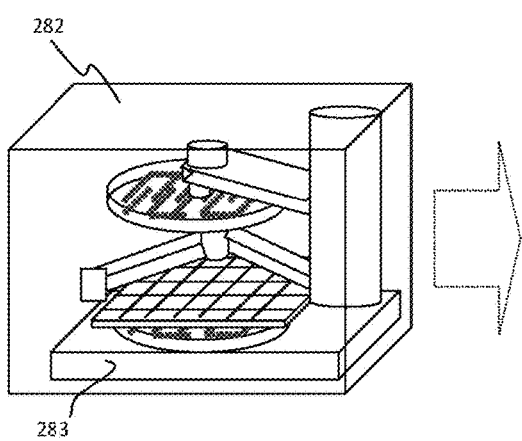
FIG. 25A shows a pizza baker device.

FIG. 25A shows the pizza baker 4100 used to bake the unbaked pizza. The pizza baker 4100 is enclosed by the pizza baker box 282 with openings on two sides. Back side for the unbaked pizza to go in and the front side for the baked pizza to come out, once baked.

Figure 25B:
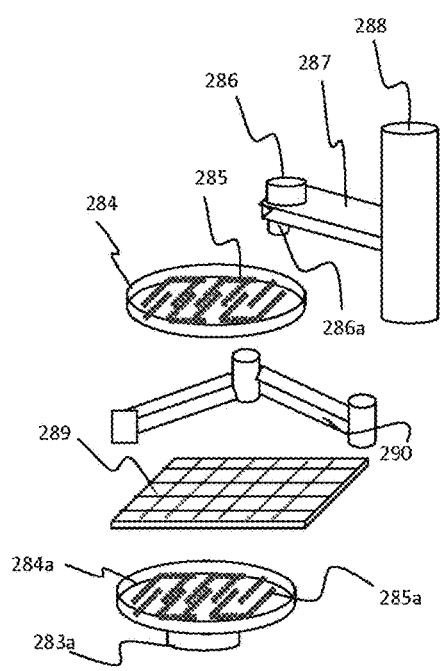
FIG. 25B shows an exploded view of pizza baker parts.

FIG. 25B shows the exploded view of the Pizza Baker device 4100 without the base 283 and the enclosing Pizza Baker Box 282 of FIG. 25A. Baking of the pizza is accomplished by two Heating filaments: top pan 284 which has the top pan heating filament 285 and the bottom pan 284*a* that has the bottom pan Filament 285*a*. Unbaked pizza goes in between these two pans 284 and 284*a* on top of the grill 289. Both the pans 284 and 284*a* can rotate in the horizontal plane. Top pan 284 rotates by the top pan Motor 286 and is held by the baker arm 287 via the shaft 286*a*. Bottom pan 284*a* rotates by the bottom pan motor 283*a* which sits on the base 283. Once the pizza is baked, it is pushed out by the baker arm 290. Baker support 288 gives support to the baker arm 290 and the baker pusher arm 290.

Figure 26B:
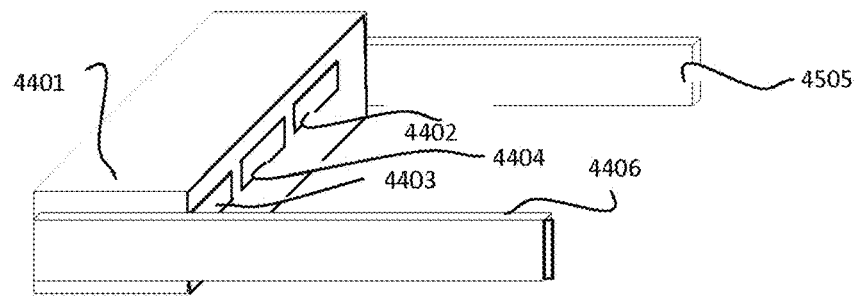
FIG. 26B shows a support base of the temporary holder slots.

FIG. 26A shows the temporary holder 800 that holds the manipulated ingredients before it is cooked. Temporary holder 800 contains the scissor lift 4600 mechanism to lift the support base 4400. support base 4400 provides support to the temporary holder slots 4500 with the help of left holder 4406 and the right holder 4505 supports scissor lift 4600 shown in FIG. 26C and the slots holder support base 4400 shown in FIG. 26B are inside the support column 319. The temporary holder slots 4500 shown in (FIG. 26D has three sliding bases 4902 shown in FIG. 26F for the three columns of slots that slides through the left 4403, center 4404 and right 4402 slots openings shown in FIG. 26B.

Figure 26C:
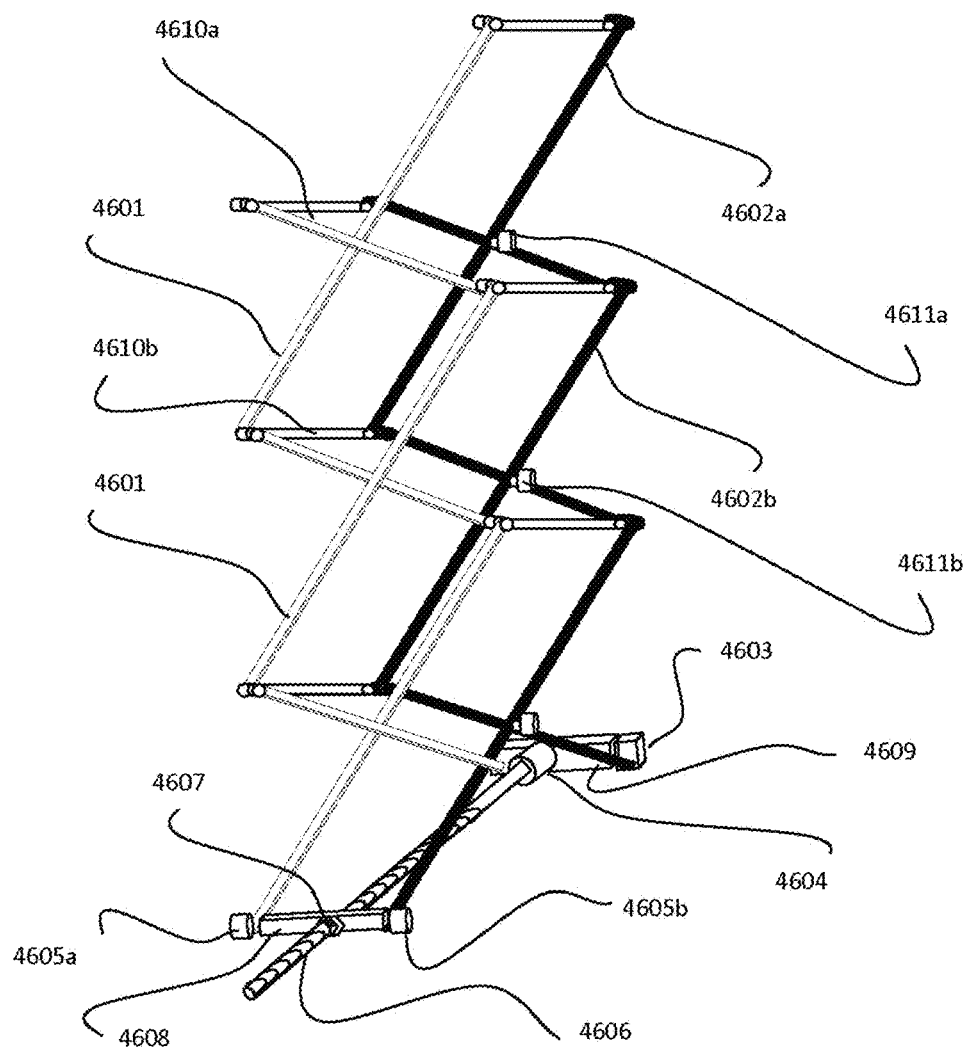
FIG. 26C shows a scissor lift mechanism to lift the support base of the temporary holder slots.
Figure 26D:
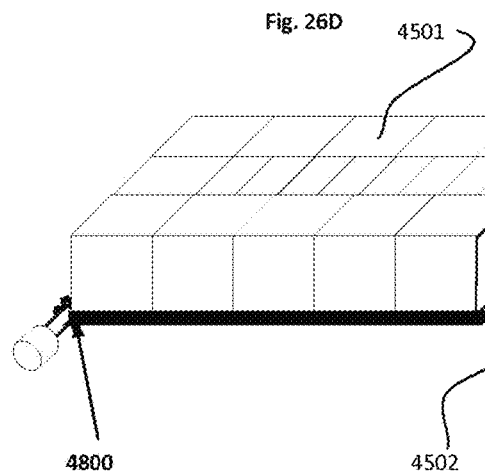
FIG. 26D shows the temporary holder slots.
Figure 26E:
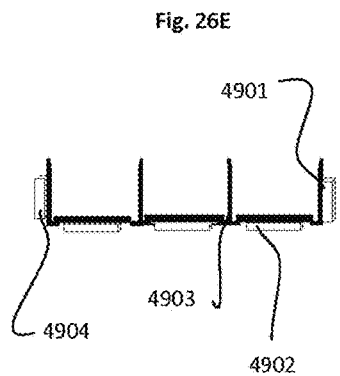
FIG. 26E shows the front view of the slots with a slider base.

FIG. 26D shows the temporary Holder slots 4500 with the slider base 4902. FIG. 26G shows the motor 5001, split rack 5002 and pinion 5003 mechanism to roll the slider base 4802 forward or backward. Split rack 5002 is not continuous rack and it breaks at the hinges 4801 since the slider Base 4802 bends at each slot. The hinges 4801 allow the slider base to bend when it is rolling back. When the pinion 5003 rotates anticlockwise, the split rack 4804 rolls back making the attached slider base roll back. This would make the ingredients in the temporary holder slots 4501 to fall down. When the pinion 5003 rotates clockwise, the split rack 4804 rolls forward making the slider base 4802 close the temporary holder slots 4501. The rollaway blocker 4803 blocks the slider base 4802 from rolling out all the way. Slots holder 4401 provides support for the slots 4501. Slots base holder 4502 holds the slider base 4802 and allows the slider base 4802 to slide.

FIG. 26C shows the lift mechanism 4600 to lift up or bring down the temporary holder slots 4501 shown in FIG. 26D. When the ingredients are manipulated by a device in the Manipulator 1000, the temporary holder slots 4501 shown in FIG. 26D will be in down position so that the manipulated ingredient can drop into the slots via the collector 5600 shown in FIG. 27G. When the heating step in the cooking process needs to be started, the temporary holder slots 4501 move up and the heating device frying pan 210 or deep fryer 230 rolls out of the Manipulator 1000 and places itself in between the base 291 and the temporary holder slots 4501 shown in FIG. 26D.

The lifting mechanism 4600 is provided by the scissor lift 4600 shown in FIG. 26C that includes three scissors 4601. The bottom scissor of the three scissors has a rolling side 4608 on one end and a fixed side 309 on the other end. The rolling side wheels 305 move away from the fixed Side 4609 or move towards the fixed side 4609 by the operation of the connecting screw 4606 and the nut 4607. Connecting screw 4606 connects the rolling side 4608 and the fixed Side 4609. The left side scissors are connected to the right side scissors by the connecting rods 4601. Left side scissor arms 4601 and right side scissor arms 4602*a* and 4602*b* collapse or expand when the rolling Side wheels 4605 move towards or away from the fixed Side 4609.

Figure 26F:
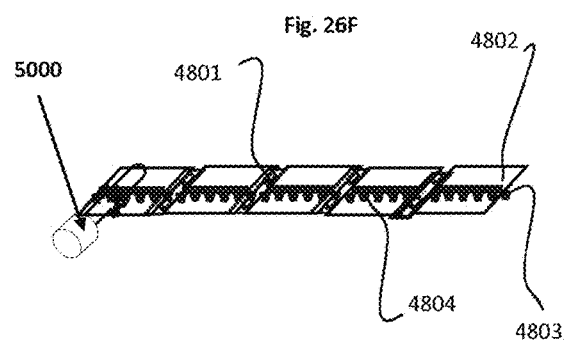
FIG. 26F shows the slider base of the temporary holder slots.
Figure 26G:
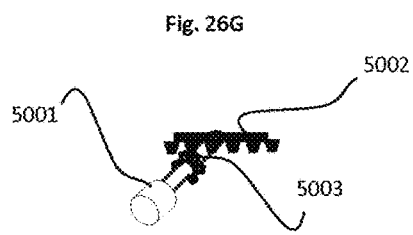
FIG. 26G shows a motor, rack and pinion mechanism to roll the slider base forward or backward.

FIG. 26F shows the side view of the temporary holder slots 4501. The Slider base 4902 can slide on the slider base holders 317, 4903.

Figure 27A:
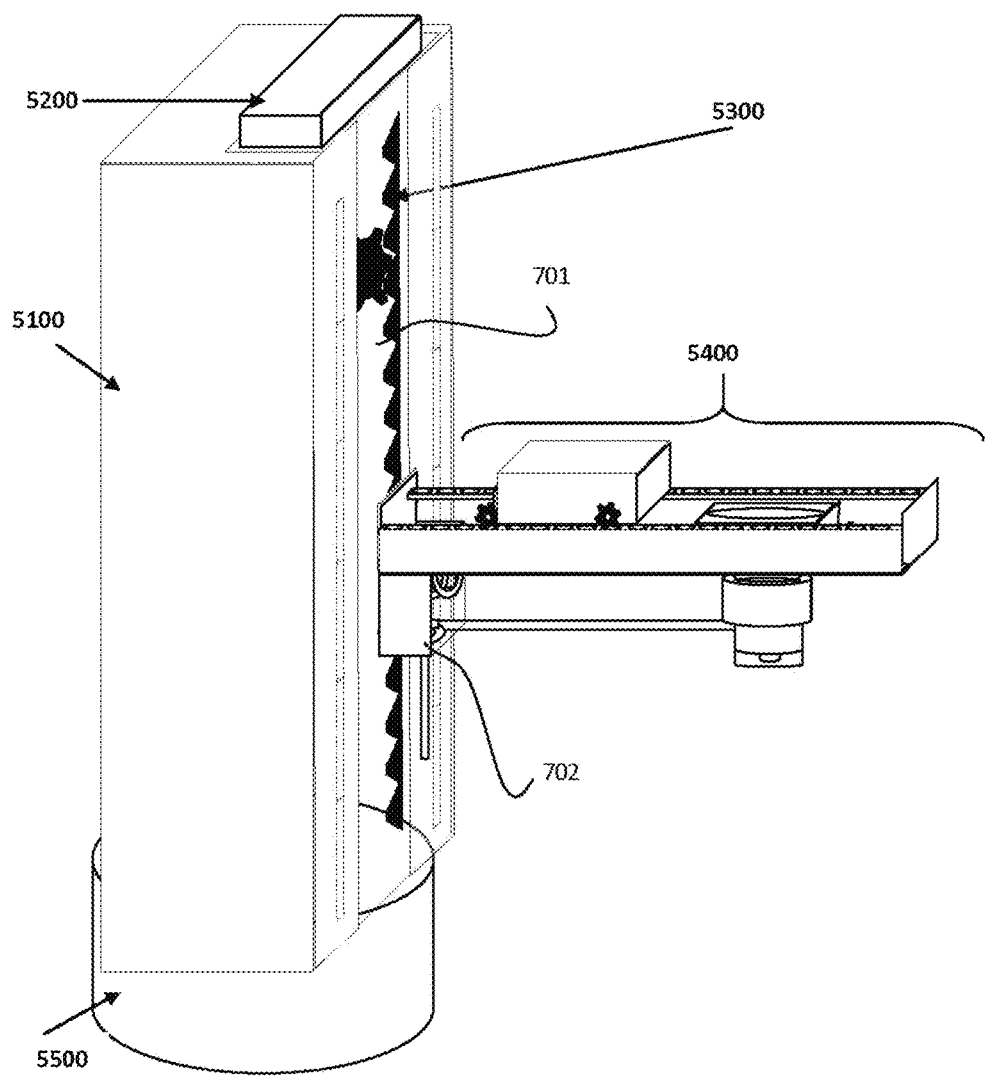
FIG. 27A shows a collector positioner used to position the collector at various positions to collect ingredients.
Figure 27H:
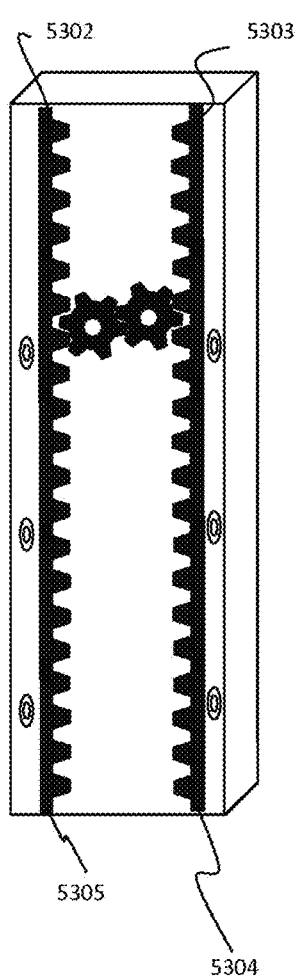
FIG. 27H shows a side view of the racks holder.

FIG. 27A shows the collector positioner (CP) 700 where it is used to position the collector 5600 shown in FIG. 27G at appropriate place between the raw ingredients storage unit 600 and the Manipulator 1000. The collector 5600 shown in FIG. 27G is used to collect ingredients from the raw ingredients storage unit 600 and drop it off into one of the manipulator devices 1000 using the principle of gravity. Once the chosen manipulator device 1000 finishes processing the ingredient, the collector 5600 shown in FIG. 27G would collect the processed ingredient and place it into the appropriate temporary holder slot 4501. To do the transfers between raw ingredients storage unit 600, manipulator device 1000 and temporary holder 800, collector positioner 700 is used. The collector positioner includes the CP Base 5500 shown in FIG. 27E, CP Box 5100 shown in FIG. 27B, lifter 5200 shown in FIG. 27C, racks holder 5300 FIG. 27D, and the collector rack system 5400 FIG. 27F.

CP Box 5100 shown in FIG. 27B encloses the lifter 5200 shown in FIG. 27C) and racks holder 5300 shown in FIG.

27D and the collector rack system 5400 is attached to the racks holder 5300 shown in FIG. 27D by the collector support 702 of FIG. 27G through the opening 701 (shown in FIG. 27B).

Referring to FIG. 27E, CP Box 5100 shown in FIG. 27B sits on the base 5502 on the free rotating three rounded wheels 5105 of FIG. 27B. CP Box 5100 shown in FIG. 27B rotates around the Y axis with the help of the Y Axis rotator motor 5503 that rotates the Y Axis rotator shaft 5501. It has the rotator attachments 5505 that fit into the base of the CP Box 5100 shown in FIG. 27B and facilitate rotation of the CP Box 5100.

The lifter 5200 shown in FIG. 27C is stationary and provides the motors and support to lift the racks holder 5301 up or down. It has two motors—5202 and corresponding shaft 5203 to rotate the lift wheels: right 5302 and left 5303 wheel shown in FIG. 27D. These two wheels 5302 and 5303 rotate in opposite directions. FIG. 27D shows the racks holder 5300 that moves up or down when the wheels 5302 and 5303 rotate. When the right lift wheel 5302 rotates clockwise, left lift wheel 5303 rotates counterclockwise making the racks holder box 5301 go down. When the right lift wheel 5302 rotates counter clockwise, the left lift wheel 5303 rotates clockwise making the racks holder box 5301 go up, thereby lifting the attached collector rack system 5400 shown in FIG. 27F. The lift racks 5305 are attached to the racks holder 5301. When the wheels rotate, lift racks 5305 movement makes the attached racks holder 5301 lift up/down. There are two sets of six freewheels 5307 (meaning not attached to motor 5202). The first set of free form rack wheels 5307 roll up/down on the grooves 5104 of the racks holder supports 5103 of FIG. 27A. The second set of free form rack wheels roll up/down between the lifter FIG. 27C and racks holder FIG. 27D. FIG. 27G is the side view of the collector rack system 5400.

Figure 27I:
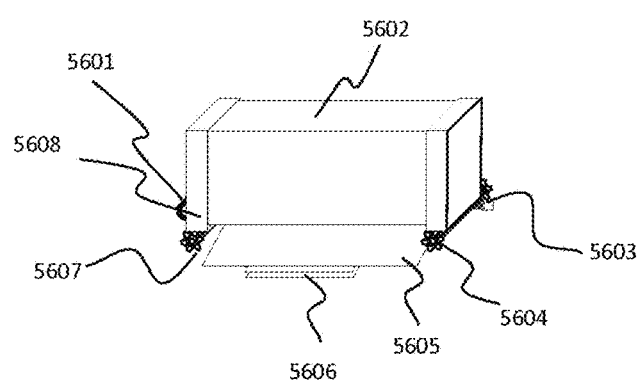
FIG. 27I shows a collector box.

Referring to FIGS. 27F and 27G, the collector 5600 holds the ingredients temporarily between transfers from one location to another. The Collector 5600 rolls on the two collector racks 342 with the help of front wheels 5604 and back wheels 5607 of FIG. 27I. Referring to FIG. 27I, only the back wheels 5607 are powered by the collector motor 5601 which is housed inside the wheel Box 5608 shown in FIG. 27F. The ingredients fall into the collector 5600 from the top 5602. The load sensor 5606 attached below the base plate 5605 of the collector 5600 checks the amount of the ingredient fallen and sends the signal to the push-pull box 34 once the required weight is reached. The base plate 5605 of the collector 5600 can be opened by the rotation of the base plate 5605 operated by the base motor 5603 to drop down the ingredients in manipulator using gravitational force. Referring to FIG. 27G, the back frame 340 and front frame 343 holds the collector racks 342*a* and 342*b* in place. The garbage disposer 533 can roll on the garbage disposer rack 344. And the garbage gets disposed via the garbage pipe 345. When the garbage disposer 533 rolls towards the collector support 340, then the garbage pipe 345 would wind horizontally around the horizontal winder 345*a*. When the collector 5600 goes down, then the garbage pipe 345 would wind vertically around the vertical winder 345*b*.

Figure 28B:
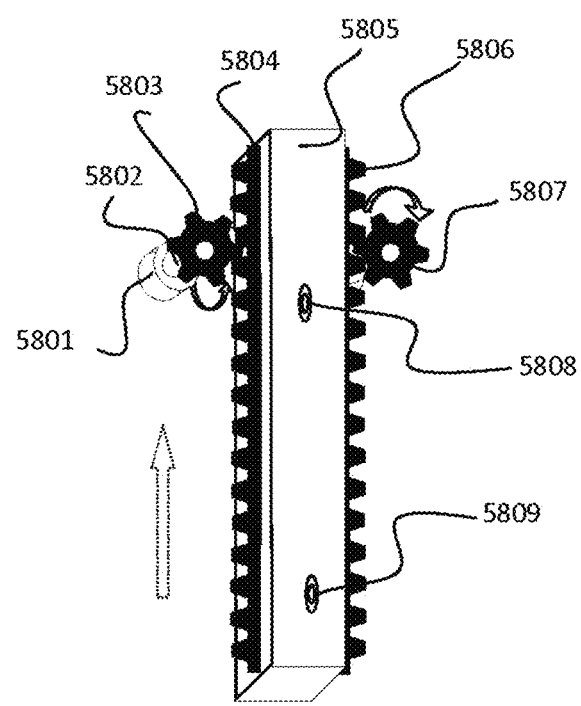
FIG. 28B shows a friction lift mechanism to lift a jet arm.

FIG. 28A shows the water positioner-jet sprayer 900, which used to clean the raw ingredients storage slots 1400, temporary holder slots 4500 and the devices in the manipulator 1000. The jet-sprayer 376 can be positioned at any point in the three dimensional space between the raw ingredients storage 600 and the manipulator 1000. Water Positioner-Jet Sprayer 900 can rotate horizontally around the vertical axis when the column-rotator 356 rotates. Column-rotator 356 is powered by the base-rotator motor 357. The jet hand 371 can swing in the vertical plane on XY axis by using the swing motor 355. Swing motor 355 swings the wedge 370 which would sway the jet hand 371. When the swing motor 355 rotates clockwise, the jet hand 371 sways outwards to the extended position 372. The unit can move vertically up or down by friction lift mechanism 5800 shown in FIG. 28B.

Referring to FIG. 28B, the friction lift 5800, there are two wheels, right wheel 5807 rotates clockwise on the right rack 5806 and the left wheel 5803 rotates anticlockwise on the left rack 5804 making the center attached friction bar 5805 move up. To move down, right wheel 5807 rotates anticlockwise and the left wheel 5803 rotates clockwise. Motor 5801 rotates the wheels 5803 and 5807.

Referring to FIG. 28A, water flows from the municipality water system through the water inlet 360 operated by the start-stop motor 359. Start-stop tap 361 initiates the water flow. Pressure of the water is maintained by the pressure regulator 362. Water flows through the fixed pipe 366 attached to the right column 364 and then through the flex pipe 369 and into the jet head 375 and out of jet sprayer 376. Jet arm 368 is attached to the friction lift 5800 shown in FIG. 28B which moves up or down. Friction Lift Bar 5805 of FIG. 28B housed in the right column 364 moves up through the opening 367. The right support 363 provides support and stability for the right column 364. The whole unit sits on the base 358.

Figure 29A:
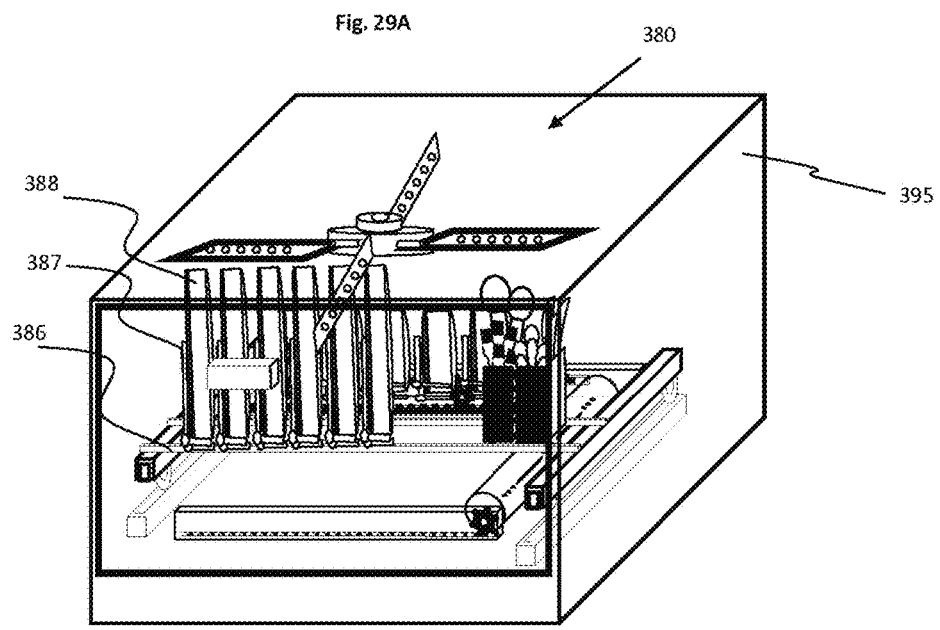
FIG. 29A shows a cleaner device which is used to clean bowls, plates, spoons, forks and knives.
Figure 29B:
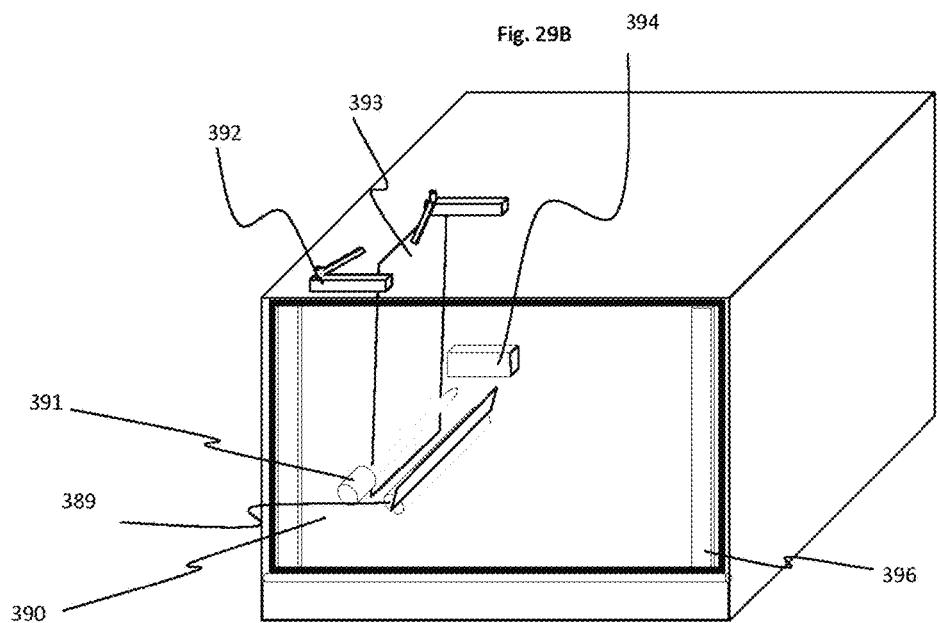
FIG. 29B shows an outer cleaner box that encloses the cleaning system.

FIG. 29A shows the cleaner device 380 which is used to clean bowls, plates, spoons, forks and knives. The cleaner device 380 is similar to conventional dish washers except that there is automation to move the bowls out of the cleaner 380 and push each of the individual bowls one by one into bowl transfer device 3700 of the Manipulator 1000. FIG. 29B shows the outer cleaner box 395 that encloses the cleaning system and FIG. 29C shows the inner contents of the cleaner device 380. Cleaner door handle 394 is used to open the cleaner door 390 and place the unclean bowls, plates, spoons, forks and knives bowl pusher 392 pushes the clean bowls one by one. Bowls 6001 in FIG. 29E are held by the bowl sleeves 6002 on the bowl rack 6004 in FIG. 29D. Bowl holder 6000 shown in FIG. 29D is in a horizontal position when it is being cleaned. Bowl holder 6000 shown in FIG. 29D rolls over on the bowl rack 6004 with the help of bowl holder wheels 6007. It 6000 rolls over to the left through the opening 393 shown in FIG. 29B and rotates counterclockwise into vertical position shown in FIG. 29E outside the cleaner box 395, when 6000 locks into the bowls holder groove 389 by the bowls groove handle 6006 of FIG. 29D. Bowl holder door 393 can be opened by the motor 391. Cleaner box 395 encloses all the cleaner parts. Referring to FIG. 29A, the plates 388 can be placed on the plate rack 386 in between the plate sleeves 388.

FIG. 29F shows the top water sprayer 5900 that has the sprayer holes 5903 through which the water jets out. The sprayer blades 5905 rotates around the sprayer blade rotator 5904 so that the water can spray out evenly inside and clean the dishes. Sprayer blade rotator 5904 is powered by the sprayer motor 5901 that is housed inside. Water flows through the water inlet 5902 inside the sprayer holder 5901. Sprayer holder 5901 is attached to the cleaner box 395.

Figure 29G:
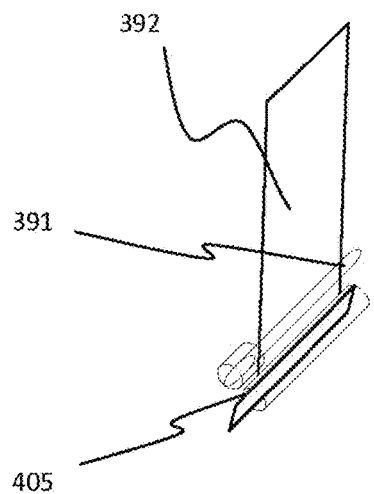
FIG. 29G shows a side open door mechanism where the bowl holder of FIG. 29D goes from horizontal position to vertical position and vice versa.

FIG. 29G shows the bottom sprayer 424 that rolls on the rack 420 inside the Bottom sprayer holder 421 using sprayer wheels 425. The motor to rotate the sprayer wheels 425 is housed inside the bottom sprayer 424. Water is fed into the bottom sprayer 424 by the flex pipe 426 which extends as it rolls farther.

Figure 29H:
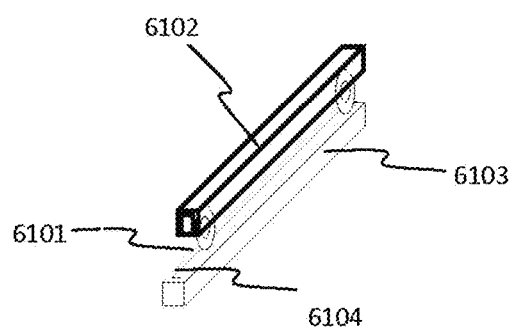
FIG. 29H shows the roller support racks that holds the bowl holder of FIG. 29D, spoon Holder, and the plates holder.
Figure 29I:
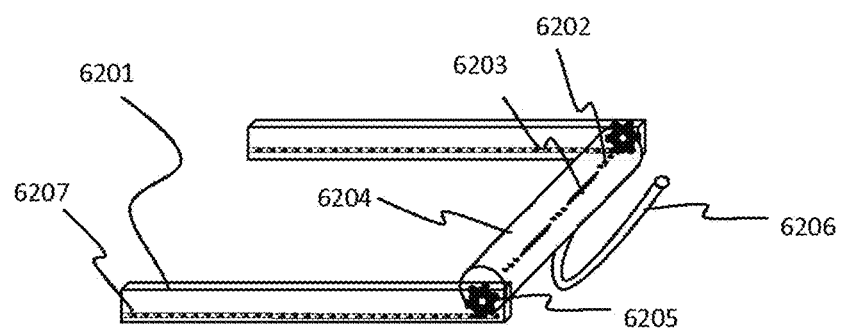
FIG. 29I shows a bottom sprayer along with the racks on which the bottom sprayer rolls.

FIG. 29H shows the roller support racks 6100 that holds the Bowl Holder 6000, Spoon Holder 400 and the Plates Holder 387. Roller support racks rolls in front when the cleaner door 393 is opened and rolls on the door groove 396 of FIG. 29B. Roller rack 6102 rolls on the roller base 6103. The roller wheels 6101 rolls over the roller groove 6104 on the roller rack 6103.

Figure 12B:
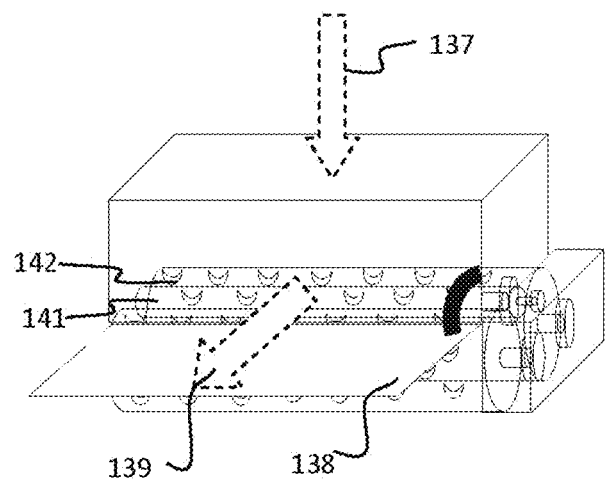
FIG. 12B is a peeler with an ingredient box open.
Figure 30:
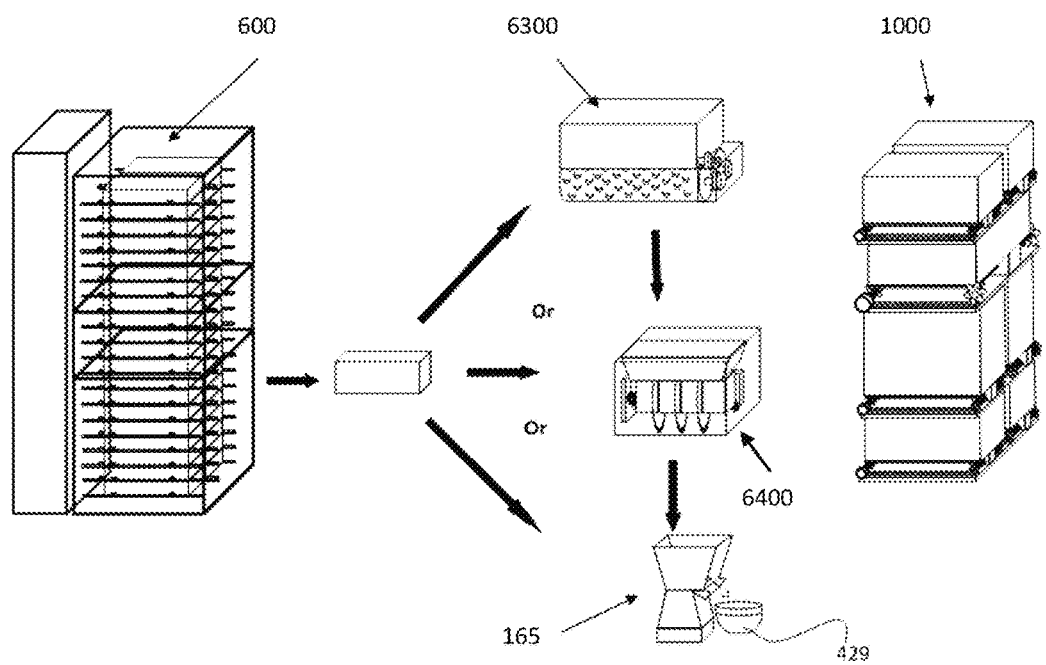
FIG. 30 shows a step by step process of smoothie/Juice preparation.

FIG. 30 shows the step by step process of smoothie/juice preparation. Vegetable or the fruit is procured from the raw ingredients storage unit 600 shown in FIG. 2A. The vegetable or the fruit is collected by the collector 5600 shown in FIG. 27G. If the vegetable/fruit needs to be peeled, the manipulator 1000 shown in FIG. 6B pushes forward the peeler 120 shown in FIG. 12 device. The ingredient drops from the collector 5600 shown in FIG. 27G shown in FIG. 27F into the peeler 120 shown in FIG. 12A and the peeled ingredient comes out. Depending upon the ingredient, the manipulator 1000 pushes forward the next device. It could be the cutter 90 shown in FIG. 9; or if the cutting process is not required, the vegetable/fruit can go directly into grinder 165 shown in FIG. 14). Depending upon how thick the user wants the smoothie/juice, water is poured into the grinder 165 shown in FIG. 14. Once the juicing is done by the grinder 165 shown in FIG. 14, juice collects in the Bowl 429.

Figure 31:
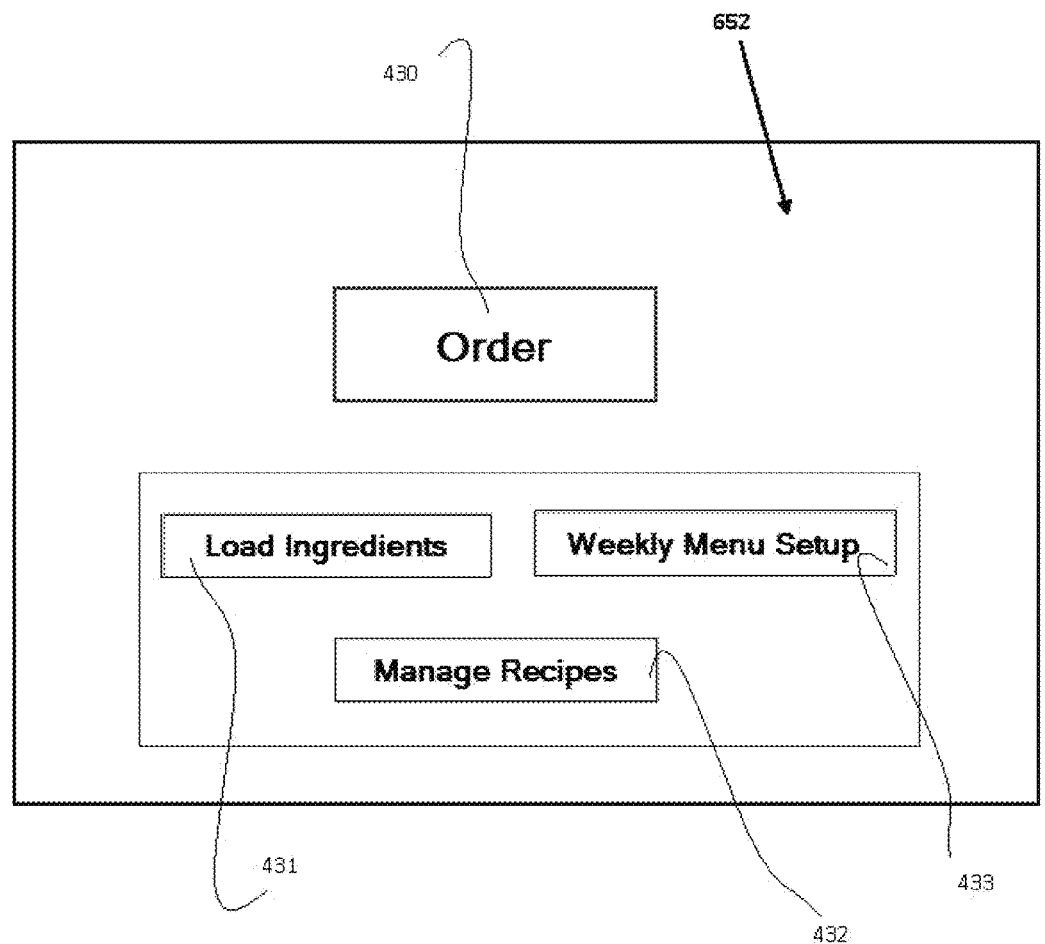
FIG. 31 shows a main screen that is displayed on a touch screen computer in front of the raw ingredients storage unit.

FIG. 31 shows the main (Home) screen 652 that is displayed on the touch screen computer 650 shown in FIG. 2B. A user has the option to do any or all of the following: a) load the raw ingredients b) to order a recipe to be prepared c) to manage recipes (add, delete or modify recipe) and/or d) to setup weekly menu. To Load the ingredients, a user selects the load Ingredients 431 button. Load Ingredients screen 438 shown in FIG. 32) is displayed. If a user selects order button 430 to prepare a recipe and order screen 439 shown in FIG. 33 is displayed. If the user needs to change an existing recipe or add a new recipe, then the user would click the manage recipes button 432 and manage recipe screen 450 shown in FIG. 34 would be displayed. If the user needs to setup a weekly menu of recipes, then the user would click the 'weekly menu setup' button 433 and weekly menu screen 523 shown in FIG. 38 would be displayed. KA Computer 650 shown in FIG. 2B is the main controller, micro processor, or computer processor that controls all the motors and automation involved in the whole system, method and apparatus. It is the 'brain' of the entire system.

Figure 32:
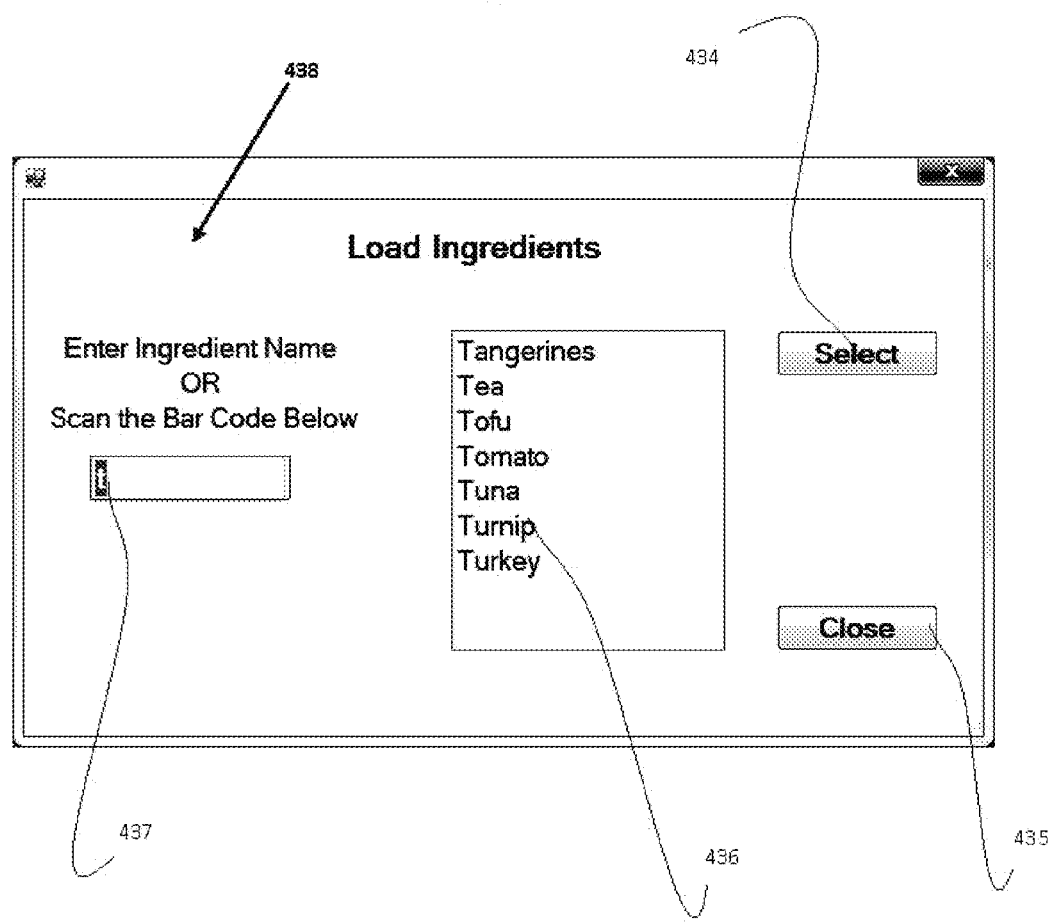
FIG. 32 shows the Load Ingredients screen to facilitate the loading of the raw ingredients into the raw ingredients storage unit of FIG. 2A.
Figure 33:
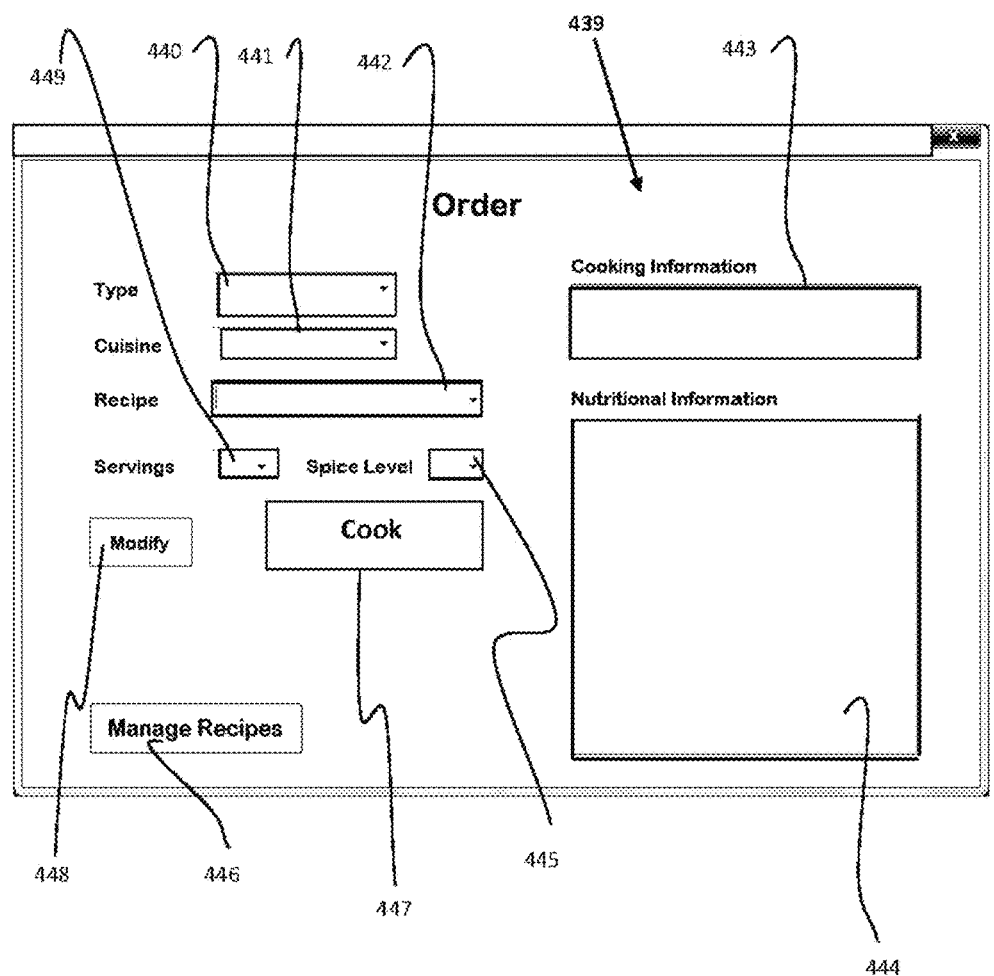
FIG. 33 shows an order screen where the user can choose a recipe to be prepared and cooked.

FIG. 32 shows the load Ingredients screen. In order to have the ingredients stored in predetermined slots of the raw ingredients storage unit 600 so that the recipe can be prepared, user need to place the ingredients into specific slots of the raw ingredients storage unit 600. A user would typically enter the ingredient name or scan the bar code of the ingredient. A user can enter the first few letters of the ingredient in the 'Enter Ingredient Name' text box 437 and all the ingredients starting with those first few letters would show up in the lookup list 436. A user has to select the ingredient that matches their choice from that lookup list 436 and enter the select button 434. That is, a user need not type down the entire name of the ingredient. Alternatively, a user can scan the item using the scanner 653 in FIG. 2B.

In order to facilitate the recipe driven automation, the ingredientID, slotID, deviceID, bladeID, motorID are all stored in a database 604 in the computer 650. FIGS. 35A, 35B, 35C and 35D show an example recipe and illustrate how the recipe instructions are converted to controller signaling and motor actions.

FIG. 33 shows the 'order' screen where the user can choose a recipe to be prepared. A user can directly enter the recipe name in the "recipe" drop down box 442. When the user enters the first few letters, the drop down list is automatically populated with those recipe names starting with the typed letters. This feature operates like a Google (trademarked) search box. Alternatively, a user can choose the "recipe type" 440. "Recipe Type" could be one of soups, appetizers, entree, dessert or beverages. If the recipe type is "entree", a user have the option to choose "cuisine" in the cuisine drop down box 441 to narrow down the recipe list to the chosen cuisine in the "recipe" dropdown 442. When recipe type and cuisine is not chosen then all the recipes of all the cuisines will be listed in the "recipe" drop down 442. A user can choose the number of servings 449 and the spice level 445 that range between "1" to "10". "1" being mild and "10" being very spicy hot. The spice level and servings would default to preset level (two servings and level four). A user can customize the default settings. Nutritional Information 444 gives the calorie counts, carbohydrates, protein and the various fat contents of the chosen recipe. Cooking information 443 contains the cooking steps that are involved for the chosen recipe. Cook 447 button would initiate the cooking process. Modify 448 button can be used to modify the chosen recipe according to one's taste. Manage recipes 446 button would allow to add, delete or modify recipe. It brings up the manage recipes screen shown in FIG. 34. Modify and manage recipes feature of this system makes this invention stand out from the other similar inventions, in one or more embodiments.

Figure 34:
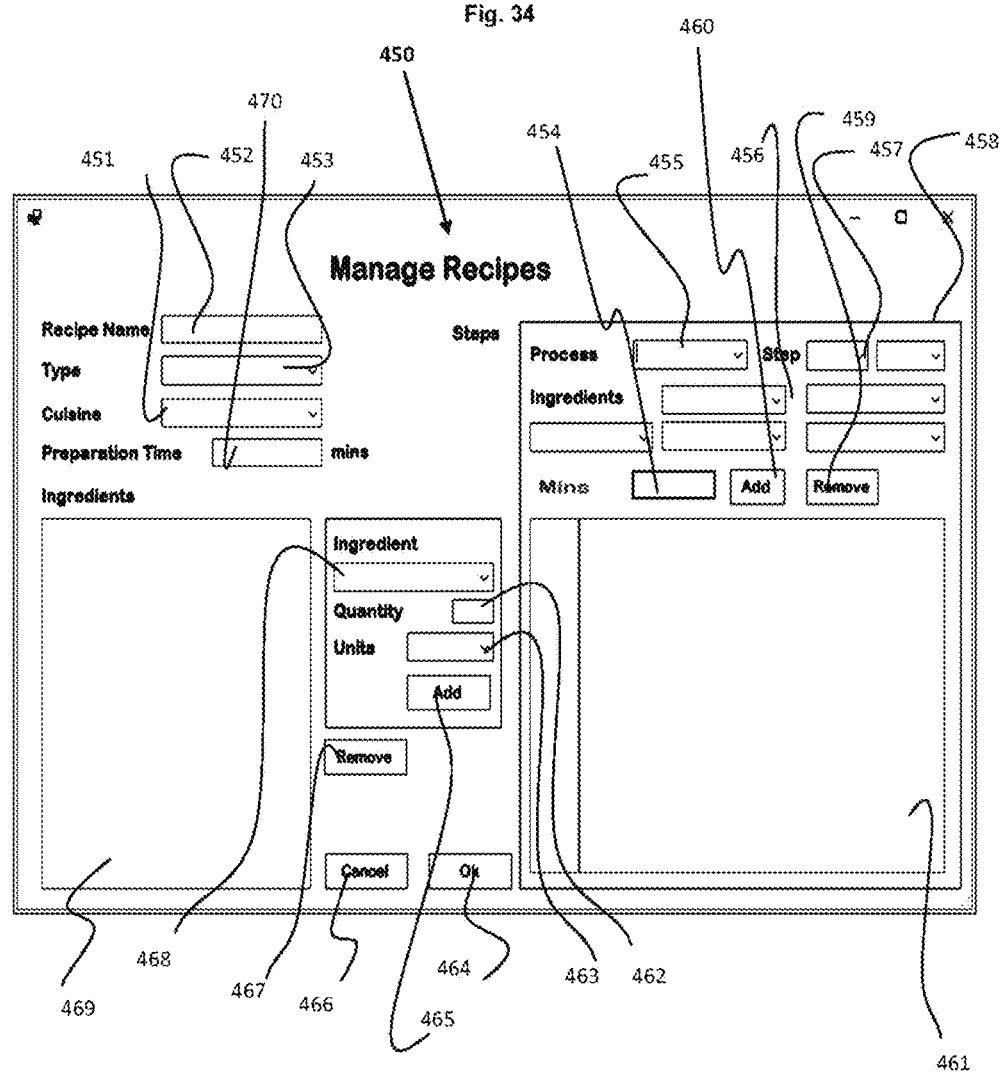
FIG. 34 shows the manage recipes screen where the user can add, modify or delete a recipe.

FIG. 34 shows the screen where the user can add a new recipe or modify an existing recipe steps or modify the ingredients of a recipe. Recipe name 452 allows choosing a name for the recipe. Type dropdown list 453 allows choosing the recipe type whether it is appetizer or entree or soup or dessert or beverage. Cuisine dropdown list 451 allows the user to choose the cuisine type that the recipe belongs to. A user has the option to choose "other" for an unknown cuisine or need not select any cuisine. Preparation time 470 text box allows to enter the time it takes for the KA to make this recipe. This time is usually faster than the time taken to make the recipe manually. Ingredients list box 469 shows all the ingredients that are involved in making this recipe. Each Individual Ingredient is added to Ingredients list box by choosing it from the Ingredient drop down box 468. For each chosen ingredient, a user has to enter the quantity 462 and the units 463 of the quantity. A sample content of the Units drop down box are teaspoon, tablespoon, lbs, ounce, cup, etc. Add button 465 is used to add the selected ingredient and the added ingredient would show up in the Ingredients List box 469 along with the quantity and the unit. The remove button 467 can be used to remove any added ingredient. Ok button 464 would save this recipe and close the Manage Recipes screen and cancel button 466 would close the screen without saving any changes made to the recipe. Steps block 458 contains the steps to add to the recipe. Process operation has various manipulation commands. A sample list of process manipulation commands are cut, chop, dip, combine, heat on low, heat on medium, heat on high, grate, mince, etc. These commands are present in the process drop down list 455. Depending upon which process command is chosen, five ingredients text boxes 456 shows up or the minutes text box 454 is displayed. If "Heat" process step is chosen in the process drop down list 455, then the minutes text box 454 shows up. If "combine" process step is chosen, five ingredient's text boxes 456 are shown. Add button 460 in the steps block would add the process and the ingredients. If there are more than five ingredients to be added, then one more step need to be added to the existing step (5+4 ingredients). For more ingredients, additional steps need to be added. If an ingredient is already added as a 'Process' step, then the step number should be chosen instead of ingredient. The Remove button 459 can be used to remove any of the independent steps. The Step numbers are listed in the step drop down list 457. The ingredient steps list contains two columns, first column has all the step numbers listed and the second column lists the actual process.

FIG. 35A shows an example recipe as entered in the 'manage recipe' screen. The "screens" mentioned in the present application may be displayed on a computer monitor or display which may be part of the main computer or computer processor 650. The computer monitor or display of the main computer 650 may be an interactive touch screen, or the main computer 650 may include a different and/or separate user interactive device, such as a computer mouse and/or a computer keyboard. The "screens" displayed on the computer monitor may be the result of computer software stored in computer memory of the main computer or computer processor 650. The verbs stir 7701, cut 7702, heat on High 7703, mince 7704 shown in FIG. 35H are listed in process drop down list 7700. These verbs get translated into commands for machine actions in main computer or computer processor 650.

FIG. 35B shows an example recipe found in cook books. FIG. 35C shows the ingredients as entered in the 'manage recipe' Screen. FIG. 35D shows the 'directions' of the recipe of FIG. 35B entered as 'steps' in the 'manage recipe' screen. Steps 1 through step 6 are part of the ingredients list in the FIG. 35B. These steps have to be done by the Manipulator 1000 shown in FIG. 6B and the manipulated ingredients need to be placed on to the temporary holder 800 shown in (FIG. 26A). For eg: step two "cut bell pepper" would involve the following steps (and are done automatically) as a result of computer software programmed in computer memory of main computer or computer processor 650:

a. retrieve bell pepper from the raw ingredient storage unit and collect in the collector 5600 shown in FIG. 27G;
b. invoke the shredder device 2600 from the Manipulator 1000 and choose the "cut" blade 111 in the shredder device 2600;
c. place the bell pepper from the collector 5600 shown in FIG. 27G into the shredder 2600. Start the cutting process;
d. drop the cut bell pepper from the shredder 2600 to the collector 5600 shown in FIG. 27G;
e. collector 5600 shown in FIG. 27G would drop the cut bell pepper into the appropriate slot 4600 of the temporary holder 800; and
f. Once all the ingredients are placed in the temporary holder 800, heating device like pan fryer 210 from the manipulator 1000 comes out. Then the ingredients fall into the heating (fry pan) device 210, in the order specified in the steps of FIG. 35D.

Figures 35E, 35F:
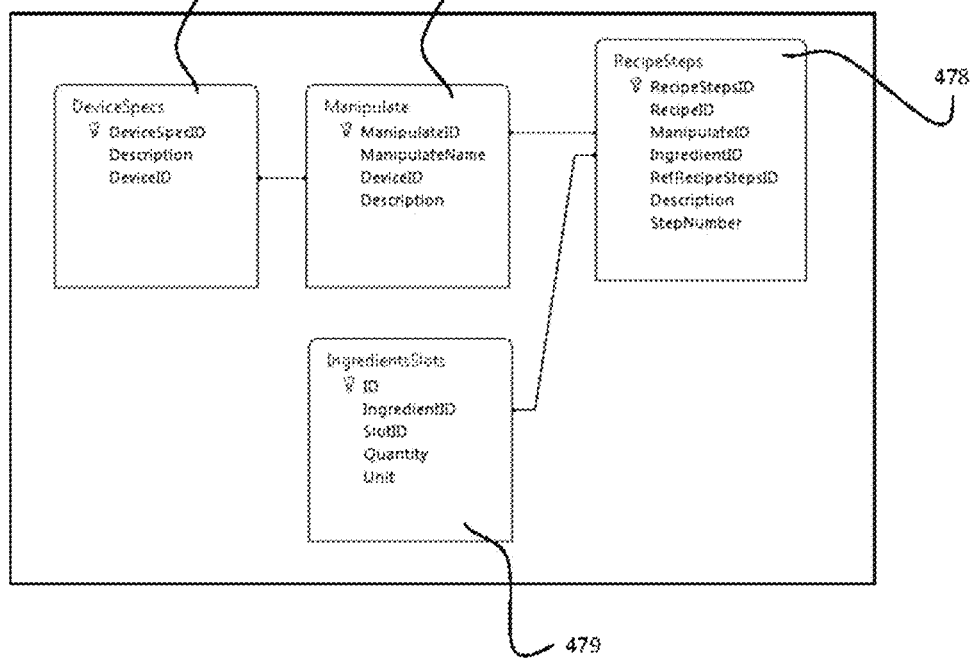
FIG. 35E shows the 'steps' of the recipes as stored in the database table—recipe Steps.
FIG. 35F shows an entity-relationship diagram of the database tables involved in executing the recipe steps.

FIG. 35F shows the entity-relationship diagram of the database tables involved in executing the recipe steps. Recipe steps table 478 contains all the steps for all Recipes, in at least one or more embodiments. For the recipe example, the table contents are shown in FIG. 35E. When a single recipe is chosen, the steps of that recipe are executed in the order of the step number. Manipulate table 477 contains the deviceID for the manipulate action specified in the recipe step. For eg: "cut bell pepper" would invoke the 'cut' operation's device which is 'Shredder' 2600 IngredientID in the RecipeSteps table would invoke the IngredientSlots table's SlotID. From the SlotID indicated, the Raw Ingredients Storage's Push-Pull Block Positioner 1200 would know which row the push pull box 34 needs to be positioned and which slot 1400 needs to be opened.

Figure 35G:
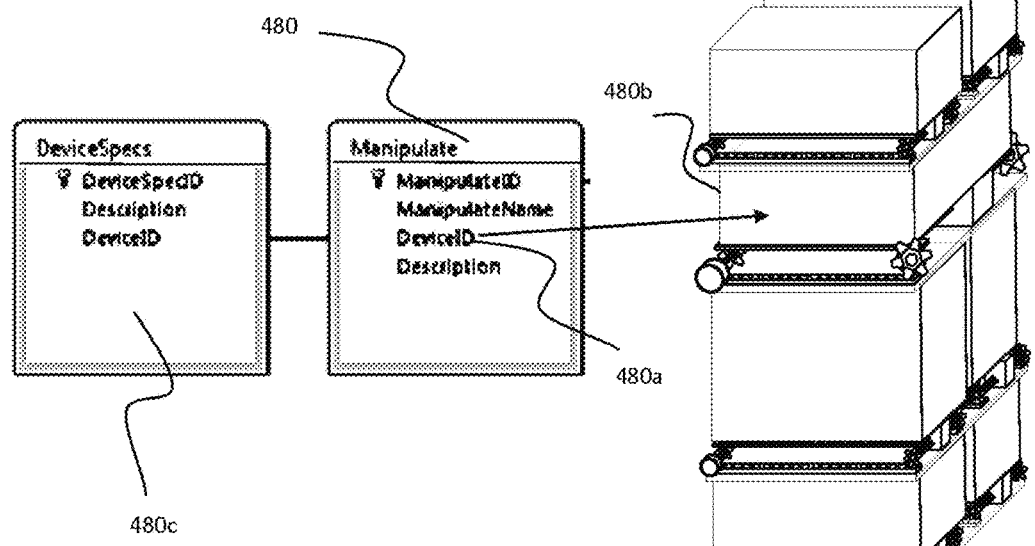
FIG. 35G shows a mechanism to extend the number of manipulator devices.
Figure 35H:
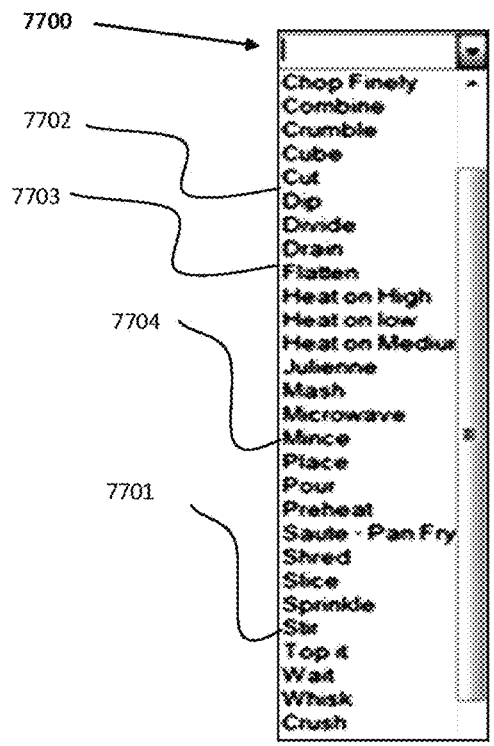
FIG. 35H shows the various manipulator actions.

FIG. 35H shows the various manipulator 1000 actions. The verbs "stir" 7701, "cut" 7702, "heat on high" 7703, "mince" 7704 get translated into commands for corresponding device actions in the computer processor 650 shown in FIG. 1A. Note that all the verbs are not labeled. Additional verbs can be added by adding it to the database in the computer memory in the processor 650. The flexibility to add additional verbs provides the capability to KA to cook more dishes and thus provides the versatility of the system. FIG. 35G shows the manipulator 1000 that may include one or more manipulator devices and allows for adding more manipulator devices to manipulator 1000. This capability to extend the number of manipulator devices, or to add more manipulator devices, allows the KA system to be flexible to cook more dishes. DeviceID 480*a* in the manipulate table 480 in FIG. 35G corresponds to a device 480*b* in the manipulator 1000. If a new manipulator device needs to be added, an additional device box separator base similar to base separator 85 is added and placed on top of the stack 76 shown in FIG. 6B of manipulator devices currently in manipulator 1000, and then the new manipulator device is placed on the additional device box separator base or plate 85 and an additional four items ("ManipulateID", a "ManipulateName", a "DeviceID, and a description of the particular manipulator device), such as an additional four data items are added to the manipulate table 480 for the new manipulator device. A new action corresponding to the added device's functionality is associated with this device and that is how the verb gets translated to device actions.

For example, if we add a device called a stirring device, whose manipulate action is to 'Stir', the stirring device will be physically placed on top of an additional box separator plate 85 on top of a stack of previous maninpulator devices for the manipulator 1000 and a new set of four records are added to the manipulate table 480 with the associated action 'Stir' 7701 shown in FIG. 35H. For each manipulator device in the overall manipulator 1000 (or plurality of manipulator devices) there is a "ManipulateID", a "ManipulateName", a "DeviceID, and a description of the particular manipulator device stored in table 480 which may be stored in computer memory of the main computer 650. For example, for "stir" 7701, the "ManipulateID" might be M10, the "ManipulateName" would be "stir", the "DeviceID" would be D10 and the description would be 'stir the food item'.

Thus there are four entries in the manipulate table 480 in computer memory for each manipulator device in the overall manipulator 1000.

In FIG. 35G, six manipulator devices are shown in addition to 480*b*, with a box separator base or plate 85 separating adjacent manipulator devices. Each row may have two manipulator devices or only one manipulator device depending upon the size of the particular manipulator devices.

In this way, few more devices can be added, the number of manipulator devices that can be added to become part of the stack 76 shown in FIG. 6B is typically limited by the kitchen's height. However, in one or more embodiments, if required, we can increase the width of the manipulator 1000 to accommodate three devices in each row, i.e. manipulator devices can be placed next to each other, rather than just stacking on top of each other, and thus increase the number of devices that can be added. This capability allows the KA system, the flexibility to add more devices. The motors in the device that need to be activated are stored in the DeviceSpecs 480*c* table, shown in FIG. 35G, by DeviceSpecID.

As an example, in order to execute a "stir" action, the computer processor or main computer 650 is programmed, for example, to take a user entered command (through an interactive device of computer 650) to "stir", or a recipe entered into computer memory of computer 650 with an instruction to "stir", and then look up the "ManipulateName" of "stir" in the manipulate table 480 of computer memory of computer 650. The table provides a linked corresponding device identification number ("DeviceID") for a manipulator device of overall manipulator 1000, that can execute a "stir" operation. The computer 650 is programmed to send a command signal to the manipulator device is used to "stir", which causes the manipulator device to stir whatever is in the manipulator device.

Figure 36:
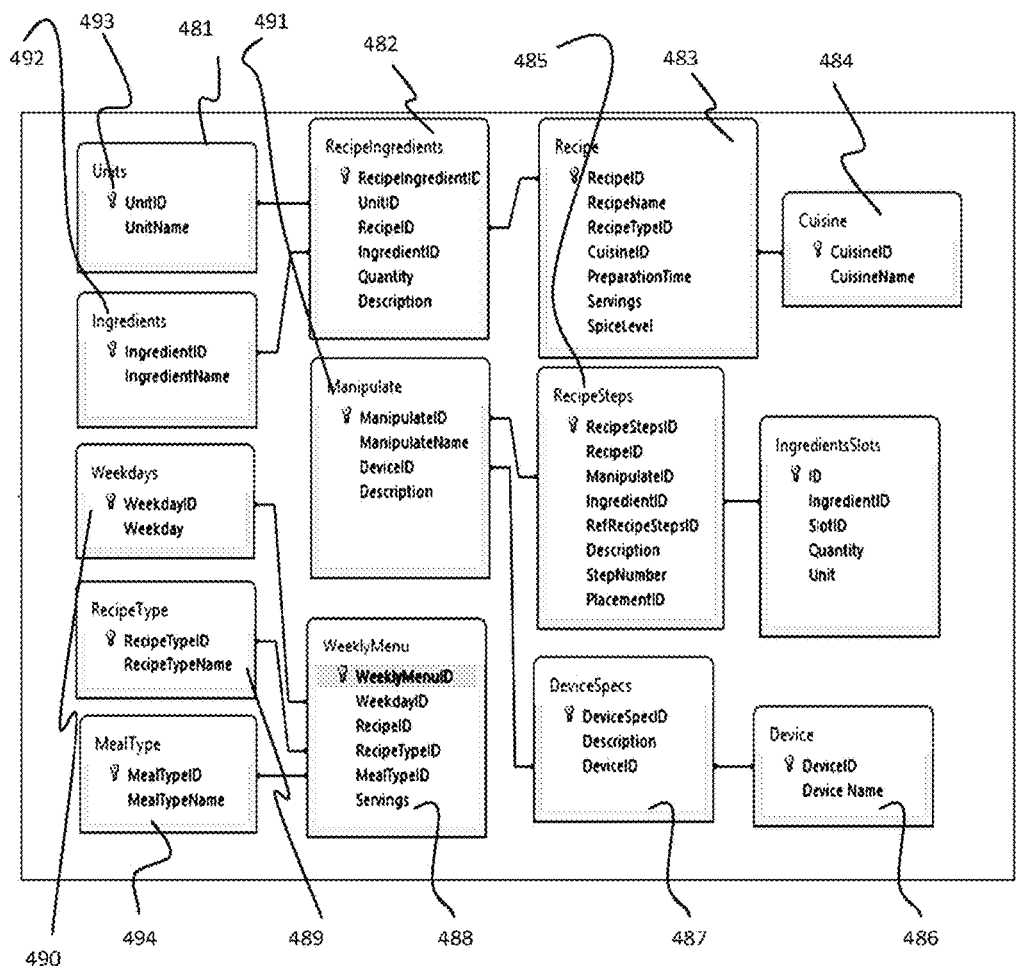
FIG. 36 shows an entity-relationship diagram of the database software used for recipe driven kitchen automation.

FIG. 36 shows the entity-relationship diagram of the database software used for recipe driven kitchen automation. All the tables have the primary key indicated by the key icon 493 that identifies a unique record of that table. Generally tables specified in the present application may be stored in computer memory, such as computer memory of the main computer 650. Each of the recipe steps that drive the automation of the devices is stored in the recipe steps 485 table. ManipulateID in the Manipulate table 491 identifies the task (for eg: cut, grate, heat etc.) and is associated with a device by DeviceID. This enables the translation of the task to corresponding actions. The different devices used in the manipulate section are stored in the Device table 486. Recipe Table 483 contains all the recipes and each recipe belongs to a particular recipe type (eg: appetizer or entree or juice, etc). All the recipe types are stored in the RecipeType table 489 and are associated with the Recipe table 483 by RecipeTypeID. Recipe table 483 has the cuisine associated with it by the CuisineID and all the cuisines are stored in the Cuisine table 484. All the ingredients are stored in the Ingredients table 492 and the ingredients that are associated with a given recipe are stored in the RecipeIngredients table 482 with RecipeID and IngredientID defining the unique record. The amount of the Ingredient used in the recipe is defined by the 'quantity' and the associated unit by UnitID (for eg: teaspoon, ounce, tablespoon, etc). All the units are stored in the Units table 481. Users can store the recipes for an entire week and this information is stored in the WeeklyMenu table 488 in computer memory, such as computer memory of the main computer 650. Weekdays are specified in the Weekdays Table 490. RecipeType identifies the recipe as Lunch, breakfast or dinner in addition to identifying the recipe as an appetizer, entree, dessert or beverage. MealType table 494 stores the type of the meal (breakfast, lunch or dinner) for the weekly menu screen.

Figure 37A:
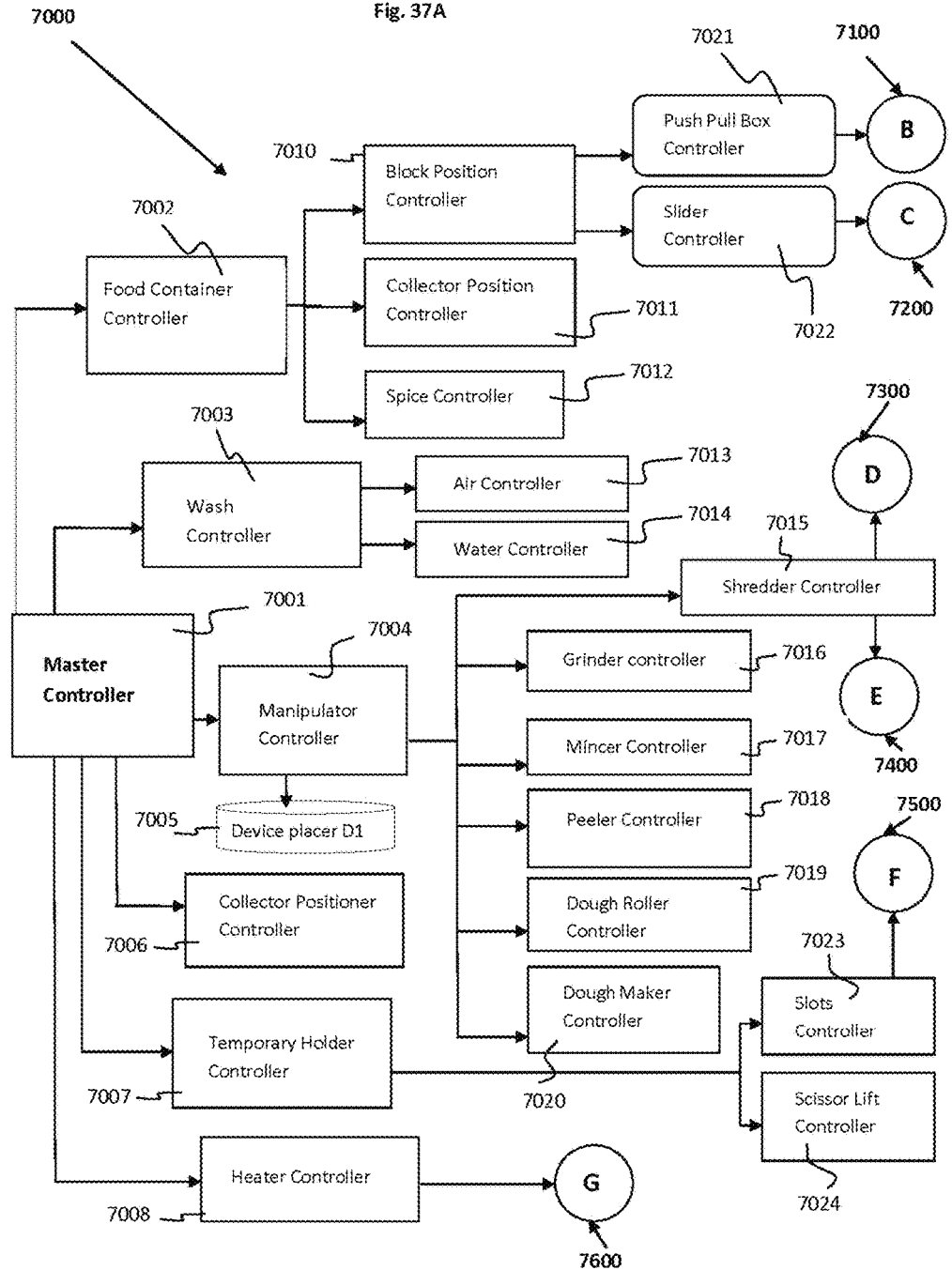
FIG. 37A shows a master controller flowchart.

FIG. 37A shows the master controller flowchart 7000. However, this flowchart does not include all the controllers and it is not a complete flowchart. Master Controller 7001, which is the same as computer processor 650, controls the following main controllers—raw ingredients storage unit controller 7002, manipulator controller 7004, heater controller 7008, wash or cleaning controller 7003, collector positioner controller 7006 and the temporary holder controller 7007. As an example, raw ingredients storage unit controller 7002 controls the operation of getting the ingredients required for the chosen recipe from the raw ingredients storage 600. Raw ingredients storage unit controller 7002 includes the following three controllers: In the present application a "controller" generally may include a microprocessor or computer processor, which is programmed by computer software. The wash or clean controller 7003 controls an air controller 7013 and a water controller 7014, which may be used to clean raw ingredients. The water controller 7014 may include water positioner-jet sprayer 900 for cleaning raw ingredients or raw foods.

FIG. 37A also shows device placer D1 7005, which is controlled by manipulator controller 7004, which controls different manipulator devices.

FIG. 37A also shows collector position controller 7011 which can position the collector 5600 anywhere in a three dimensional space between manipulator 1000 and raw ingredients storage unit 600.

FIG. 37A also shows grinder controller 7016 which may include computer software and which controls a grinder 165 which may be used to grind one or more raw ingredients, and/or one or more foods.

FIG. 37A also shows mincer controller 7017 which may include computer software and which controls a mincer 125 for mincing one or more raw ingredients, such as one or more raw solid, or liquid ingredients and/or one or more foods.

FIG. 37A also shows peeler controller 7018 which may include computer software and which controls a peeler 120 shown in FIG. 12A for peeling one or more raw ingredients, such as one or more raw solid, or liquid ingredients and/or one or more foods.

FIG. 37A also shows dough roller controller 7019 which may include computer software and which controls a dough roller 3300 shown in FIG. 16 for rolling dough.

FIG. 37A also shows dough maker controller 7020 which may include computer software and which controls a bread/dough maker 175 shown in FIG. 15A.

Figure 37B:
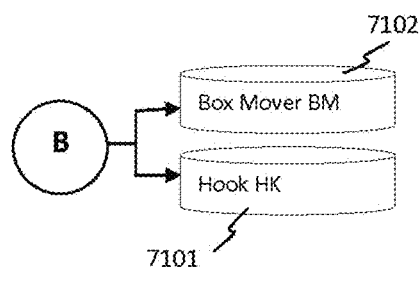
FIG. 37B shows a push pull box controller's actions.
Figure 37C:
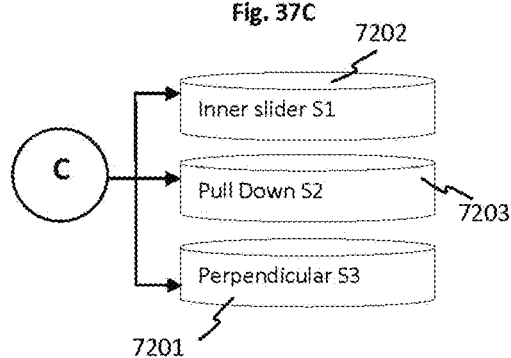
FIG. 37C shows a slider controller's actions.
Figure 37D:
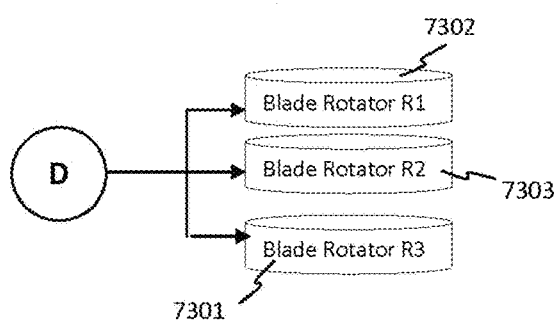
FIG. 37D shows a shredder controller's actions with respect to slider/collector.
Figure 37E:
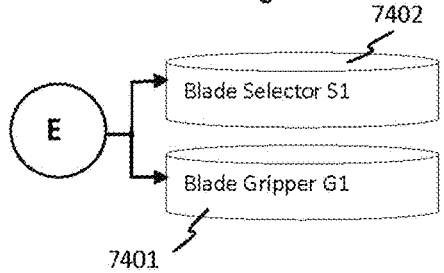
FIG. 37E shows the shredder controller actions with respect to blade rotators.
Figure 37F:
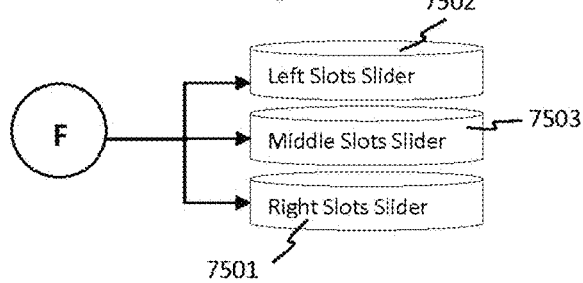
FIG. 37F shows the slots controller actions.
Figure 37G:
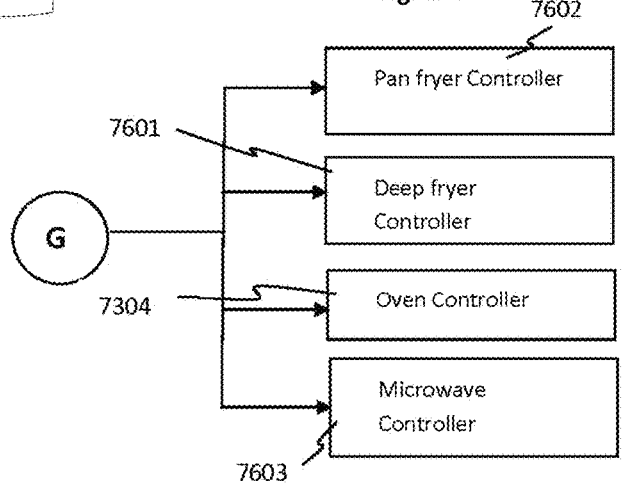
FIG. 37G shows the heater controller actions.

FIG. 37A also shows connection G or 7600 for showing flow, connection and/or communication with components shown in FIG. 37G.

FIG. 37A also shows connection B or 7100 for showing flow, connection and/or communication with components shown in FIG. 37B.

FIG. 37A also shows connection C or 7200 for showing flow, connection and/or communication with components shown in FIG. 37C.

FIG. 37A also shows connection D or 7300 for showing flow, connection and/or communication with components shown in FIG. 37D.

FIG. 37A also shows connection E or 7400 for showing flow, connection and/or communication with components shown in FIG. 37E.

FIG. 37A also shows connection F or 7500 for showing flow, connection and/or communication with components shown in FIG. 37F.

FIG. 37A also shows scissor lift controller 7024 which may include computer software and which controls a scissor lift or scissor lift mechanism 4600 shown in FIG. 26C.

a. Block position controller 7010—to position the push-pull box 34 to the correct row which depends on the ingredient being retrieved;

b. Collector position controller 7011—to position the collector 5600 shown in FIG. 27G to collect the ingredient from the raw ingredients storage Unit 600 and then drop it one of the manipulator devices 1000.

c. Spice controller 7012—To control and rotate the spice slots so that the appropriate spice is chosen and the chosen spice is dropped onto the temporary holder 800. Block position controller 7010 controls the push-pull box controller 7021 where the box mover (wheels) 33a and 33b and hook motor 32 shown in FIG. 4C are activated. Block position controller 7010 also sends the signal to slider controller 7022 so that the ingredient falls down onto the collector 5600 shown in FIG. 27G. Slider controller 7022 controls the front motor rotator 50 and the Back slider base motors 51 shown in FIG. 5C and based on where the ingredient is located, one of the two is activated.

FIG. 37B shows the push pull box controller's actions—box Mover 7102 and the hooks 7101. FIG. 37C shows the slider controller's actions—inner slider (for back slots base) 7202, pull down 7203 and the perpendicular 7201 for rotating the front slots base. FIG. 37D shows the shredder controller 7015 actions—One set of actions for the blade rotator 7301, 7302 and 7303 and other set of actions FIG. 37E for the Selector 7402 and gripper 110. FIG. 37F shows the actions of the slots controller 7023—one action each for the left 7502, middle 7503 and right slots 7501. FIG. 37G shows the actions of heater controller 7008—one each for different heating unit—pan fryer 7602, deep fryer 7601, oven 7304 and microwave controller 7603.

FIG. 38 shows a screen where the user can set up all the menu items for the week. It includes breakfast, lunch and dinner for all days of the week. This screen shows up when the "Weekly Menu Setup" button on the main Home screen (FIG. 31) is clicked. User clicks (or touches) the appropriate cell in the Weekly Menu Table 507 to enter what recipe need to be cooked for that time. For example, if the user wishes to enter Monday's breakfast item, following steps are followed:

a. User touches the Monday breakfast cell (highlighted in black) 508.
b. Chooses a recipe from a list of breakfast items drop down list 495.
c. Enters the number of servings in the Servings Text Box 497 of the chosen recipe that need to be prepared.
d. Presses the Update button 503.

If the user chooses to add more items to a given cell, It can be done using the 'Add' button 504. For example, if the user wants to add additional item to the Breakfast, then click on the Breakfast cell for a given day and choose a Breakfast item from the Breakfast items drop down list 495 and then click the 'Add' button 504. If the user wants to add a side like appetizer or a soup or a salad or a dessert, she can add it by choosing an item from the Sides dropdown list 498 and then clicking the 'Add Sides' button 502. User can choose from the list of recipes for Breakfast, Lunch and Sides dropdown list of menu items. "Week of" date selection box 496 allows selecting a particular week to set up the weekly menu. Ok Button 505 would save the currently selected weekly menu. Cancel button 506 would close the screen without saving any items that was entered. Lunch dropdown list 510 would allow choosing a lunch item and Dinner dropdown list 499 allows the user to select a Dinner item and add it to the Weekly Menu Table 507. Lunch Servings Text Box 509 and Dinner Servings Text Box 501 allow to add Serving sizes.

Figure 39:
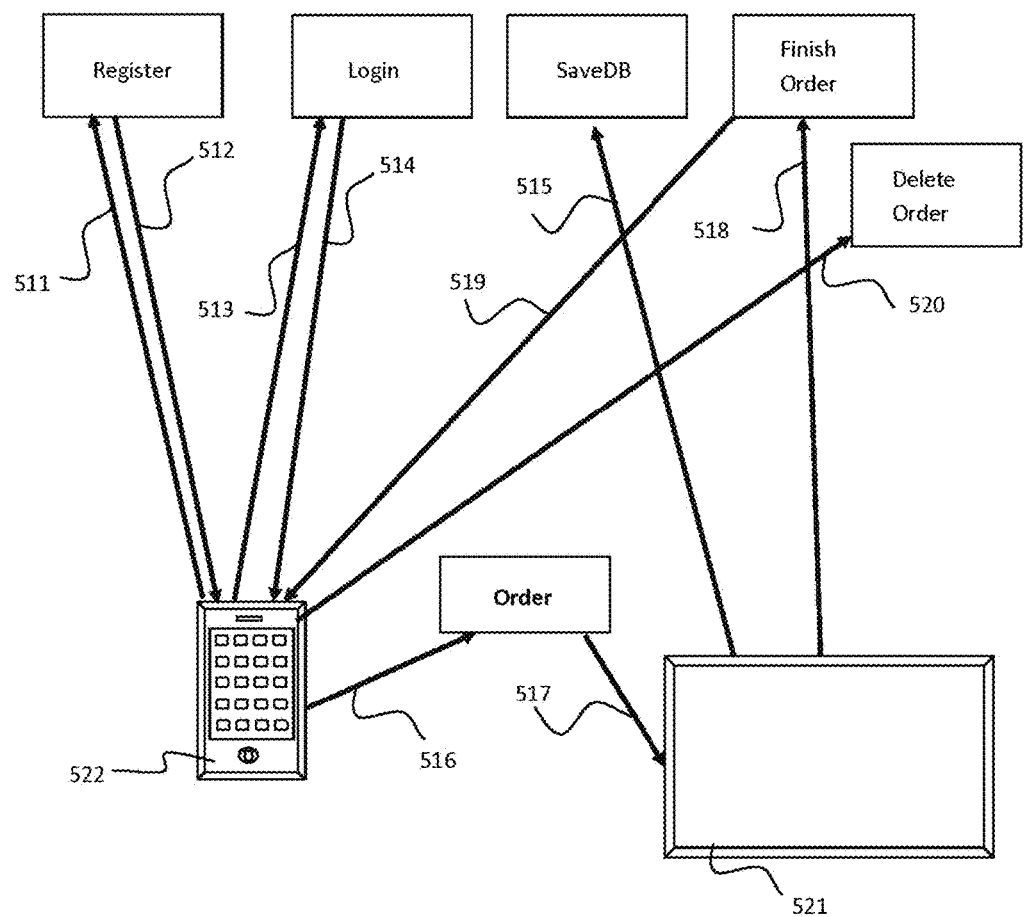
FIG. 39 shows dataflow architecture of a mobile application.

FIG. 39 shows the dataflow architecture of a mobile application for use in accordance with one or more embodiments of the present invention. The mobile software in the mobile 522 interacts with the KA computer 521 and initiates an order. Once the order is received by the KA, the chosen recipe is prepared by the KA. Server scripts (indicated by the boxes) reside on the web server. Login script performs the login operation. Register script performs the registration which is associating the mobile to the corresponding KA. SaveDB script saves the database from the KA to the server. Order script performs the Order operation—to prepare/cook a selected recipe. The FinishOrder script sets order status to ORDER_SUCCESS or ORDER_ERROR depending upon whether the Order can be executed or not. DeleteOrder script deletes the order from the server once the Order is processed. Server receives 512 the registration data from the mobile. Server checks against its database and returns 511 REGISTRATION_SUCCESS or REGISTRATION_ERROR message if user already exists or invalid user. Mobile sends the Login data 514 and receives 513 the LOGIN_SUCCESS or LOGIN_ERROR message if there is incorrect login data. If login is successful, the KA Computer 521 would send 515 data to the server to store the information. When the mobile application Orders 516 a recipe to be cooked, the KA validates 517 the Order using the Order Script. Validation check is basically to check whether chosen order has the appropriate ingredients or not. Based on the result of the script, Order status is set to ORDER_SUCCESS or ORDER_ERROR if order did not pass validation. That is, there may be missing ingredient for the chosen recipe. Mobile application reads the received 519 order status and display a message to the user. Once the order is confirmed, the order can be deleted 520 from the online database. If KA is used in a commercial setup, the orders are stored for billing verification.

Figure 40:
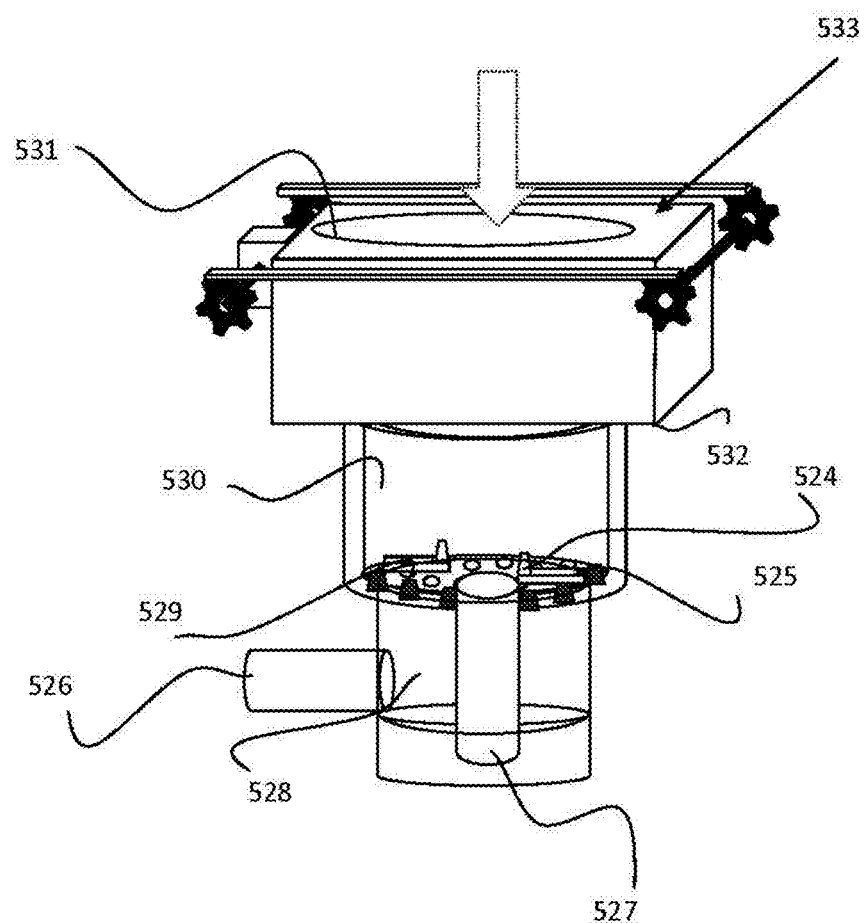
FIG. 40 shows a garbage disposer to remove garbage.

FIG. 40 shows the garbage disposer 533 to remove the garbage. It is similar to the currently available garbage disposers except that the start-stop operation is controlled by the computer 650. In addition, in at least one embodiment, it is a mobile unit which latches underneath the collector positioner 700. It is lightweight and has lesser capacity compared to the currently available garbage disposers. After positioning the garbage disposer 533 using the collector positioner 700, the garbage drops into the garbage funnel 531 and into the cutting chamber 530. Then, the garbage is ground to small pieces inside the cutting chamber 530 on the grind Plate 529 and by the impalers 524 rotation. The ground garbage is flushed through the side holes 525 and collected in the drainage chamber 528. From the drainage chamber 528, garbage pieces go out through the drain connector 526 to the house sewage system. The plate motor 527 operates the grind plate 529.

FIG. 41A shows the spice storage unit 560. FIG. 41B shows a top view of the Spice Storage unit 560. FIG. 41C shows a bottom view of the spice storage unit 560. FIG. 41D shows how the spice storage unit 560 can rotate in horizontal plane. FIG. 41E shows a spice dispensing mechanism 565. Cylindrical units 541 store the spices. Middle unit 544 has the motor to rotate the cylindrical spice units 541. Each of the cylindrical units 541 can rotate and come down into the vertical shaker 548 and can latch onto shaker belt 548. The vertical shaker 549 has the motor that moves the shaker 549 vigorously in the vertical direction up and down. Spices fall out of the holes 546 located at the bottom of each of the cylindrical units 541. Once the desired amount is disposed, the cylindrical units 541 can go back their position in the spice storage unit 560

Figure 42A:
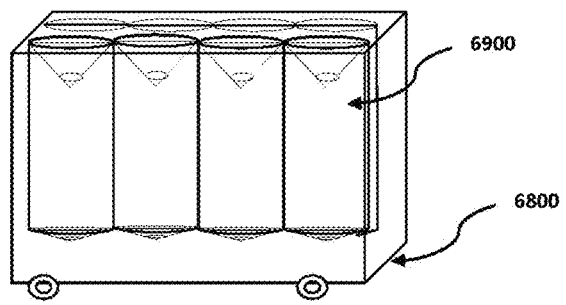
FIG. 42A shows a liquid storage mechanism.
Figure 42B:
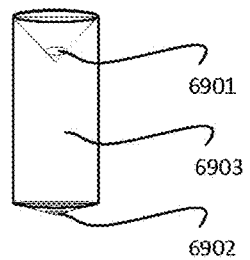
Figure 42C:
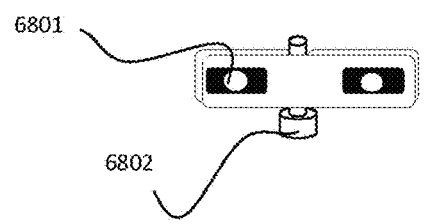

FIG. 42A shows a liquid storage mechanism 6900 FIG. 42B shows an individual liquid storage container 6903. FIG. 42C shows a liquid dispensing mechanism 6800.

To provide vertical movement mechanism, at least three ways are shown in this patent application. They are:
1) Roller chain 1207*a* and 1207*b* as in the push pull box positioner 1200 shown in FIG. 3A;
2) Scissor lift mechanism 4600 shown in FIG. 26C; and
3) Friction lift mechanism 5300 shown in FIG. 27C And we can use the Lead Screw mechanism 240 and 241 shown in FIG. 21A for all vertical movements instead of the above mentioned mechanisms.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A recipe driven kitchen automatic food preparation apparatus comprises;
   A manipulator which includes one or more manipulator device enclosed within a separate device box, each of which is configured to physically manipulate one or more of a plurality of raw ingredients by one or more of the actions of a grinding, mincing, peeling, cutting and rolling, each of which further includes;
   A front and back wheel mechanism attached to each plurality of manipulator devices; and
   a motor coupled with the wheels to provide power for rotation and hence roll out of specific manipulator device, out from the outer manipulator box to execute particular recipe;
   a raw ingredients storage unit having boxes with separate slots and retractable bases, configured to store one or more of the plurality of raw ingredients within the separate slots of the boxes;
   a raw ingredient storage unit controller included to control push-pull box which is configured to push/pull a first raw ingredient storage unit from enclosure of the storage unit and further to open/close base of the first raw ingredient storage unit to dispense a first raw ingredients from the plurality of raw ingredients;
   a collector;
   a collector position controller which is configured to position the collector at different locations in a three dimensional space between the manipulator and the raw ingredients storage unit; the collector collects the ingredients utilizing the principle of gravity; wherein the ingredients fall into the collector when the push pull box pulls the bases of specific slots of the ingredient storage unit; and
   a manipulator controller which is configured to cause a first manipulator device of the one or more manipulator devices to come out from the manipulator so that the collector can drop the first raw ingredient of the plurality of raw ingredients to fall down by gravitational force into the first manipulator device;
   the manipulated ingredients is collected by the Collector utilizing the principle of gravity for the ingredients to fall into collector since the collector position controller positions collector below the device.

2. The apparatus of claim 1 wherein
   The manipulator controller is configured to cause a first manipulator device of the one or more manipulator devices to come out from the manipulator by causing the first manipulator device to roll out from the manipulator through back and front wheel mechanism via the motors attached to them; wherein the opening and closing of the device box is automated.

3. The apparatus of claim 1 wherein
   The manipulator includes a plurality of manipulator device enclosed within a separate device boxes, which are stacked on top of one another, and finally enclosed within an outer manipulator box with the opening on the sides for the manipulator devices to roll out; the device boxes are separated by rows of separator support bases; each row comprising two device boxes in one row next to each other or just one device box spanning the entire row depending upon the size of the device within the outer manipulator box;
   Wherein each of the plurality of manipulator device is configured to physically manipulate one or more of a plurality of raw ingredients by one or more of actions of grinding, mincing, peeling, cutting, and rolling; and
   Wherein each of plurality of manipulator devices is attached with front and back wheels; rotation of which is automatic and the said wheels are connected with motor attached; to execute a particular recipe, specific manipulator device can roll out from the outer manipulator box.

* * * * *